US006496280B2

(12) United States Patent
Ishikawa et al.

(10) Patent No.: US 6,496,280 B2
(45) Date of Patent: Dec. 17, 2002

(54) METHOD FOR IMAGE FORMATION AND APPARATUS FOR DEVELOPMENT PROCESSING

(75) Inventors: Takatoshi Ishikawa, Kanagawa (JP); Hideaki Nomura, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 24 days.

(21) Appl. No.: 09/742,374

(22) Filed: Dec. 22, 2000

(65) Prior Publication Data

US 2001/0022663 A1 Sep. 20, 2001

Related U.S. Application Data

(62) Division of application No. 09/076,074, filed on May 12, 1998, now Pat. No. 6,207,360.

(30) Foreign Application Priority Data

May 12, 1997 (JP) ............................................ 9-120921
Aug. 8, 1997 (JP) ............................................ 9-214903
Aug. 8, 1997 (JP) ............................................ 9-215149
Aug. 8, 1997 (JP) ............................................ 9-215151

(51) Int. Cl.[7] ............................ H04N 1/50; H04N 1/56; H04N 1/58; H04N 1/60

(52) U.S. Cl. ....................... 358/1.9; 358/3.27; 358/518; 358/527; 358/532

(58) Field of Search ......................... 358/1.9, 504, 518, 358/519, 520, 521, 527, 530, 532, 3.27; 430/434, 963

(56) References Cited

U.S. PATENT DOCUMENTS 5,401,621 A 3/1995 Kojima et al.
5,698,379 A 12/1997 Bohan et al.
5,858,629 A 1/1999 Ishikawa et al.
6,067,109 A * 5/2000 Yamana ...................... 348/104
6,221,569 B1 4/2001 Ishikawa

FOREIGN PATENT DOCUMENTS

EP 363988 A2 * 10/1989 ............ H04N/1/40
EP 566064 A1 * 4/1993 ........... G03B/27/73
EP 967521 A1 * 12/1999 ............ G03C/7/30

* cited by examiner

*Primary Examiner*—Scott Rogers
(74) *Attorney, Agent, or Firm*—Sughrue Mion, PLLC

(57) ABSTRACT

A method and an apparatus for forming an image through either basic development processing or non-basic development processing on the same processor to provide equal image quality, in which an exposed color light-sensitive material (e.g., color negative film) is processed under non-basic conditions (e.g., rapid processing conditions), image information is read out from the developed film and converted to optical or electrical digital information, the digital information is subjected to image processing to obtain target image characteristics which should have been obtained under basic development processing conditions, and the resulting image characteristics are output to a printer.

4 Claims, 11 Drawing Sheets

METHOD FOR IMAGE FORMATION AND APPARATUS FOR DEVELOPMENT PROCESSING

This is a divisional of application Ser. No. 09/076,074 filed May 12, 1998, now U.S. Pat. No. 6,207,360 the disclosure of which is incorporated herein by reference.

FIELD OF THE INVENTION

This invention relates to an image formation method for obtaining corrected color image information from an exposed silver halide color photographic material and for obtaining a color print therefrom in a reduced time and an apparatus for carrying out this method. It particularly relates to a photographic processing system based on a novel technical idea that a part of development processing for an exposed photographic material is omitted to gain rapidity and the resultant deviation in photographic properties is compensated for by image data processing.

BACKGROUND OF THE INVENTION

The photographic processing system that is the most commonly used for color photography is a so-called negative paper system, in which a color negative film after photographing (i.e., exposed film) is developed, and the developed image is printed on color paper in processing laboratories. Where a camera store relies on large integrated laboratories, the finishing time required from receiving an exposed film from a customer to handing over color prints to the customer has been one day. In the case of an over-the-counter development system involving no delivery from a camera store to a processing laboratory, which has recently been spreading, the finishing time is about 30 minutes to 1 hour. Processing laboratories of this type are called mini laboratories compared with large integrated laboratories. The mini laboratories have achieved a great reduction of the finishing time on behalf of customers, but the finishing time at the mini laboratories is not at all short enough for keeping customers waiting there for having their negative film finished into prints. It has been strongly desired, while very difficult to achieve, that the finishing be completed rapidly enough for leaving a customer waiting.

Development processing (from development up to drying) of a color negative film requires 10 to 15 minutes, comprising a large proportion of the total finishing time. Thus, reduction of the development processing time for color negative films has been especially demanded. There are a variety of color negative films available from film makers, and a processing laboratory undertakes any kind of the color negative films. The fact is that a laboratory develops various kinds of color negative films in one processor with one kind of each processing solution, being restricted by the cost and floor space. Therefore, the development time for color negative films is set in conformity with the film which requires the longest development time of various kinds of negative films. Color negative films requiring a long development time are frequently found among high-speed films having an ISO sensitivity of 1000 or higher. Although ISO 400 films and ISO 100 films, which are used most commonly, can be developed in a shorter time, they are developed taking the same time as assigned to those films having a higher sensitivity and a lower rate of development. That is, processing laboratories have chosen the most economical system in which different kinds of color negative films are processed in the same processor with the same processing solutions. No customer service of selecting a processing time according to the kind of the film is available. Eventually rapid development services are hardly carried out.

Techniques for correcting unevenness in product (finish) quality of development processing or photographic quality of light-sensitive materials per se through image processing have recently been proposed and put to practice use. However, when color negative films requiring a long development time are subjected to rapid processing, the deviation of the product quality from the standard level is far beyond the range of processing unevenness that could be corrected through image processing. Correction into normal image quality by image processing of films having been subjected to rapid processing and underwent much greater deviation from standard quality over the processing unevenness has not ever been thought of except for special cases.

The special cases are for restoration of old historical photographs. Attempts to restore deteriorated images are reported, e.g., in T. Rowlands, *Image Technology*, p. 190 (October, 1993) and Harvard University, *IS & T Reporter*, Vol. 8, p. 9 1993). Even in these cases, restoration is possible only when specific conditions are satisfied.

JP-B-7-52287 (the term "JP-B" as used herein means an "examined published Japanese patent application") discloses a method for developing an exposed color negative film, in which a bleaching step is omitted, and the accompanying problem that a silver image is superimposed on a color image is overcome by reading the development densities, from which the analytical densities of the image are calculated thereby to obtain the densities of the color image and those of the silver image separately. However, the resulting positive image obtained on the basis of the analytical densities of three colors, i.e., cyan, yellow and magenta, and neutral silver is still inferior in quality to the standard. There seems to be some factors deciding image quality other than analytical densities. The disclosed technique has not been put to practice yet.

Another problem of general processing laboratories mainly comprising mini laboratories is countermeasures against environmental pollution by the spent processing solutions (hereinafter called waste solutions) and drainage from a wash tank, etc. (hereinafter called waste water). Since nitrogen compounds contained in waste water are objects of drainage regulations, waste water containing nitrogen compounds increases the load of disposal. Where disposal of waste solutions is consigned, the lesser the amount of waste solutions, the lesser the cost of consignment. Therefore, a development processing system which discharges less waste solutions and drainage with reduced nitrogen components has been desired in processing laboratories. From this viewpoint, it is a thoroughly spread practice in carrying out universal development processing that waste water is reduced by a water-saving washing system (also called stabilization processing substituting for washing, inclusively designated low-throughput replenishment type washing) and waste solutions are reduced by low-throughput replenishment. However, there has been always a demand of necessity for further reductions in waste solutions and waste water.

Still another problem waiting for solution in processing laboratories mainly comprising mini laboratories is how to secure constant development quality even in the processing slack period. Because the processing throughput is smaller in the slack period, the amount of replenishers added to a processor is smaller, and the solution replacement ratio decreases. As a result, the processing solutions undergo deterioration with extension of the retention time in the processing tanks, causing, for example, sulfides and silver compounds to settle. It has therefore been demanded to take some measures for stabilizing the processing solutions in the processing tanks even in such a processing slack period.

SUMMARY OF THE INVENTION

In the light of the above-described technical background and the market demands, an object of the present invention is to provide a method and an apparatus for image formation which make it feasible to obtain image information (and products, i.e., color prints) with substantial equality irrespective of whether a color light-sensitive material is subjected to basic development or non-basic development. More specifically, the method and the apparatus are such that make it possible to carry out both basic development processing and rapid development processing in one processor for color light-sensitive materials and yet to provide equal product quality even if rapid processing is chosen irrespective of the kind of the color light-sensitive material.

Another object of the present invention is to establish a method for forming a color image in which the time required from the start of development of an exposed color photographic material to formation of a positive image can be reduced while securing the product quality.

A further object of the present invention is to establish a method for forming a color image in which the waste solutions from development processing are reduced, and nitrogen compounds in the waste water are reduced.

A still further object of the present invention is to establish a method for forming a color image into which a stable development processing system is integrated so as to avoid deterioration of processing solutions nor formation of sulfide or silver-containing sediment in a processing slack period.

A yet further object of the present invention is to establish a method for forming a color image in which the processing time required from the start of development of an exposed color photographic material to formation of a positive image can be reduced by omitting a bleaching step while securing the product quality.

As a result of extensive studies, the inventors of the present invention have found that the above objects are accomplished by (1) establishing a technique for obtaining, from image information obtained under non-basic development processing conditions, image characteristics that should have been obtained under basic processing conditions (hereinafter sometimes expressed by the term "target" as in "target image characteristics") and (2) combining the technique with a processing system which enables both basic development processing and non-basic development processing, particularly rapid development processing. They have succeeded in developing an image formation method for realization and an apparatus for carrying out the method.

The inventors further carried out investigations into (1) possibility of omitting a processing step involving a great environmental load, (2) possibility of omitting a processing step which could lead to advances in processing speed, and (3) a means for compensating for the reductions in product quality which might result from such omission. As a result, they have found that the above objects of the present invention are accomplished by building up a new development processing system and by subjecting resulting image information to image processing.

The inventors furthermore studied on application of the above-described new development processing system to non-basic development processing containing no bleaching step. As a result, they have found that it is effective in maintaining image quality even in such non-basic development processing that (1) correction of blue light absorption by a yellow filter layer comprising colloidal silver grains is incorporated into the image processing to obtain electrical image information of higher quality and that (2) the fixing speed is increased to improve the precision in reading the image information to be sent to the image processing step.

The fundamental concept of the present invention resides in introduction of the idea that image information obtained under development processing conditions deviated from basic development processing conditions is converted to digital information so as to enable image processing thereby to obtain image characteristics that should have been obtained by basic processing. More concretely the objects of the present invention can be achieved by the following techniques.

1. A method for forming an image comprising development processing an exposed silver halide color light-sensitive material and outputting image information obtained from the developed image to a printer, wherein (1) the kind of the exposed color light-sensitive material is detected, (2) the exposed color light-sensitive material is development processed under non-basic development processing conditions which are chosen according to the information as detected or separately furnished, (3) image information is read out from the developed color light-sensitive material and converted to optical or electrical digital information, (4) the optical or electrical digital information is subjected to image processing to obtain target image characteristics which should have been obtained if the color light-sensitive material had been development processed under basic development processing conditions, and (5) the resulting image characteristics are output to the printer, to thereby output image information having the same image quality as could be obtained by basic development processing.

2. An apparatus for development processing an exposed silver halide color light-sensitive material and outputting image information obtained from the developed image to a printer, which has 1) a mechanism for detecting the kind of the exposed color light-sensitive material, 2) a mechanism for choosing either basic development processing conditions or non-basic development processing conditions and carrying out development processing under the chosen conditions, 3) a mechanism for reading image information from the developed color light-sensitive material and converting the image information into optical or electrical digital information, 4) a mechanism for image processing the optical or electrical digital information into target image characteristics, and 5) an output mechanism for outputting the converted image characteristics to the printer to thereby obtain a positive image having the same image quality as could be obtained by basic development processing.

3. The apparatus according to 2 above, wherein the non-basic development processing is rapid processing.

4. The apparatus according to 2 or 3 above, wherein the mechanism for image processing the optical or electrical digital information is constructed to carry out at least one of 1) processing for converting contrast data of the read image information to target contrast values which should have been obtained by basic development processing,
2) processing for converting color balance data of the read image information to target color balance values which should have been obtained by basic development processing,
3) processing for converting minimum density data of the read image information to target minimum density values which should have been obtained by basic development processing,
4) processing for correcting nonlinearity of the density vs. exposure relationship resulting from the non-basic development processing to obtain a target density vs. exposure relationship which should have been obtained by basic development processing, and
5) processing for correcting nonlinearity of the density vs. exposure relationship resulting from the non-basic development processing which is dependent on the kind of the color light-sensitive material to obtain a target density vs. exposure relationship which should have been obtained by basic development processing.

5. The apparatus according to 4 above, wherein the mechanism for image processing the optical or electrical digital information has a means for edge emphasis, a means for sharpness improvement, a means for granularity suppression, and a means for saturation improvement.

6. The method according to 1 above, wherein the non-basic development processing is development processing containing a color development step and a bleaching step but no fixing step.

7. The method according to 1 above, wherein the non-basic development processing is development processing in which a color development step is followed by residual color reduction processing and no desilvering step is carried out.

8. The method according to 1 above, wherein the non-basic development processing is development processing containing no bleaching step.

9. The method according to 1, 6, 7 or 8 above, wherein the reading of image information is carried out through reflected light.

10. The method according to 1, 6, 7 or 8 above, wherein the silver halide color light-sensitive material has a silver halide coating weight of 1.0 to 4.0 $g/m^2$ in terms of silver.

11. The method according to 1, 6, 9 or 10 above, wherein the rate of replenishment for the bleaching bath and that of a final bath are not more than 30 ml per a 35-mm 24-exposure roll of film (135-24 format).

12. The method according to 7 above, wherein the rate of replenishment for the residual color reduction bath is not more than 40 ml per a 35-mm 24-exposure roll of film (135-24 format).

13. The method according to 1, 6, 9, 10 or 11 above, wherein the total amount of waste solutions from the development processing is not more than 50 ml per a 35-mm 24-exposure roll of film (135-24 format).

14. The method according to 7 or 12 above, wherein the total amount of waste solutions from the development processing is not more than 60 ml per a 35-mm 24-exposure roll of film (135-24 format).

15. The method according to 8 above, wherein fixing in the development processing containing no bleaching step is carried out with a fixing solution containing a fixing accelerator.

16. The method according to 15 above, wherein the fixing accelerator is at least one compound selected from the group consisting of a mesoion compound represented by formula (FI):

(FI)

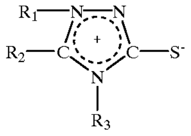

wherein $R_1$, $R_2$, and $R_3$ each represents a hydrogen atom, an alkyl group, a cycloalkyl group, an alkenyl group, an alkynyl group, an aralkyl group, an aryl group, a heterocyclic group, an amino group, an acylamino group, a sulfonamido group, a ureido group, a sulfamoylamino group, an acyl group, a thioacyl group, a carbamoyl group or a thiocarbamoyl group; with the proviso that $R_1$ and $R_2$ do not represent a hydrogen atom simultaneously, a thiourea derivative represented by formula (FII):

(FII)

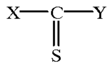

wherein X and Y each represent an alkyl group, an alkenyl group, an aralkyl group, an aryl group, a heterocyclic group, $—N(R_{11})R_{12}$, $—N(R_{13})N(R_{14})R_{15}$, $—OR_{16}$ or $—SR_{17}$; X and Y may be taken together to form a ring; with the proviso that at least X and Y is substituted with at least one of a carboxyl group or a salt thereof, a sulfo group or a salt thereof, a phospho group or a salt thereof, an amino group, an ammonium group, and a hydroxyl group; $R_{11}$, $R_{12}$, $R_{13}$, $R_{14}$, and $R_{15}$ each represent a hydrogen atom, an alkyl group, an alkenyl group, an aralkyl group, an aryl group or a heterocyclic group; and $R_{16}$ and $R_{17}$ each represent a hydrogen atom, a cation, an alkyl group, an alkenyl group, an aralkyl group, an aryl group or a heterocyclic group, and a mercaptotetrazole derivative represented by formula (FIII):

(FIII)

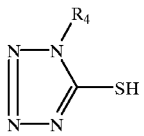

wherein $R_4$ represents a hydroxyalkyl group.

More specifically the above-described techniques include the following methods and apparatus (a) to (k) or combinations thereof.

(a) A method for forming an image comprising development processing an exposed silver halide color light-sensitive material and outputting image information obtained from the developed image to a printer, wherein (1) the kind of the exposed color light-sensitive material is detected, (2) the exposed color light sensitive material is development processed under non-basic development processing conditions which are chosen according to the information as detected or separately furnished, (3) image information is read out from the developed color light-sensitive material and converted to optical or electrical digital information, (4) the optical or electrical digital information is subjected to image processing to obtain target image characteristics which should have been obtained under basic development processing conditions, and (5) the resulting image characteristics are output to the printer, to thereby output image information having the same image quality as could be obtained by basic development processing.

(b) The method according to (a) above, wherein reading image information from the developed color light-sensitive material, converting the information to digital information, and obtaining a positive image having the same image quality as could be obtained by basic development processing are carried out by means of (1) a light source comprising a halogen lamp, (2) a light path in which the light for reading is controlled and passes through the developed color light-sensitive material to reach a receptor, (3) a receptor for reading the transmitted light and recording electrical image information, (4) an amplifier, (5) an A/D converter, (6) a digital image information processing unit, and (7) a log converter.

(c) The method according to (a) above, wherein reading image information from the developed color light-sensitive material, converting the information to digital information, and obtaining a positive image having the same image quality as could be obtained by basic development processing are carried out by means of (1) a laser beam source, (2) a drum scanning means, (3) an amplifier, (4) an A/D converter, (5) a CCD correction means, and (6) a log converter.

(d) The method according to (a), (b) or (c), wherein the output unit for outputting the image-processed digital information on the developed color light-sensitive material is selected from a printer for color prints, a heat-sensitive transfer printer, a digital printer for silver halide heat developable light-sensitive materials, an ink jet printer, a color photographic copier, and a printer for instant photographs.

(e) An apparatus for development processing an exposed silver halide color light-sensitive material and outputting image information obtained from the developed image to a printer, which has 1) a mechanism for detecting the kind of the exposed color light-sensitive material, 2) a mechanism for choosing either basic development processing conditions or non-basic development processing conditions and carrying out development processing under the chosen conditions, 3) a mechanism for reading image information from the developed color light-sensitive material and converting the image information into optical or electrical digital information, 4) a mechanism for image processing the optical or electrical digital information into target image characteristics which should have been obtained if the exposed color light-sensitive material had been development processed under basic development processing conditions, and 5) an output mechanism for outputting the converted image characteristics to the printer and is capable of outputting image information having the same image quality as could have been obtained if the exposed silver halide color light-sensitive material had been subjected to basic development processing.

(f) The apparatus according to (e) above, wherein the non-basic development processing is rapid processing.

(g) The apparatus according to (e) or (f) above, wherein the basic development processing and the non-basic development processing are carried out in the same processor with common processing solutions.

(h) The apparatus according to (e), (f) or (g) above, wherein the speed of transporting the silver halide color light-sensitive material is chosen from at least two levels so that either basic development processing or rapid development processing in which the time for each processing step involved is shortened at the same ratio can be carried out.

(i) The apparatus according to (h) above, wherein the apparatus has at least two driving mechanisms for film transport having the respective speeds for film transport for choice, and the basic development processing and the non-basic development processing are carried out in the same processor with common processing solutions.

(j) The apparatus according to any one of (e) to (i) above, wherein the mechanism for image processing the optical or electrical digital information into target image characteristics which should have been obtained if the exposed color light-sensitive material had been development processed under basic development processing conditions is constructed to carry out at least one of 1) processing for converting contrast data of the read image information to target contrast values which should have been obtained by basic development processing, 2) processing for converting color balance data of the read image information to target color balance values which should have been obtained by basic development processing, 3) processing for converting minimum density data of the read image information to target minimum density values which should have been obtained by basic development processing, 4) processing for correcting nonlinearity of the density vs. exposure relationship resulting from the non-basic development processing to obtain a target density vs. exposure relationship which should have been obtained by basic development processing, and 5) processing for correcting nonlinearity of the density vs. exposure relationship resulting from the non-basic development processing which is dependent on the kind of the color light-sensitive material to obtain a target density vs. exposure relationship which should have been obtained by basic development processing.

(k) The apparatus according to (i) above, wherein the mechanism for image processing the optical or electrical digital information has a means for edge emphasis, a means for sharpness improvement, a means for granularity reduction, and a means for saturation improvement.

DETAILED DESCRIPTION OF THE INVENTION

Figure 1:
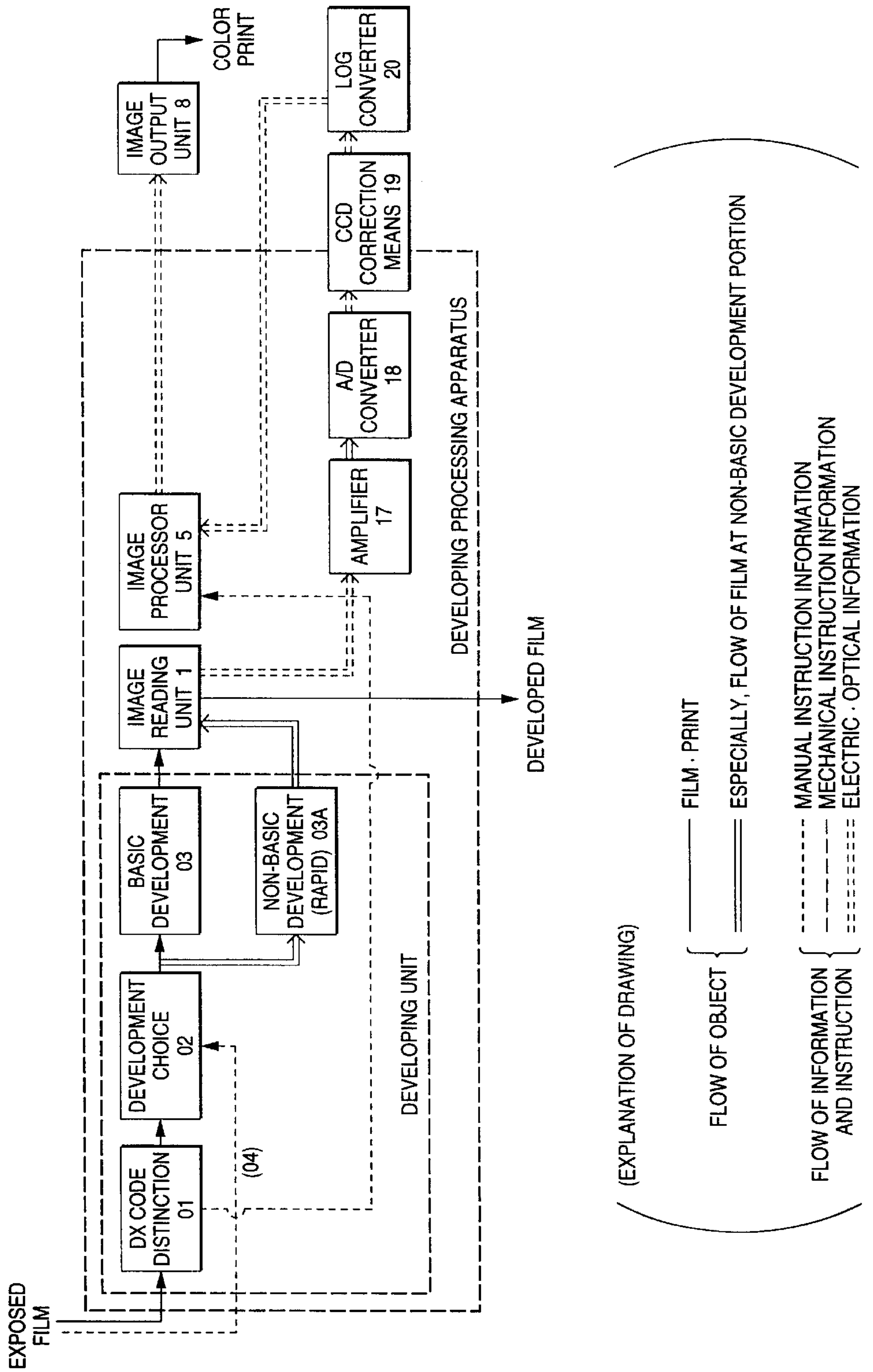
FIG. 1 is a block diagram showing the basic construction and general flow of the image forming method and apparatus according to the present invention.

The details of the present invention will be given hereunder in the following order.

I. Outlines of the apparatus for development processing according to the invention and of the method for forming a positive image having the image characteristics that are to be obtained in basic development processing II. Exposed color light-sensitive materials III. Development processing III-1. Choice between basic development processing and non-basic development processing (e.g., rapid development processing by increasing the speed of film transport)

III-2. Rapid development-processing 1st to 3rd embodiments of non-basic development processing:

1A-1C. Flow of basic of the image formation method 2A-2C. Predevelopment step 3A-3C. Development processing step IV. Image reproduction equipment IV-1. Reading of image information from developed films IV-2. Image data processing IV-3. Output of processed image signals to a printer V. Positive light-sensitive materials as output media In the present invention, we exemplify four examples of non-basic development processing below: i) rapid development processing e.g., by increasing the speed of the film transport; ii) fixing-omitted development processing which contains a color development step and a bleaching step but does not contain a fixing step (1st embodiment); iii) desilvering-omitted development processing in which a color development step is followed by residual color reduction processing and no desilvering step is carried out (2nd embodiment); and iv) bleaching-omitted development processing which does not contain a bleaching step (3rd embodiment).

I. Outlines of the Apparatus for Development Processing According to the Present Invention and of the Method for Forming a Positive Image Having the Image Characteristics that are to be Obtained in Basic Development Processing:

The term "exposed color light-sensitive materials" as used herein means both color negative films and color reversal films. However, the present invention will be described chiefly with reference to color negative films because, for one thing, color negative films prevail overwhelmingly and for another thing there is no fundamental difference between them in application of the present invention. It should be understood therefore that the apparatus and method according to the present invention are applicable to either. Although a color diffusion transfer process (instant photography) and a heat development color diffusion transfer process are also included under photographic systems using color light-sensitive materials, these systems in which a material for photography and a positive material are processed simultaneously are out of the scope of the present invention.

The apparatus for development processing according to the invention detects the kind of an exposed color light-sensitive material (hereinafter simply referred to as a film) fed thereto in its very start. The term "kind" as used herein is intended to cover the difference of film makers and among product brands manufactured by a film maker. That is, films produced by a film maker according to a process and a formulation and sold under a trade name are of the same kind, whereas films produced by a film maker but having different sensitivities are of different kinds.

In what follows, terminologies "standard development (or nearly standard development)", "basic development conditions", "standard conditions (or nearly standard conditions)", "basic conditions", "basic characteristics", and like terminologies are used. It would be helpful for easy understanding to explain what is meant by each terminology.

As stated above, each processing laboratory accepts various kinds of color films and processes them in accordance with a substantially world-wide common method. For example, color negative films having an ISO sensitivity of 400 manufactured by various film makers show performance properties (i.e., sensitivity and gradation) as displayed when tested according to the international standards (ISO 5800). Therefore, the processing formulae with which the performance properties specified by the international standards can be manifested are regarded to be common internationally. In this connection, internationally common processing formulae for color negative films include CN16 series specified by Fuji Photo Film Co., Ltd., C41 series specified by Eastman Kodak Co., Ltd., and CNK 4 series specified by Konica Corporation. These processing formulae, while named differently, are accepted as an international standard processing procedure. The characteristic curve obtained through the standard processing is a "standard characteristic curve", and the conditions adopted therein are called standard development processing conditions. Even the development processing conditions specified for the above-mentioned international standards (ISO 5800) are constructed on the basis of the internationally common processing. The fact is that the term "international standard processing" has a certain latitude admittedly so as to allow slight deviations because every film maker is making efforts to make their products distinguishable by incorporating their own techniques therein. Therefore, such standard processing might be expressed more suitably by "nearly standard". The conditions for the standard development which allow such slight deviations are also referred to herein as "standard conditions".

In a processing laboratory, the photographic performance obtained from a color film of standard performance by standard processing is taken as a quality guideline or target. Such development processing aimed at by each laboratory, the photographic characteristics obtained thereby, and the conditions therefor (inclusive of image processing conditions) are designated "basic development processing", "basic characteristics", and "basic conditions", respectively. Basic processing conditions, and the like are therefore in agreement with standard processing conditions, and the like in most cases. The difference between the term "standard" and the term "basic", if any, is that the basic processing conditions can be set by each processing laboratory. Cases are often met with that basic processing, basic characteristics, basic conditions, etc. are made different from standard ones according to regional peculiarities. For example, the basic conditions may be decided taking into consideration the preference of the users in a particular region, typically the difference in preference among races or nations. Essentially, however, "basic photographic characteristics or conditions" are targets which are decided and aimed at by each processing laboratory in order to obtain the standard photographic characteristics. In an image formation apparatus combined with an image processor, the basic characteristic curve is incorporated into the image processor, and the image read out from each frame of a film is corrected so as to agree with the basic characteristic curve, whereby the pieces of image information with improved image quality are output on a positive material.

The present invention is based on the way of thinking that what is aimed at by a processing laboratory is realization of the image quality having the basic characteristics, which is, at the same time, the image quality according to the standard processing from the standpoint of international community.

Here is added further explanation on the "basic conditions" in relation to the present invention. When an image from a negative film is printed on a positive material, the piece of image information is processed into one having "basic characteristics" (i.e., target image quality). The conditions in this image processing correspond to "basic conditions". The "basic conditions" may be said to be the conditions incorporated into an image processor as a target for developing a color film of standard performance under standard processing conditions and for processing the developed image to obtain nearly standard photographic characteristics, i.e., the basic photographic characteristics. In other words, the terminology "basic conditions" are to be used in connection with both development processing and image processing.

The basic development processing and the international standard processing each comprises the steps of development, bleaching, fixing, washing, image stabilization, and drying and, in some cases, some rinsing steps (in the case of color reversal films, some additional steps are added). For clear understanding of descriptions given later, a slight reference to the waste solutions and waste water from the development processing is made here. The spent processing solutions (i.e., waste solutions) are discharged from the steps of color development, bleaching and fixing, and waste water is discharged from the washing step. Both the waste solutions and waste water are treated in accordance with the regional environmental regulations. Where the washing step is carried out as a low-throughput replenishment type washing as referred to previously, the waste water is not discharged as drainage but treated as a waste solution.

The term "development processing" as used herein is intended to mean the whole process starting with a development step and ending with a drying step, whereas the term "development" indicates the particular step of development out of the development processing.

The term "apparatus for development processing (or development processing apparatus)" as used herein means the whole equipment necessary for fulfilling the objects of the present invention. Where a piece of equipment for carrying out the development processing of films is meant particularly, we call the piece of equipment "a developing unit" to distinguish from the development processing apparatus.

The term "processing" is sometimes used to indicate "development processing" or "image processing" unless there is no possibility of confusion.

FIG. 1 is a block diagram showing the development processing apparatus of the present invention and the flow of operations in the apparatus. Films are fed to the apparatus from the left side of the diagram. The kind of the film is first detected (01) by reading the perforation symbols for identification called DX code. Based on the information on kind, a choice is made for setting the conditions of image processing hereinafter described and, in some cases, a choice is also made (02) between basic processing and non-basic processing (e.g., rapid processing). The choice between basic processing and rapid processing may be made by an operator (04) based on predetermined standards regardless of the DX code.

After the developing conditions are chosen, the film is transferred through a series of processing tanks within a developing unit. The developing unit has a roller transport system and is capable of performing at least the above-described basic processing that is almost common in the world and rapid processing with at least one level of rapidness. The changeovers between the two processing modes (03 and 03A) are preferably done by changing the speed of roller transport. The film is processed by color development, bleaching, fixing, washing or stabilization in accordance with the development processing mode chosen, and is then transferred to an image information reading step (step 1).

In step (1), the transmission density (reflection density in the case of color reversal films) of the developed film is measured for every minimum area unit generally called a pixel to read out the image information as a density of each pixel. The image information (densities) is thus converted to electrical image signals, which are amplified in an amplifier 17 and converted to digital signals through an analogue-to-digital (A/D) convertor 18. Corrections on the digital signals are made (19) for the dispersion of CCD (charge coupled device which is used for photoelectrical conversion of signals) functions, such as a correction for sensitivity dispersion among pixels and a correction for a dark current, and the corrected signals are then sent to an image processor unit 5 via a log convertor 20.

In the image processor unit, the digital image information is electrically processed into the digital image signals which should have been obtained if the film had been subjected to basic development processing. Where the film has been subjected to basic development processing, the image processing merely means correction of variations in photographing conditions, development processing or film characteristics to statistical center values, which has its own importance but is not the object of the present invention. Where rapid development has been chosen, the resulting developed film is in an underdevelopment state, and the photographic characteristics of the developed image, such as contrast, image density, color balance, and minimum density $D_{min}$ (density of the unexposed area), deviate from the target values. The present invention is characterized in that corrections of these deviations are made through image processing as hereinafter described in detail. The above-mentioned image processing can be carried out by the method and operation equipment disclosed in JP-A-10-20457 and JP-A-9-146247 (U.S. Ser. No. 08/701,018, filing date: Aug. 21, 1996, Title: Method of Forming Images, Applicants: Shun-ichi Ishikawa et al.).

The image signals of the rapidly developed film that have been converted to target photographic characteristics are output to an image output unit, i.e., a printer (8) and, as a result, a normal positive image is obtained. Any printer is useful as long as it accepts electrical or photoelectrical image signals to reproduce a positive image. Preferred printers include those for color prints, instant photographs or silver salt color prints (e.g., dye heat transfer type color prints), ink jet printers, sublimation type heat sensitive transfer printers, wax type heat transfer printers, and color electrophotographic printers.

Along the above-described outlines, the method and apparatus of the present invention will be illustrated in more detail. In saying that the photographic characteristics obtained through non-basic development processing (such as rapid development processing) are converted to normal or target photographic characteristics that should have been obtained through basic development, it is meant that pieces of image information obtained through the conversion are of the same quality as the pieces of image information obtained through basic development; that is, pieces of image information on the photographic characteristics on substantially the same levels as those obtained through basic development can be obtained. Although judgement on whether or not the image information is of the same quality is essentially to be made by observation and evaluation of a photographic image, an image density can be made use of as a characteristic value representing the photographic characteristics in cases where weight should be put on objectivity. More specifically, with a density falling within a range of ±10% of a target value, the piece of image information is regarded as equal to the information that should have been obtained through basic development processing. Seeing that a one-key correction of a general color printer of planar exposure system is about ±8% and that deviations within this range are usually accepted, it would be safe to say that a deviation of the photographic characteristics obtained through non-basic development processing is permissible if it is within 10% of a target value.

II. Exposed Color Film:

All the universal color negative films manufactured by various film makers and available on the market can be the exposed color film, i.e., the film after photographing, to be used in the present invention. Typical is a silver halide light-sensitive material comprising a support having thereon at least one, usually 3 or 4 light-sensitive layers each composed of a plurality of silver halide emulsion layers which are substantially equal in color sensitivity but different in photographic speed. These plural silver halide emulsion layers make up a unit light-sensitive layer sensitive to any one of blue light, green light and red light. In multilayer silver halide color light-sensitive materials, the unit light-sensitive layers are usually provided in the order of a red-sensitive layer, a green-sensitive layer, and a blue-sensitive layer from the support. According to the purpose, this order of layers can be reversed, or two layers having the same color sensitivity can have a light-sensitive layer having different color sensitivity sandwitched therebetween. A light-insensitive layer can be provided between silver halide light-sensitive layers or as a top layer or a bottom layer.

A color negative film usually contains more than 10 kinds of tabular silver halide emulsions. Tabular silver halide emulsion grains (hereinafter simply referred to as tabular grains) have a tabular ratio of 25 or more, preferably 50 or more, the tabular ratio being defined as a quotient obtained by dividing an average circle-equivalent diameter by the square of an average thickness (defined as $ECD/t^2$ in JP-A-3-135335, the term "JP-A" as used herein means an "unexamined published Japanese patent application").

Tabular grains preferably have an average aspect ratio of 5 or more, the aspect ratio being defined as a quotient obtained by dividing a circle-equivalent diameter of two parallel main planes facing each other (i.e., the diameter of a circle having the same projected area as the main planes) by the distance between the main planes (i.e., the thickness of the grain). The average aspect ratio is a geometrical average of the individual grains.

Tabular silver halide emulsions to be used in a color reversal light-sensitive material, which is another type of color photographic materials to be processed, are preferably mono-dispersed emulsions having a coefficient of grain size distribution of not more than 20%. The terminology "coefficient of variation" as used herein denotes a value obtained by dividing a dispersion of the circle-equivalent diameter of the projected area of tabular grains (standard deviation) by a mean of the circle-equivalent diameter and multiplying the quotient by 100.

A silver halide emulsion in which the silver halide grains are regular in shape and shows small scatter of size displays an almost normal grain size distribution, from which a standard deviation can be obtained with ease. The grain size distribution of the tabular grains used in the present invention has a coefficient of variation of not greater than 20%, preferably not greater than 15%, still preferably 1 to 12%.

The diameter (circle-equivalent) of the tabular grains is generally 0.2 to 5 $\mu$m, preferably 0.3 to 3.0 $\mu$m, still preferably 0.3 to 2.0 $\mu$m. The thickness of the tabular grains is preferably 0.05 to 0.5 $\mu$m, still preferably 0.08 to 0.3 $\mu$m. The grain diameter and thickness can be measured based on the electron micrograph of the grains as taught in U.S. Pat. No. 4,434,226.

III. Development Processing:

III-1. Choice Between Basic Development Processing and Rapid Development Processing:

A choice between basic development and rapid development can be made in such a manner that (1) all the films are to be processed through rapid development processing except when a customer requests basic development or (2) all the films are to be processed through basic development processing except when a customer specifically requests to have his or her films processed rapidly. Such a choice can be made manually by an operator of a processing laboratory (04 in FIG. 1). On the other hand, where choice is determined in accordance with the kind of a film to be processed, the choice can be made either manually or via a film kind detector. In the latter case, the kinds of films which should be subjected to rapid processing are specified previously, and a choice is made in accordance with the DX code read from the film (while not shown by dotted line in FIG. 1).

III-2. Rapid Development Processing (03A in FIG. 1):

Rapid development processing is achieved most preferably by a simple increase of the speed of film transport. An excessive increase in speed of film transport results in so much increased deviations from the target photographic characteristics, and the load on image processing will so much increase. Therefore, it is preferred in practice that the speed of film transport be increased to 1.1 to 5 times, particularly 1.2 to 3 times, the standard speed of film transport adopted in basic development processing.

The apparatus for development processing can have two driving mechanisms as disclosed in JP-A-60-129748 and JP-A-61-134759 so that basic processing is carried out by one of them, and rapid processing by the other. It is also possible to instal two processors for carrying out basic processing and rapid processing separately.

A first embodiment of the present invention is characterized in that (1) a negative color film is subjected to simplified development processing comprising a color development step and a bleaching step but containing no fixing step (hereinafter referred to as fixing-omitted developing processing), (2) image information is photoelectrically read from the developed image and converted into electrical digital information, and (3) the digital information is image-processed to correct the image characteristics of the color negative film to target image characteristics that should have been obtained if the color negative film had been processed by basic development processing thereby to obtain image information having the same image quality as could have been obtained by basic development processing.

The term "image characteristics" as used herein includes various factors constituting image quality, i.e., gradient, color balance, maximum density ($D_{max}$), white background density ($D_{min}$), sharpness, and granularity. Therefore, in saying to the effect that "image characteristics are corrected to obtain image information having the same image quality as could be obtained in the basic development processing", it is meant that the above-mentioned various characteristics (image quality factors) composing the image information which is obtained by non-basic development processing (e.g., fixing-omitted development) are corrected to have the same image quality as possessed by the image information which is to be obtained by basic development processing. When the image quality is represented by objective photographic characteristic values which belong to the above-mentioned photographic characteristics constituting image quality and can be expressed based on measured density values, if the densities agree with target ones with a difference of within ±10%, the image quality can be said to be equal or the same.

As previously stated, development processing common to the color negative films available from various film makers generally comprises the steps of color development, bleaching, fixing, image stabilization, rinsing, and washing. In the first embodiment of the present invention, advances in processing speed can be achieved by omitting the fixing step. Omission of the fixing step generally leads to a reduction of processing time by 1.5 to 5 minutes. For example, when the omission is applied to a C41 formula of the first generation which is used in large integrated laboratories, the processing time is shortened 4 minutes and 20 seconds. However, an unfixed film cannot be printed as such because of opaque haze of residual silver halide grains. The gist of the first embodiment consists in reading the unfixed film photoelectrically by means of an image reading unit to obtain information inclusive of both image information and noise information, processing the information to extract the image information, which is further processed into target image information that is to be obtained by basic development processing, and furnishing the thus converted information to a positive image medium.

Prior art teaches that image reading is possible even when a bleaching step is omitted. According to the inventors's study, precision in image reading is higher when fixing is omitted as in the first embodiment than when bleaching is omitted. It is known that the covering power, i.e., the degree of opacity, of developed silver is higher than that of silver halide. This difference seems to the reason accounting for the high reading precision of the bleached but non-fixed film of the present invention in which developed silver has been converted to silver halide by bleaching to the prior art (U.S. Pat. No. 5,101,286) in which developed silver remains unconverted to silver halide. Another reason for the higher positive image quality of the present invention over the prior art seems to be as follows. In the prior art, since the color density and the silver density are superimposed to make the image density higher in the high density area, the reading precision in the high density area is reduced in nature of the limited capacity of reading image information. While, in the first embodiment of the invention, superimposition of developed silver is eliminated, offering a margin for detectable density. While these reasons have not been verified, they account for the results of the practice of the present invention, and the present invention exhibits apparent superiority to the relevant prior art in both low and high density areas in a reading range.

Image reading from the developed film does not always need to be done after completion of development processing and may be taken at any arbitrary stage after completion of bleaching and before drying, whereby the finishing time required for obtaining a color positive image such as a color print is further shortened. For example, the image can be read out on completion of the bleaching step, which will furnish the greatest possible reduction in time. In this case, the time of each of the steps of fixing, washing, image stabilization and drying can be shortened, generally affording reduction by 2 to 11 minutes in total, while somewhat varying depending on the conditions of the processing laboratory. In some laboratories, the total development processing time of a color negative film could be reduced nearly to the time required for a color printing step.

Because oxidation of developed silver to silver halide proceeds relatively rapidly in the bleaching step, it sometimes happens that the effect of the invention, i.e., an improvement in reading precision owing to the reduction in opacity is observed when half the prescribed bleaching time has passed. The present invention includes in its scope such an embodiment that the image is read out in the course of a bleaching step as long as the effect of the present invention has appeared by then.

Omission of a fixing step instead of omission of a bleaching step produces a still another advantage that the precision in reading an image density can further be improved by reading a reflection density. Since developed silver has been converted by bleaching to silver halide having a higher reflectance, image information can be obtained at a high precision even by reading the image through reflected light. While, in general, image reading from a color negative film is carried out by using transmitted light, the above-described advantage makes it possible to obtain sufficient reading precision with reflected light so that either of transmission density and reflection density can be chosen in image reading. The details of a reading unit using transmitted light or reflected light will be described later. Further, image processing of the image information based on the reflected light can be performed in the same manner as for the information based on the transmitted light, except for the coefficient of conversion used in converting the read-outs into the target characteristics, which will be explained later together with the image processing based on transmitted light.

Reduction of the coating weight of a silver halide emulsion in the color negative film used in the present invention brings about two advantages. One is a cost reduction by silver halide saving, and the other is a reduction in transmission density of silver halide remaining in a developed film. The reduction in transmission density of silver halide broadens the detectable range of the image reading unit, which improved the reading precision, leading to an improved image quality of the output positive image. Although a reduction in amount of silver halide directly leads to reduction in quantity of available image information on the other hand, this can be compensated for to a considerable extent because the image processing system integrated with the present invention has image emphasizing effects, such as contrast correction, outline emphasis, and contrast amplification in the minute image area, and a saturation emphasizing effect. Explanation of these functions of image processing will be complemented later with specific examples of the image reading unit.

The use of an image processing system according to the present invention makes it possible to reduce the coating weight of silver halide to 1.0 to 4.0 g, preferably 1.5 to 4.0 g, still preferably 2.0 to 3.5 g, in terms of silver, per $m^2$ of a color negative film. On a different scale, the coating weight of silver halide of a general commercially available color film, which is usually 4 to 8 g/$m^2$ in terms of silver, can be reduced by 20 to 70%.

Back to the image reading precision, the transmission density of silver halide of a bleached color negative film almost falls within a range of from 0.5 to 1.5, while varying according to the kind, and it decreases nearly proportionally with a decrease of the coating weight. Accordingly, a 50% cut of the coating weight brings a reduction of transmission density of silver halide (i.e., opacity) by 0.3 to 0.7, and the quantity of light entering the reading unit multiplies 2 to 4 times as a result.

It is also a great advantage of omitting fixing that a fixing solution is no more required and, of necessity, there is produced no waste fixing solution. Use of a color negative film having a reduced coating weight of a silver halide emulsion would bring about a further reduction in waste solution. According to a standard, common, and typical development formula for color negative films, the rates of replenishment in bleaching, low-throughput replenishment type washing, and image stabilization are 5 ml, 17 ml, and 15 ml, respectively, per 35-mm 24-exposure roll of film, totaling 37 ml. In the present invention, the above-described silver saving reduces the total to 20 ml or less, preferably 15 ml or less, thereby to make so much reduction in the waste solution.

Similarly, the waste solutions resulting from the whole processing according to the above-mentioned typical formula, totaling 60 ml per 35-mm 24-ex. roll of film, can be reduced to 50 ml or less, preferably 35 ml or less.

In cases where the films from which color prints have been obtained do not need to be kept, the amount of waste water and waste solutions can be reduced in not only the fixing step but in the washing and image stabilization steps. For example, when the fixing-omitted development processing is applied to a non-drainage type processor at a mini laboratory, the waste solution from the processor only consists of a waste bleaching solution that is generated even after regeneration by oxidation and a waste developing solution corresponding to the excess of a developing solution replenisher over the carryover from a color development step to the next step. The decrease of the waste solutions in amount achieved in this case exceeds 90% of the amount of the waste solutions discharged from common processing.

Omission of fixing also means no discharge of an ammonium salt. The nitrogen content in drainage is regulated globally. In photographic processing, ammonium thiosulfate in a fixing solution is a source of nitrogen. The discharge of nitrogen compounds can be reduced 80 to 85% by skipping fixation so that many processing laboratories can meet the regional regulations on the nitrogen discharge.

Further, a fixing solution has a higher COD than a color developing solution. Therefore the omission of fixing is highly effective in reducing the COD.

An additional advantage resulting from omission of fixing is guarantee for development quality in a processing slack period or at a small-sized processing laboratory. As previously mentioned, because the processing throughput is smaller in the slack period, the amount of a replenisher added to a development tank for every batch of films or photographic paper is smaller, and the solution replacement ratio decreases. As a result, sulfur compounds or dissolved silver salts undergo decomposition with extension of the retention time of the processing solutions in the respective processing tanks, causing sulfides and silver compounds to settle in a wash tank or an image stabilization tank. The precipitates tend to adhere to rollers or films while being developed to induce serious deterioration in product quality. The development processing system of the first embodiment is freed from precipitation of sulfides and silver salts by skipping fixing.

The fundamental technical idea of the first embodiment, gist of constituent factors and preferred embodiments thereof, and accompanying advantages have been described. The first embodiment will then be explained by referring to specific examples in the following order.

1A. Flow of basic steps of the image formation method

2A. Predevelopment step

3A. Development processing steps

1A. Flow of Basic Steps:

The first embodiment of the present invention is a method for forming a color image which is characterized in that (1) an exposed color film is subjected to fixing-omitted development processing, (2) image information recorded on the film and developed is read out and converted into electrical digital information, (3) the digital information is processed and corrected into target image characteristics that should have been obtained if the film had been processed by basic development processing, and (4) the corrected image information is output to a printer thereby to obtain a positive image having the same image quality as could be obtained by the basic development processing.

FIG. 1 is a block diagram showing the flow of the steps carried out at a processing laboratory. While not essential to this embodiment, a step (01) for identifying the kind of a film is provided prior to a development processing step. In step (01), the kind of a film can be detected by reading the identifying perforation symbols of the film called DX code. Based on the information of the kind, a choice is made on the conditions set for image processing hereinafter described. In some cases, a choice is also made here (02) between basic development processing (03) and fixing-omitted development processing (03A). The choice between basic processing and fixing-omitted processing may also be made by an operator based on predetermined standards regardless of the DX code (04). While in this embodiment fixing-omitted development processing is adopted, the DX code detecting step has a significance; for in some cases basic development processing is chosen in the practice of the present invention. As a matter of course, the first embodiment of the present invention can also be carried out by using a developing unit exclusively designed for fixing-omitted development processing.

After the developing conditions are chosen, the film is transferred through a series of processing tanks within a developing unit. Basic development processing for color negative films comprises the steps of color development, bleaching, fixing, washing, image stabilization, and drying and, if desired some other washing or rinsing steps. In this embodiment, the step of fixing is omitted therefrom. The color development step has large influences on photographic quality, whereas the fixing step is less influential on the photographic quality because, by then, a requisite color image has been formed, and the silver image which interferes with the color image has disappeared. Therefore, omission of the fixing step brings about a great reduction in development processing time with minimum load on the image processing hereinafter described. This is the background on which the inventors have reached the idea of omitting a fixing step.

The developed, bleached and washed and/or stabilized film is then transferred to a step of image information reading (step 1), where the transmission density of the developed film is measured for every pixel to read out the image information as a density of each pixel. The image information (densities) is thus converted to electrical image signals, which are amplified in an amplifier 17 and converted to digital signals via an A/D convertor 18. The digital signals are given corrections (19) for correcting CCD functions, such as correction of sensitivity variation among pixels and correction for a dark current, and then sent to an image processor unit 5 via a log convertor 20.

In the image processor unit, the digital image information is electrically processed into the digital image signals which should have been obtained if the film had been subjected to basic development processing. Where the film has been subjected to basic development processing, the image processing consists merely of correction of variations in photographing conditions, development processing or film characteristics to statistical center values, which has its own importance but is not the object of the present invention. As stated above, a film having been subjected to fixing-omitted development processing still contains silver halide so that its photographic characteristics, such as gradient, color balance, and minimum density $D_{min}$, show deviations from the target values which are to be obtained when the film is processed according to basic development processing. In the present invention, these deviations are corrected through image processing as hereinafter described. The above-mentioned image processing procedure can be carried out by the method and operation equipment disclosed in JP-A-10-20457 and JP-A-9-146247.

In what follows, the description goes into details with particular reference to the apparatus disclosed in the above-cited two inventions, but the image formation method of the present invention is by no means limited to the use of these apparatus.

The image signals corrected to the target photographic characteristics are output to an image output unit, i.e., a printer (8) and, as a result, a normal positive image is obtained. Any printer is useful as long as it accepts electrical image signals or photoelectrical image signals. Preferred printers include those for color prints, instant photographs or silver salt color prints (e.g., dye heat transfer type color prints), ink jet printers, sublimation type heat sensitive transfer printers, wax type heat transfer printers, and color electrophotographic printers.

Along the above-described outlines, the method and apparatus of the embodiment of using a fixing-omitted development processing system will be illustrated in more detail.

In saying that the image information or the positive image obtained through fixing-omitted development processing (i.e., non-basic development processing) is equal to that obtainable through basic development processing, it is meant that the photographic characteristics obtained in the former are substantially equal to those obtained in the latter. The equality in photographic characteristics is typically judged in terms of image density. More specifically, with an image density falling within a range of ±10% of a target value, the piece of image information is regarded as equal to the information that should have been obtained through basic development processing. The equality can be judged more directly by an average result of observations made by many non-biased observers.

2A. Predevelopment Step:

In the block diagram of FIG. 1 showing the development processing apparatus of the present invention and the flow of operations in the apparatus, films are fed to the apparatus from the left side of the diagram. The kind of the film is first detected by reading the perforation symbols for film identification called DX code. The conditions set for image processing (hereinafter described) could be corrected based on the information on kind thus obtained. That is, according to the kind of the film (as detected from the DX code), further corrections to the image processing conditions set before or after the image processing may result in better product quality. In such cases, corrections according to the kind information can be added to the set image processing conditions. In some cases, a choice is also made between basic development processing and fixing-omitted development processing. Such corrections are effective where the photographic characteristics of the developed image largely deviate from the target values, for example, where the development progress is slow as with the case of films having an ISO sensitivity of 1800 or where the coating weight of silver is so high that insufficient fixing might be incurred. The choice between basic development processing and fixing-omitted development processing can also be made manually by an operator regardless of the DX code information. It is a matter of course that the fixing-omitted development processing can be carried out by means of a developing unit exclusively designed therefor.

3A. Development Processing Steps:

After the developing conditions are chosen, the film is transferred to a developing unit. While not limiting, the developing unit preferably has a roller transport system from the standpoint of the connection of two adjacent steps. Taking the possible necessity of carrying out basic development processing into consideration, it is practical to use a developing unit basically designed for basic development processing and capable of making changeovers between basic development processing and fixing-omitted development processing.

The film is subjected to development processing comprising color development, bleaching, washing, and image stabilization and then transferred to the step of image information reading. The image reading could be conducted in the course of the development processing as mentioned above. In cases where the developed color films do not need to be kept, the washing step and the image stabilization step can also be skipped over, which will lead to considerable reduction of the environmental load.

The development processing can be carried out by using any of the materials and steps specifically described later. In particular, the development processing formulations according to CN16 series, C41 series and CNK4 series, which can be regarded as internationally common, are preferred. In the first embodiment of the present invention, the fixing step is omitted therefrom.

A second embodiment of the present invention is characterized in that (1) an exposed color film is subjected to color development and then to residual color reduction processing, skipping over a desilvering step (hereinafter referred to as desilvering-omitted development processing), (2) image information is photoelectrically read from the developed image and converted into electrical digital information, and (3) the digital information is processed and corrected into target image characteristics that should have been obtained if the film had been processed by basic development processing to obtain image characteristics equal to those obtainable by the basic development processing.

Basic development processing for color films comprises the steps of color development, bleaching, fixing, image stabilization and, if desired some washing or rinsing steps similarly to the development processing commonly used in the world. In the second embodiment, a step of desilvering, which generally comprises a bleaching step and a fixing step, is omitted for advances in processing speed. A bleaching solution used in basic development processing contains an oxidizing agent, such as an iron complex salt (e.g., EDTA-iron complex salts), and a halogenating agent, such as ammonium bromide, and functions to oxidize developed silver generated by development into silver halide. A fixing solution used in basic development processing contains a silver halide solvent, such as ammonium thiosulfate, with which silver halide is converted into a water-soluble silver salt and removed from a film. Therefore, if the desilvering step is omitted, the film contains a color image together with remaining silver halide and silver image and colloidal silver that has been originally present in the film. In the second embodiment, only the color image is extracted through image reading and image processing as hereinafter described.

Prior art teaches that image reading is possible even if a bleaching step is omitted. According to the inventors's study, image reading with precision is also possible even when both bleaching and fixing are omitted, and the time for obtaining an image can further be shortened. In this case, admittedly, the imagewise distribution of developed silver is superimposed on the color image to increase the image density in the high density area, and the image reading precision in the high density area is reduced in nature of the limited capacity of reading image information. On the other hand, the reversal imagewise distribution of silver halide is superimposed on the background to increase the background density ($D_{min}$). Such restrictions in both high and low density areas narrow the detectable density range, thus narrowing the exposure latitude. In the present invention, however, it has been proved that the disadvantage accompanying omission of desilvering, namely, reductions in reading precision and exposure latitude, can be improved greatly by carrying out residual color reduction processing, whereby practical levels of reading precision and exposure latitude can be maintained even if desilvering is skipped. That is, the gist of the second embodiment of the present invention resides in the residual color reduction processing instead of desilvering.

Spectral sensitizers in a film generally have low solubility and are liable to remain in the film, which is the main cause of color remaining. JP-A-3-101728 teaches that addition of a specific mercaptotetrazole to a fixing solution accelerates dissolution of spectral sensitizers present in a black-and-white light-sensitive material. The inventors of the present invention invented a residual color reduction process which uses a specific mercaptotetrazole and succeeded in reducing the color remaining thereby making it feasible to omit the desilvering step. Details of the residual color reduction processing will be given later.

In the second embodiment, reduction in capacity of reading a developed film due to omission of desilvering can be compensated for by the residual color reduction processing. Additionally, the reduction in image reading capacity can also be compensated for by reading images through measurement on reflection density. Reflected light exhibits higher contrast between image areas and nonimage areas so that image reading using reflected light enjoys an improved precision. While, in general, image reading from a color negative film is carried out by using transmitted light, sufficient reading precision can be secured with reflected light in this embodiment so that either of transmission density and reflection density can be chosen. The details of a reading unit using transmitted light or reflected light will be described later. Further, image processing of the image information based on the reflected light can be performed in the same manner as for the information based on the transmitted light, except for the coefficient of conversion used in converting the read-outs into the target characteristics, which will be explained later together with the image processing based on transmitted light.

In the second embodiment, too, reduction of the coating weight of a silver halide emulsion in the color negative film brings about the same two advantages as observed in the first embodiment, i.e., a cost reduction by silver halide saving and a reduction in transmission density of a developed film.

As a result of adopting an image reading system, the coating weight of silver halide can be reduced to 1.0 to 4.0 g, preferably 1.2 to 3.5 g, still preferably 1.5 to 3.0 g, in terms of silver, per $m^2$ of a color negative film.

Back to the image reading precision, the transmission density of the nonimage area of a developed but non-desilvered color negative film almost falls within a range of from 1.5 to 4.5, while varying according to the kind, and it decreases nearly proportionally with a decrease of the coating weight. Accordingly, a 20% cut of the coating weight brings a reduction of transmission density by 0.3 to 0.9, and the quantity of light entering the reading unit multiplies 2 to 8 times as a result.

The processing time required from the start of development of a negative film for obtaining a positive image can be shortened by omitting desilvering, but the time shortened is not generally defined because even the globally common processing, on which basic development processing is based, varies in processing time depending on the scale or conditions of a processing laboratory. In general, the processing time can be shortened about 2 to 12 minutes. For example, when the omission is applied to a C41 formula of the first generation which is one of the standards used in large integrated laboratories, the processing time is shortened 10 minutes and 50 seconds.

Where the developed color films do not need to be kept, the image stabilization step can also be skipped, which will afford further shortening by 40 seconds to 2 minutes.

It is possible to read image information from the developed color negative film at any arbitrary stage after completion of residual color reduction processing and before drying, whereby the processing time required for obtaining a color positive image such as a color print is further shortened. In this case, if the residual color reduction processing needs, for example, 50 seconds, the time of the steps of washing or water-saving type washing, image stabilization, and drying (taking 1 to 3 minutes) can be shortened, totally by 4 to 11 minutes. Thus, the total processing time of a color negative film can be reduced nearly to that of a color printing step.

Because desilvering is not carried out, neither a waste bleaching solution nor a waste fixing solution is produced, which is an advantage of itself. A considerable reduction in waste solutions is expected. Use of a color negative film having a reduced coating weight of a silver halide emulsion would bring about a further reduction in waste solutions. According to a standard and common development formula for color negative films, the total amount of waste solutions from processing tanks is 45 to 200 ml per 35-mm 24-ex. roll of film (135-24 format). For example, in a standard development processing formula, the rates of replenishment in bleaching, fixing, water-saving type washing, and image stabilization are 5 ml, 8 ml, 17 ml, and 15 ml, respectively, per 35-mm 24-ex. roll of film, totaling 45 ml. When, in the second embodiment, the step of image stabilization is also omitted, only a development step and a residual color reduction step are dipping steps, and the total amount of waste solutions could be reduced to 60 ml or less, preferably 10 to 30 ml, per 35-mm 24-ex. roll of film.

Incidentally, a waste color developing solution is excluded from the consideration in the above-described explanation on waste solutions for the following reason. Since a color negative film is, while dry, put into a color developing solution. In a low-throughput replenishment system, the increase of the color developing solution in volume due to replenishment is mostly offset by the carryover from the color development step to the next step. As a result, the difference between the carryover and the excess of the developing solution which corresponds to the rate of replenishment and becomes a waste solution is relatively small. It is understood that a low-throughput replenishment system for color development as well as omission of desilvering makes a great contribution to reduction of waste solutions.

To conduct no desilvering (bleaching nor fixing) also means no discharge of an ammonium salt. The nitrogen content in drainage is regulated globally. In photographic processing, an (EDTA)iron ammonium complex salt or a (PDTA)iron ammonium salt in a bleaching solution and ammonium thiosulfate in a fixing solution are sources of nitrogen. The discharge of nitrogen compounds can be reduced 90 to 97% by omitting desilvering so that the nitrogen discharge can be lowered than the limit locally regulated at many processing laboratories.

An additional advantage resulting from omission of fixing is that a processing laboratory can cope effectively with a processing slack period. As previously mentioned, the solution replacement ratio decreases in a slack period because of the smaller processing throughput. As a result, processing solutions are liable to undergo decomposition with extension of the retention time in the respective processing tanks. In particular, sulfides resulting from decomposition of a thiosulfate and dissolved silver precipitate in a wash tank, a stabilization tank substituting for washing, or an image stabilization tank. The precipitates contaminate not only the racks but the films to induce serious deterioration in product quality. This drawback can be avoided by omitting fixing.

The fundamental technical idea of the second embodiment, the gist of constituent factors and preferred embodiments thereof, and accompanying advantages have been described. The second embodiment will then be explained by referring to specific examples in the following order.

1B. Flow of basic steps of the image formation method

2B. Predevelopment step

3B. Development processing steps

1B. Flow of Basic Steps:

The second embodiment of the present invention is a method for forming a color image which is characterized in that (1) an exposed color film is subjected to desilvering-omitted development processing (including a residual color reduction step), (2) image information recorded on the film and developed is read out and converted into optical or electrical digital information, (3) the digital information is processed and corrected into target image characteristics that should have been obtained if the film had been processed by basic development processing, and (4) the image characteristics are output to a printer thereby to obtain a positive image having the same quality as could be obtained by the basic development processing.

FIG. 1 is a block diagram showing the flow of the steps carried out at a processing laboratory. While not essential to this embodiment, a step (01) for identifying the kind of the films is provided prior to a development processing step. In step (01), the kind of the film can be detected by reading the identifying perforation symbols of each film called DX code. Based on the information on kind, a choice is made among the set conditions for image processing hereinafter described. In some cases, a choice is also made here (02) between basic development processing (03) and desilvering-omitted development processing (03A). The choice between basic processing and desilvering-omitted processing may also be made by an operator based on predetermined standards regardless of the DX code (04). While the second embodiment relates to desilvering-omitted development processing, the DX code detecting step has a significance; for in some cases basic development processing is chosen. As a matter of course, the second embodiment of the present invention can also be carried out by using a developing unit exclusively designed for desilvering-omitted development processing.

After the developing conditions are chosen, the film is transferred through a series of processing tanks within a developing unit. Basic development processing for color negative films comprises the steps of color development, bleaching, fixing, washing, image stabilization, and drying and, if desired some other washing or rinsing steps. In this embodiment, the step of desilvering (bleaching and fixing) is omitted from the basic development processing and, instead, a residual color reduction bath is provided. The image stabilization step can also be omitted. Although omission of desilvering is disadvantageous in that the background density ($D_{min}$) increases due to superimposition of remaining developed silver and silver halide, the desilvering step is less influential on a color image than the color development step having large influences on photographic quality. Even if the desilvering step is skipped over, the resultant image distortion is small so that image reading with a practical level of precision is not impossible, and the reading precision is expected to increase as color remaining decreases. This is the background on which the inventors have reached the idea of omitting a desilvering step.

The film having been subjected to development processing comprising color development and residual color reduction processing is then transferred to a step of image information reading (step 1), where the transmission density of the developed film is measured for every pixel to read out the image information as a density of each pixel. The image information (densities) is thus converted to electrical image signals, which are amplified in an amplifier 17 and converted to digital signals via an A/D convertor 18. The digital signals are given corrections (19) for correcting CCD functions, such as correction of sensitivity variation among pixels and correction for a dark current, and then sent to an image processor unit 5 via a log convertor 20.

In the image processor unit, the digital image information is electrically processed into the digital image signals which should have been obtained if the film had been subjected to basic development processing. Where the film has been subjected to basic development processing, the image processing consists merely of correction of variations in photographing conditions, development processing or film characteristics to statistical center values, which has its own importance but is not the object of the present invention. As stated above, a film having been subjected to desilvering-omitted development processing still contains developed silver and silver halide so that its photographic characteristics, such as gradient, color balance, and minimum density $D_{min}$, show deviations from the target values which are to be obtained when the film is processed according to basic development processing. In the present invention, these deviations are corrected through image processing as hereinafter described. The above-mentioned image processing procedure can be carried out by the method and operation equipment disclosed in JP-A-10-20457 and JP-A-9-146247 (U.S. Ser. No. 08/701,018).

In what follows, the description goes into details with particular reference to the apparatus disclosed in the above-cited two inventions, but the image formation method of the present invention is by no means limited to the use of these apparatus.

The image signals corrected to the target photographic characteristics are output to an image output unit, i.e., a printer (8) and, as a result, a normal positive image is obtained. Any printer is useful as long as it accepts electrical image signals or photoelectrical image signals. Preferred printers include those for color prints, instant photographs or silver salt color prints (e.g., dye heat transfer type color prints), ink jet printers, sublimation type heat sensitive transfer printers, wax type heat transfer printers, and color electrophotographic printers.

Along the above-described outlines, the method and apparatus of the embodiment of using a desilvering-omitted development processing system will be illustrated in more detail.

The quality of the image obtained through desilvering-omitted development processing (i.e., non-basic development processing) is equal to that obtainable through basic development processing. The term "equal quality" as used herein means that the density values, which furnish a basis of photographic characteristics constituting image quality, such as gradient, $D_{min}$, $D_{max}$, and color balance, are within a range of ±10% of target values. The equality can be judged more directly by an average result of observations made by many non-biased observers.

2B. Predevelopment Step:

In the block diagram of FIG. 1 showing the development processing apparatus of the present invention and the flow of operations in the apparatus, films are fed to the apparatus from the left side of the diagram. The kind of the film is first detected by reading the perforation symbols for film identification called DX code. The set conditions for image processing could be corrected based on the information on kind thus obtained. That is, according to the kind of the film (as detected from the DX code), corrections to the image processing conditions set before or after the image processing may result in better product quality. In such cases, corrections according to the information on kind can be added to the set image processing conditions. In some cases, a choice is also made between basic development processing and desilvering-omitted development processing. The choice between basic development processing and desilvering-omitted development processing can also be made manually by an operator regardless of the DX code information. It is a matter of course that the second embodiment can be carried out by means of a developing unit exclusively designed for desilvering-omitted development processing.

3B. Development Processing Steps:

After the developing conditions are chosen, the film is transferred to a developing unit. While not limiting, the developing unit preferably has a roller transport system from the standpoint of the connection between two adjacent steps. Taking the possible necessity of carrying out basic development processing into consideration, it is practical to use a developing unit basically designed for basic development processing and capable of making changeovers between basic development processing and desilvering-omitted development processing (in which bleaching and fixing steps are omitted, and a low-throughput replenishment type washing bath is replaced with a residual color reduction bath). That is, it is desirable that the film be subjected to development processing comprising color development and residual color reduction process and otherwise to basic development processing. The developing unit designed exclusively for the desilvering-omitted development processing can also be used. The developed film is then transferred to the step of image information reading. The image reading could be conducted in the course of the development processing as mentioned above.

The development processing can be carried out by using any of the materials and steps specifically described later. In particular, the development processing formulations according to CN16 series, C41 series and CNK4 series, which are most commonly employed, are preferably used with necessary modifications. In the second embodiment of the present invention, the bleaching and fixing steps are omitted therefrom, and the water-saving type washing bath is replaced with a residual color reduction bath.

As stated previously, color remaining is chiefly caused by spectral sensitizers that are slow in dissolving in a processing solution. Color negative films often contain anti-halation dyes, irradiation neutralizing dyes, and dyes having a filtering action in addition to the spectral sensitizers. In the practice the dyes to be added are selected from those having relatively good solubility. However, carbocyanine or dicarbocyanine spectral sensitizers having a benzothiazolyl nucleus, a benzoxazolyl nucleus, a benzimidazolyl nucleus, a naphthothiazolyl nucleus, etc. have poor solubility and have been a chief cause of color remaining.

A residual color reduction bath used in the second embodiment has the function of a washing bath and therefore can substitute for a washing bath. Additionally, the residual color reduction bath functions in reducing color remaining. This additional function can be imparted by adding a specific compound having a specific effect in reducing color remaining. As is understood from the above explanation, the residual color reduction bath has a composition comprising a low-throughput replenishment type washing bath combined with a compound capable of reducing color remaining. The residual color reduction processing can be carried out at the same rate of replenishment as with a low-throughput replenishment type washing. A preferred rate of replenishment is 2 to 40 ml, particularly 3 to 20 ml, per 35-mm, 24-ex. roll of film.

The compound having a residual color reducing action is required to be soluble in a water-saving type washing bath, to have an action of accelerating dissolving and removing spectral sensitizers from the light-sensitive layers of a color film, and to have no adverse influences on the image storage characteristics of a developed film. Compounds satisfying these requirements preferably include heterocyclic compounds having at least one thiol group per molecule. Mercaptoazoles are still preferred. Of mercaptotetrazoles particularly excellent are 5-mercaptotetrazoles having an aminoalkyl group at the 1-position, being represented by formula (I):

(I)

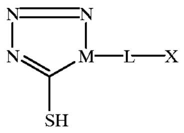

wherein X represents an amino group or an ammonium group; L represents an alkylene group; and M represents a hydrogen atom or an alkali metal.

In formula (I), the amino group as represented by X may have a substituent. Preferred substituents include an alkyl group having 1 to 6 carbon atoms, a hydroxyalkyl group having 2 to 6 carbon atoms, a sulfoalkyl group having 2 to 6 carbon atoms, a carboxyalkyl group having 2 to 10 carbon atoms, an alkanesulfonylalkyl group having 2 to 6 carbon atoms, an acyl group having 1 to 10 carbon atoms, an arenesulfonyl group having 6 to 10 carbon atoms, and an alkoxyalkyl group having 2 to 10 carbon atoms. The substituents on the amino group may be linked to each other to form a cyclic amino group.

The ammonium group as X may have a substituent. Preferred substituents include an alkyl group having 1 to 6 carbon atoms, a hydroxyalkyl group having 2 to 6 carbon atoms, a sulfoalkyl group having 2 to 6 carbon atoms, a carboxyalkyl group having 2 to 10 carbon atoms, an alkanesulfonylalkyl group having 2 to 6 carbon atoms, and an alkoxyalkyl group having 2 to 10 carbon atoms. The substituents on the ammonium group may be linked to each other to form a cyclic ammonium-group.

The alkylene group as L preferably contains 2 to 8 carbon atoms. It may contain an oxygen atom or a sulfur atom in the chain thereof.

The alkali metal as M includes sodium and potassium.

Specific examples of the compound represented by formula (I) are shown below for only illustrative purposed but not for limitation.

I-1

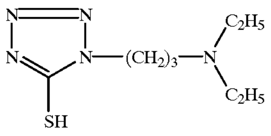

I-2

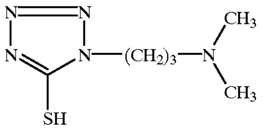

I-3

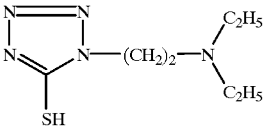

-continued

I-4

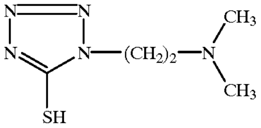

I-5

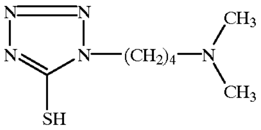

I-6

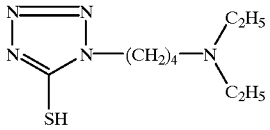

I-7

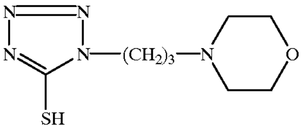

I-8

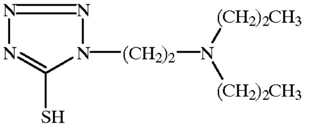

I-9

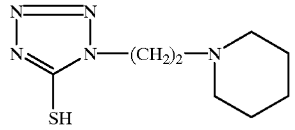

I-10

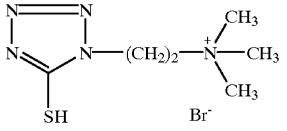

I-11

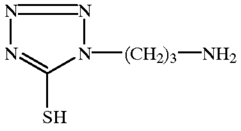

I-12

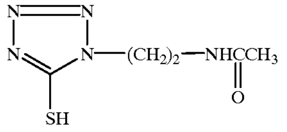

The compounds of formula (I) can be synthesized by the processes described in JP-A-51-1475 and JP-A-53-50169.

The compound of formula (I) is present in the residual color reduction bath in a concentration of $5\times10^{-5}$ mol/l to $1\times10^{-1}$ mol/l, preferably $1\times10^{-4}$ mol/l to $5\times10^{-2}$ mol/l, still preferably $1\times10^{-3}$ mol/l to $2\times10^{-2}$ mol/l.

The residual color reduction bath can further contain additive compounds which are usually added to a washing bath or a stabilizing bath substituting for washing. Such compounds include antifungal or bactericidal agents, such as isothiazolone compounds described in JP-A-57-8542, thiabendazoles, chlorinated isocyanurates described in JP-A-61-120145, and benzotriazoles described in JP-A-61-

267761; water softeners which sequester alkaline earth metals, etc., such as 1-hydroxy-1,1-diphosphonic acid, ethylenediamine-4-methylenephosphonic acid, and EDTA; and surface active agents for improving drainage. The amount of these additives is desirably as low as is consistent with effectiveness and usually not more than 10 mmol/l, preferably not more than 5 mmol/l.

The residual color reduction bath has a pH ranging from 3 to 10, preferably from 4 to 8, and is often used at a pH of about 4 to 5.

Other details of the residual color reduction bath will be complemented by the detailed description on a washing bath and a stabilizing bath substituting for a washing bath hereinafter given.

The processing time of the residual color reduction bath is the same as with the low-throughput replenishment type washing bath used in basic development processing. While somewhat varying depending on the type of a developing unit, it is usually preferable, in the case of a developing unit used in mini laboratories, that the residual color reduction processing is carried out in a single tank for a dipping time of 20 to 30 seconds or in two tanks connected in series for 20 to 30 seconds in each tank. The number of tanks can be increased, and the dipping time can be extended.

The processing temperature of the residual color reduction bath can be the same as for the low-throughput replenishment type washing bath used in basic development processing. It is usually 38° C. and can be selected appropriately from the range of from 34° to 45° C.

The degree of stirring of the residual color reduction bath does not need to be particularly enhanced and can be the same as in the low-throughput replenishment type washing bath used in basic development processing. The stirring effect by a roller transport system fitted to a general color film developing unit and a circulation system of a tank will be sufficient.

In a third embodiment of the present invention, (1) an exposed color film is subjected to development processing containing no bleaching step, (2) image information recorded on the film and developed is read out and converted into optical or electrical digital information, and (3) the digital information is image processed into target image characteristics that should have been obtained if the color film had been processed by basic development processing to obtain a positive image having the same image quality as could be obtained by the basic development processing.

The third embodiment will be explained in more detail in the following order.

1C. Flow of basic steps of the image formation method

2C. Predevelopment step

3C. Development processing steps

1C. Flow of Basic Steps:

The third embodiment of the present invention is a method for forming a color image which is characterized in that (1) an exposed color film is subjected to simplified development processing containing no bleaching step (hereinafter referred to as bleaching-omitted development processing), (2) image information recorded on the film and developed is read out and converted into optical or electrical digital information, (3) the digital information is processed into target image characteristics that should have been obtained if the film had been processed by basic development processing, and (4) the resulting image characteristics are output to a printer thereby to obtain a positive image having the same image quality as could be obtained by the basic development processing.

FIG. 1 is a block diagram, in which the typical flow of the steps carried out in the present invention is shown. A step for identifying the kind of the film (step 01) is provided prior to a development processing step. In step (01), the kind of the film can be detected by reading the identifying perforation symbols of each film called DX code. Based on the information on kind thus obtained, a choice is made among the conditions set for image processing hereinafter described in step. In some cases, a choice is also made here (02) between basic development processing and bleaching-omitted development processing. The choice between basic processing and bleaching-omitted processing may also be made by an operator based on predetermined standards regardless of the DX code (04). While the third embodiment relates to bleaching-omitted development processing, the DX code detecting step has a significance; for in some cases basic development processing is to be chosen.

After the developing conditions are chosen, the film is transferred through a series of processing tanks within a developing unit. Basic development processing for color negative films comprises the steps of color development, bleaching, fixing, washing or image stabilization, and drying and some other washing or rinsing steps. In this embodiment, the step of bleaching is omitted from the basic development processing. The color development step has large influences on photographic quality, whereas the bleaching step is less influential on the photographic quality because, by then, a requisite color image has been formed. Therefore, omission of the bleaching step brings about a great reduction in development processing time with minimum load on the image processing hereinafter described. This is the background on which the inventors have reached the idea of omitting a bleaching step.

The developed, fixed, and washed and/or stabilized film is then transferred to a step of image information reading (step 1), where the transmission density of the developed film is measured for every pixel to read out the image information as a density of each pixel. The image information (densities) is thus converted to electrical image signals, which are amplified in an amplifier 17 and converted to digital signals via an A/D convertor 18. The digital signals are given corrections (19) for correcting CCD functions, such as correction of sensitivity variation among pixels and correction for a dark current, and then sent to an image processor unit 5 via a log convertor 20.

In the image processor unit, the digital image information is electrically processed into the digital image signals which should have been obtained if the film had been subjected to basic development processing. Where the film has been subjected to basic development processing, the image processing merely means correction of variations in photographing conditions, development processing or film characteristics to statistical center values, which has its own importance but is not the object of the present invention. The developed film having been subjected to bleaching-omitted development processing still contains developed silver. Further, the developed film shows slow fixation probably because of the co-existence of silver halide and developed silver and therefore, even after being processed with a fixing solution, still contains silver halide remaining unremoved. It also contains residual spectral sensitizers or dyes remaining unwashed and, where the film has a yellow filter layer comprising colloidal silver, it also shows a blue light absorption by the colloidal silver. As a result, its photographic characteristics, such as gradient, color balance, and minimum density $D_{min}$, show deviations from the target values which are to be obtained when the film is processed according to basic development processing. In the present invention, these deviations are corrected through image processing as hereinafter described. The image processing procedure can be carried out by the method and operation equipment disclosed in JP-A-10-20457 and JP-A-9-146247 (U.S. Ser. No. 08/701,018. In what follows, the description goes into details with particular reference to the apparatus disclosed in the above-cited two inventions, but the image formation method of the present invention is by no means limited to the use of these apparatus.

The image signals corrected to the target photographic characteristics are output to an image output unit, i.e., a printer (8) and, as a result, a normal positive image is obtained. Any printer is useful as long as it accepts electrical image signals or photoelectrical image signals. Preferred printers include those for color prints, instant photographs or silver salt color prints (e.g., dye heat transfer type color prints), ink jet printers, sublimation type heat sensitive transfer printers, wax type heat transfer printers, and color electrophotographic printers.

Along the above-described outlines, the method and apparatus of the embodiment of using a bleaching-omitted development processing system will be illustrated in more detail.

In saying that the image information or the positive image obtained through bleaching-omitted development processing (i.e., non-basic development processing) is equal to that obtainable through basic development processing, it is meant that the photographic characteristics obtained in the former are substantially equal to those obtained in the latter. The equality in photographic characteristics is typically judged in terms of image density. In this case, if the image density falls within a range of ±10% of a target value, the piece of image information is regarded as equal to the information that should have been obtained through basic development processing. The equality can be judged more directly by an average result of observations made by many non-biased observers.

2C. Predevelopment Step:

In the block diagram of FIG. 1 showing the development processing apparatus of the present invention and the flow of operations in the apparatus, films are fed to the apparatus from the left side of the diagram. The kind of the film is first detected by reading the perforation symbols for film identification called DX code. The conditions set for image processing could be corrected based on the information on film kind thus obtained. That is, according to the kind of the film (as detected from the DX code), corrections to the image processing conditions set before or after the image processing may result in better product quality. In such cases, corrections according to the information on kind can be added to the set image processing conditions. In some cases, a choice is also made between basic development processing and bleaching-omitted development processing. Such corrections are effective where the photographic characteristics largely deviate from those obtainable by basic development processing, for example, where the development progress is slow as with the case of films having an ISO sensitivity of 1800 or where the coating weight of silver is so high that omission of bleaching might incur underfixing. The choice between basic development processing and bleaching-omitted development processing can also be made manually by an operator regardless of the DX code information.

3C. Development Processing Steps:

After the developing conditions are chosen, the film is transferred to a developing unit. While not limiting, the developing unit preferably has a roller transport system from the standpoint of the connection between two adjacent steps. Taking the possible necessity of carrying out basic development processing into consideration, it is practical to use a developing unit basically designed for basic development processing and capable of making changeovers between basic development processing and bleaching-omitted development processing. That is, the film is subjected to development processing comprising color development, fixing, and washing or stabilization. The developed film is then transferred to the step of image information reading.

The development processing can be carried out by using any of the materials and steps specifically described later. In particular, the development processing formulae according to CN16 series, C41 series and CNK4 series, which are most commonly employed, are preferred. In the third embodiment of the present invention, the bleaching step is omitted from these formulae.

It is considered that omission of bleaching can retard fixing in some kinds of films. Unclear as it is whether the retardation of fixing has any connection, it has been proved that addition of a fixing accelerator to a fixing solution brings about improved positive image quality thereby enhancing the effects of the present invention. Any of known fixing accelerator, such as thiocyanates, imidazoles and thioethers, is effective for this purpose. Particularly effective of the known fixing accelerators are compounds represented by formula (F1), (FII) and (FIII):

(F1)

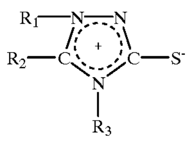

wherein $R_1$, $R_2$, and $R_3$ each represents a hydrogen atom, an alkyl group, a cycloalkyl group, an alkenyl group, an alkynyl group, an aralkyl group, an aryl group, a heterocyclic group, an amino group, an acylamino group, a sulfonamido group, a ureido group, a sulfamoylamino group, an acyl group, a thioacyl group, a carbamoyl group or a thiocarbamoyl group; with the proviso that $R_1$ and $R_2$ do not represent a hydrogen atom simultaneously.

(FII)

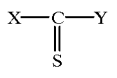

wherein X and Y each represent an alkyl group, an alkenyl group, an aralkyl group, an aryl group, a heterocyclic group, $—N(R_{11})R_{12}$, $—N(R_{13})N(R_{14})R_{15}$, $—OR_{16}$ or $—SR_{17}$; X and Y may be taken together to form a ring; with the proviso that at least one of X and Y is substituted with at least one of a carboxyl group or a salt thereof, a sulfo group or a salt thereof, a phospho group or a salt thereof, an amino group, an ammonium group, and a hydroxyl group; $R_{11}$, $R_{12}$, $R_{13}$, $R_{14}$, and $R_{15}$ each represent a hydrogen atom, an alkyl group, an alkenyl group, an aralkyl group, an aryl group or a heterocyclic group; and $R_{16}$ and $R_{17}$ each represent a hydrogen atom, a cation, an alkyl group, an alkenyl group, an aralkyl group, an aryl group or a heterocyclic group.

(FIII)

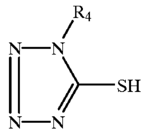

wherein $R_4$ represents a hydroxyalkyl group.

In formula (FI), the alkyl, cycloalkyl, alkenyl, alkynyl, aralkyl or aryl group as $R_1$, $R_2$ and $R_3$ preferably contains 1 to 10 carbon atoms. $R_1$, $R_2$ and $R_3$ are each preferably a hydrogen atom or an alkyl group having 1 to 5 carbon atoms. $R_1$, $R_2$ and $R_3$ can have a substituent. Preferred substituents include a hydroxyl group, an amino group, a sulfo group, a carboxyl group, a nitro group, a phospho group, a halogen atom, an alkoxy group, a mercapto group, a cyano group, an alkylthio group, a sulfonyl group, a carbamoyl group, a carbonamido group, a sulfonamido group, an acyloxy group, a sulfonyloxy group, a ureido group, and a thioureido group. It is preferred that at least one of $R_1$, $R_2$ and $R_3$ be an alkyl group substituted with a water-soluble group. The term "water-soluble group" as used herein means a hydroxyl group, an amino group, a sulfo group, a carboxyl group or a phospho group, and the alkyl group preferably has 1 to 4 carbon atoms. It is still preferred that at least one of $R_1$, $R_2$ and $R_3$ be an alkyl group substituted with a sulfo group or a carboxyl group. If desired, the above-described groups may have two or more substituents.

Specific but non-limiting examples of the compounds represented by formula (F1) are shown below.

FI-1

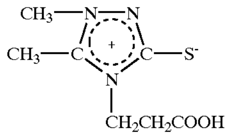

FI-2

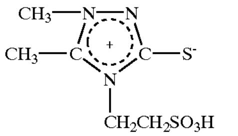

FI-3

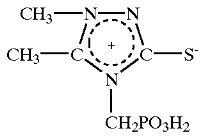

FI-4

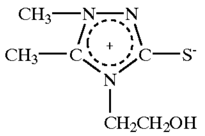

FI-5

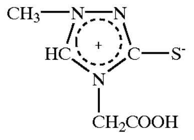

FI-6

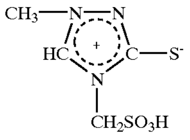

FI-7

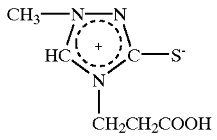

FI-8

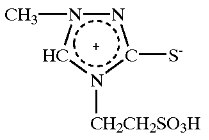

FI-9

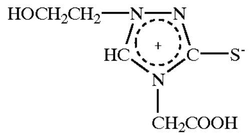

FI-10

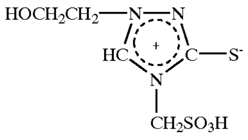

-continued

FI-11

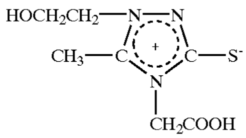

FI-12

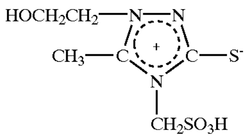

FI-13

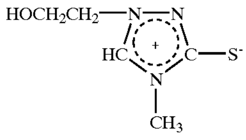

FI-14

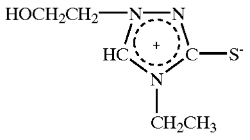

FI-15

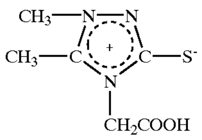

FI-16

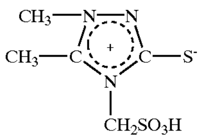

FI-17

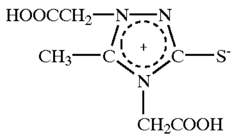

FI-18

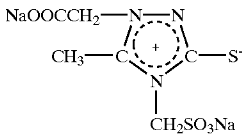

FI-19

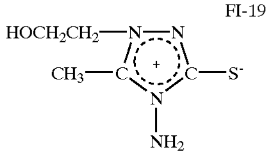

FI-20

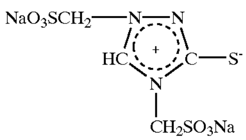

FI-21

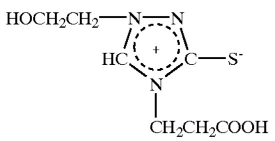

FI-22

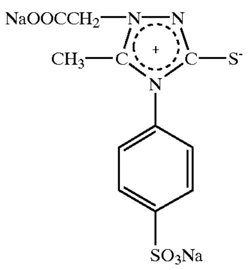

FI-23

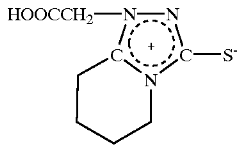

FI-24

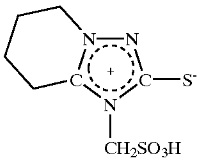

FI-25

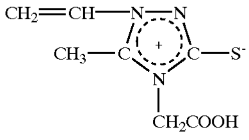

FI-26

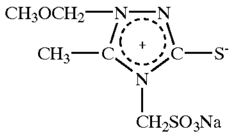

FI-27

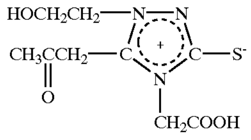

FI-28

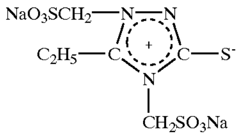

-continued

FI-29

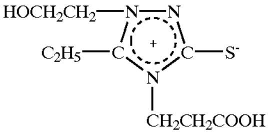

FI-30

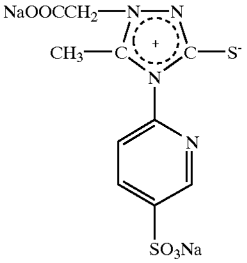

FI-31

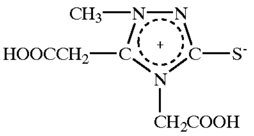

FI-32

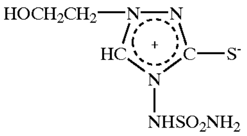

FI-33

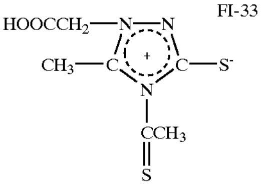

FI-34

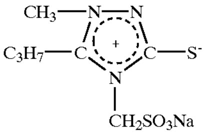

FI-35

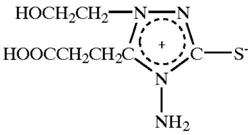

FI-36

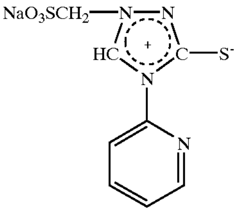

FI-37

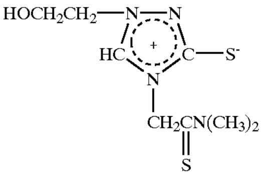

FI-38

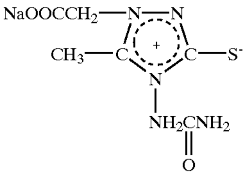

FI-39

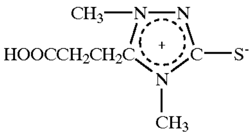

FI-40

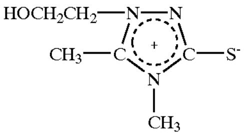

FI-41

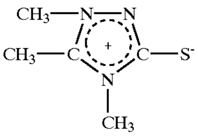

FI-42

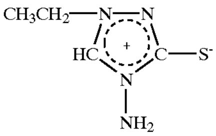

FI-43

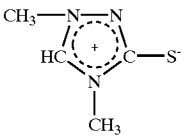

FI-44

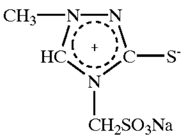

-continued

FI-45

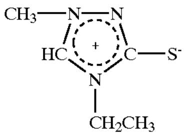

FI-46

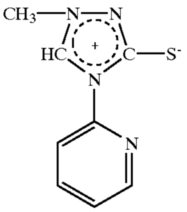

FI-47

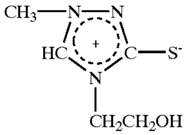

FI-48

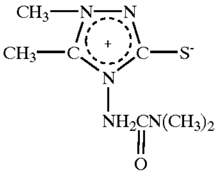

FI-49

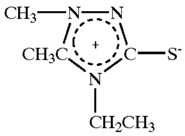

FI-50

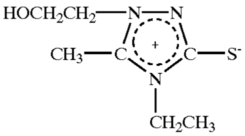

The compound of formula (FI) can be synthesized by the processes described in *J. Heterocyclic Chem.*, Vol. 2, p. 105 (1965), *J. Org. Chem.*, Vol. 32, p. 2245 (1967), *J. Chem. Soc.*, p. 3799 (1969), JP-A-60-87322, JP-A-60-122936, JP-A-60-117240, and JP-A-4-143757.

In formula (FII), the alkyl, alkenyl, aralkyl, aryl or heterocyclic group as represented by X, Y, $R_{11}$, $R_{12}$, $R_{13}$, $R_{14}$, $R_{15}$, $R_{16}$ or $R_{17}$ includes a substituted or unsubstituted alkyl group having 1 to 10 carbon atoms (e.g., methyl, ethyl, propyl, hexyl, isopropyl, carboxyethyl, sulfoethyl, aminoethyl, dimethylaminoethyl, phosphonopropyl, carboxymethyl, and hydroxyethyl); a substituted or unsubstituted alkenyl group having 2 to 10 carbon atoms (e.g., vinyl, propynyl, and 1-methylvinyl); a substituted or unsubstituted aralkyl group having 7 to 12 carbon atoms (e.g., benzyl, phenethyl, 3-carboxyphenylmethyl and 4-sulfophenylethyl); a substituted or unsubstituted aryl group having 6 to 12 carbon atoms (e.g., phenyl, naphthyl, 4-carboxyphenyl, and 3-sulfophenyl); and a substituted or unsubstituted heterocyclic group having 1 to 10 carbon atoms, such as 5- or 6-membered heterocyclic groups (e.g., pyridyl, furyl, thienyl, imidazolyl, pyrrolyl, pyrazolyl, pyrimidinyl, quinolyl, piperidyl, and pyrrolidyl).

The cation represented by $R_{16}$ or $R_{17}$ includes an alkali metal and ammonium group. The ring which is formed of X and Y includes an imidazoline-2-thione ring, an imidazolidine-2-thione ring, a thiazoline-2-thione ring, a thiazolidine-2-thione ring, an oxazoline-2-thione ring, an oxazolidine-2-thione ring, and a pyrrolidine-2-thione ring; and benzo-condensed rings derived therefrom.

At least one of X and Y is substituted with at least one of a carboxyl group or a salt thereof (e.g., a salt with an alkali metal or ammonium), a sulfo group or a salt thereof (e.g., a salt with an alkali metal or ammonium), a phospho group or a salt thereof (e.g., a salt with an alkali metal or ammonium), an amino group (e.g., unsubstituted amino, dimethylamino, methylamino or a hydrochloride of dimethylamino), an ammonium group (e.g., trimethylammonium or dimethylbenzylammonium), and a hydroxyl group.

The alkyl, alkenyl, aralkyl, aryl or heterocyclic group may have a substituent. Typical substituents include an alkyl group, an aralkyl group, an alkenyl group, an alkynyl group, an aryl group, an alkoxy group, an aryloxy group, an acylamino group, a ureido group, a urethane group, a sulfonylamino group, a sulfamoyl group, a carbamoyl group, a sulfonyl group, a sulfinyl group, an alkyloxycarbonyl group, an aryloxycarbonyl group, an acyl group, an acyloxy group, an alkylthio group, an arylthio group, a halogen atom, a cyano group, and a nitro group. These substituents may be substituted. Where the alkyl, alkenyl, aralkyl, aryl or heterocyclic group has two or more substituents, the substituents may be the same or different.

Of the compounds of formula (FII) preferred are those represented by formula (FIV):

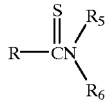

(FIV)

wherein R represents an alkyl group having 1 to 10 carbon atoms, —N($R_{20}$)$R_{21}$ having not more than 10 carbon atoms, or —N($R_{22}$)N($R_{23}$)$R_{24}$ having not more than 10 carbon atoms; $R_5$, $R_6$, $R_{20}$, $R_{21}$, $R_{22}$, $R_{23}$, and $R_{24}$ each represent a hydrogen atom or an alkyl group; provided that at least one of R, $R_5$, $R_6$, $R_{20}$, $R_{21}$, $R_{22}$, $R_{23}$, and $R_{24}$ represents an alkyl group substituted with a group selected from a carboxyl group or a salt thereof, a sulfo group or a salt thereof, a phospho group or a salt thereof, an amino group, an ammonium group, and a hydroxyl group.

In formula (FIV), R preferably represents —N($R_{20}$)$R_{21}$ having not more than 6 carbon atoms or —N($R_{22}$)N($R_{23}$)$R_{24}$ having not more than 6 carbon atoms; and $R_5$, $R_6$, $R_{20}$, $R_{21}$, $R_{22}$, $R_{23}$, and $R_{24}$ each preferably represent a hydrogen atom or an alkyl group; provided that at least one of $R_5$, $R_6$, $R_{20}$, $R_{21}$, $R_{22}$, $R_{23}$, and $R_{24}$ represents an alkyl group substituted with a group selected from a carboxyl group or a salt thereof and a sulfo group or a salt thereof.

Specific but non-limiting examples of the compounds of formula (FII) are shown below.

FII-1 FII-2

FII-3 FII-4

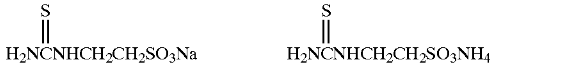

FII-5 FII-6

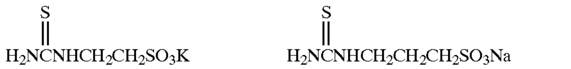

FII-7 FII-8

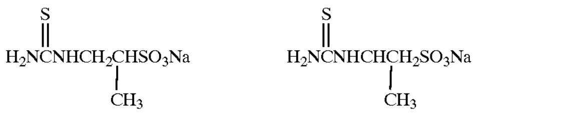

FII-9 FII-10

FII-11 FII-12

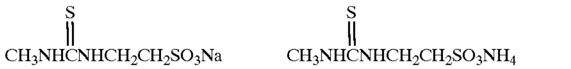

-continued

FII-13 FII-14

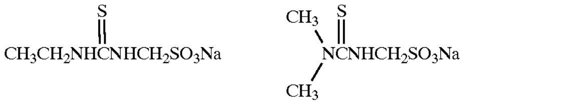

FII-15 FII-16

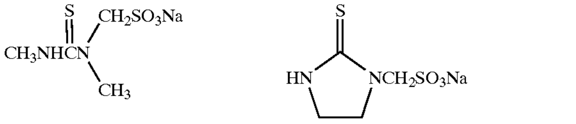

FII-17 FII-18

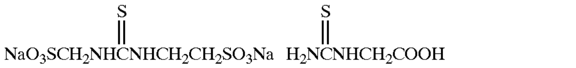

FII-19 FII-20

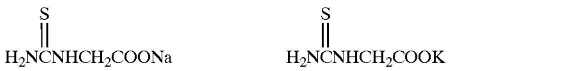

FII-21 FII-22

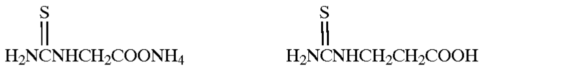

FII-23 FII-24

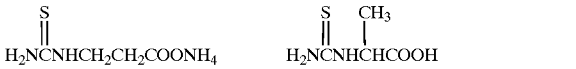

FII-25 FII-26

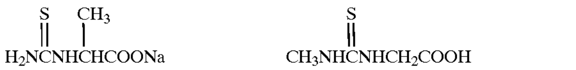

FII-27 FII-28

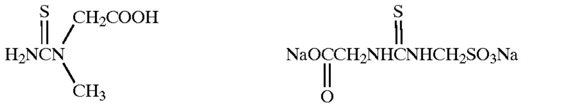

FII-29 FII-30

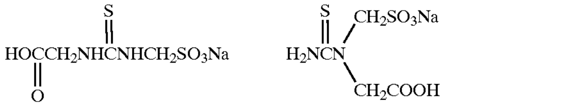

FII-31 FII-32

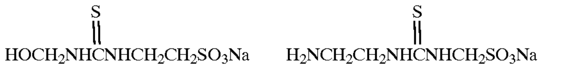

FII-33 FII-34

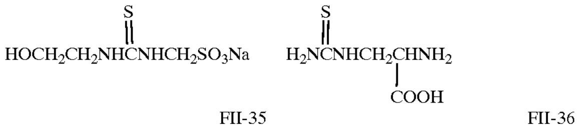

FII-35 FII-36

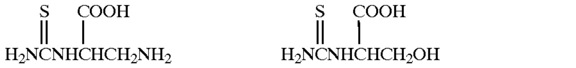

FII-37 FII-38

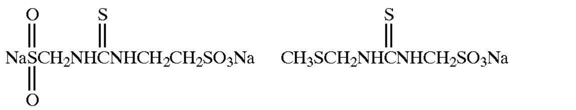

FII-39 FII-40

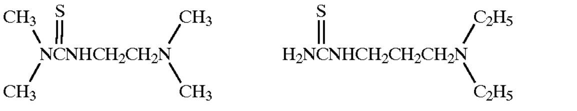

FII-41 FII-42

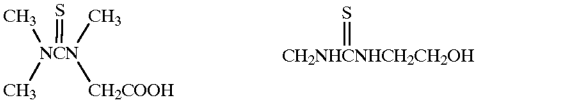

-continued
FII-43
FII-44
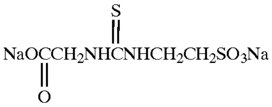
FII-45
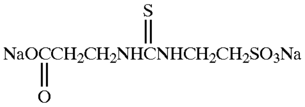
FII-49
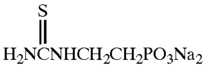
FII-50
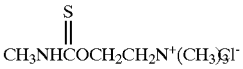
FII-51
FII-52
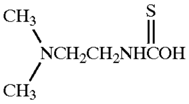
FII-53
FII-54
FII-55
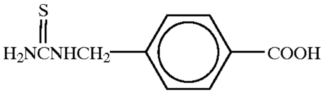
FII-56
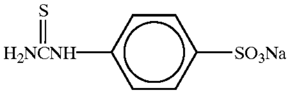
FII-57
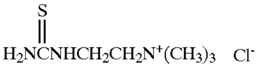
FII-58
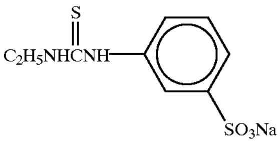
FII-59
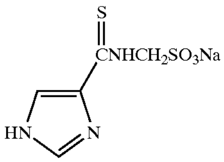
FII-60
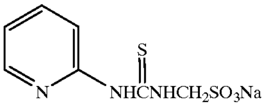
FII-61
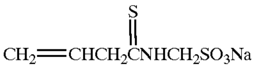
FII-62
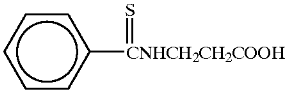
-continued
FII-63
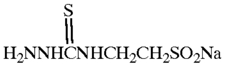
FII-64
FII-65
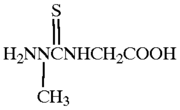
FII-66
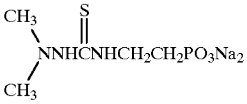
FII-67
FII-68
FII-69
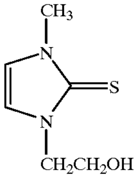
FII-70
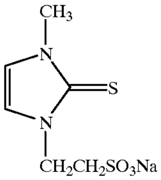
FII-71
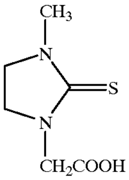
FII-72
FII-73
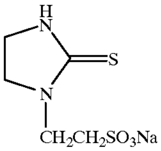
FII-74
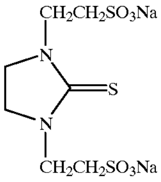
FII-75
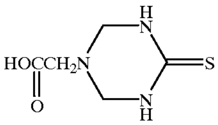
FII-76
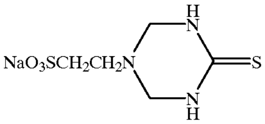
FII-77
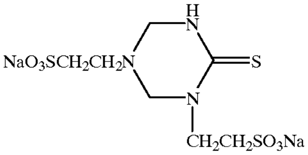

-continued

FII-78

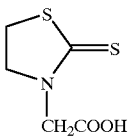

FII-79

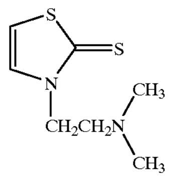

FII-80

FII-81

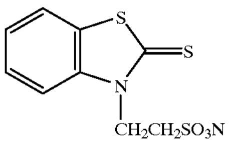

FII-82

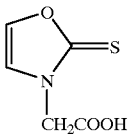

FII-83

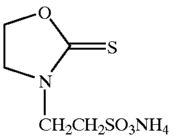

FII-84

FII-85

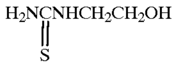

FII-86

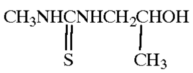

The compounds represented by formula (FII) can be synthesized by referring to known processes, such as the processes described in *J. Org. Chem.*, Vol. 24, pp. 470–473 (1959), *J. Heterocyclic Chem.*, Vol. 4, pp. 605–609 (1967), *Yakushi*, Vol. 82, pp. 36–45 (1962), JP-B-39-26203, JP-A-63-229449, and OLS-2,043,944.

In formula (FIII), the alkyl moiety of the hydroxyalkyl group as represented by $R_4$ is a lower alkyl group having 1 to 9 carbon atoms. $R_4$ preferably includes hydroxyethyl, hydroxypropyl and hydroxybutyl groups.

When the compound of formula (FI), (FII) or (FIII) is used alone as a fixing agent in a fixing solution, it is preferably present in a concentration of 0.03 to 3 mol/l, particularly 0.05 to 2 mol/l. It is particularly preferred that the compound of formula (FI), (FII) or (FIII) be used in combination with a thiosulfate. In this case, the compound is added in an amount of about 0.05 to 0.3 mol, preferably about 0.07 to 0.25 mol, per mole of a thiosulfate. More concretely, the compound is used at a concentration of about 0.001 to 0.5 mol/l, particularly about 0.05 to 0.3 mol/l, while varying according to the concentration of a thiosulfate. The compounds of formula (FI), (FII) and (FIII) can be used either individually or as a combination of two or more thereof. In the latter case, the total amount of the compounds is preferably within the above-mentioned molar ratio to the sulfuric acid radical of the thiosulfate.

IV. Image Reproduction Equipment (For Reading of Image Information, Image Processing into Target Image Information, and Reproduction of Positive Image):

The image information read from a film having been processed by non-basic development processing (e.g., rapid development processing) is digitized and processed into target image characteristics that should have been obtained through basic development processing. The thus corrected image information is sent to a printer for positive image reproduction. The steps involved in this image reproduction system will be described in IV-1 through IV-3. For easy understanding, the description goes with particular reference to the image reproduction equipment disclosed in JP-A-10-20457 and JP-A-9-146247. It should be noted however that the development processing apparatus and image reproduction method according to the present invention are not limited thereto.

Figure 2:
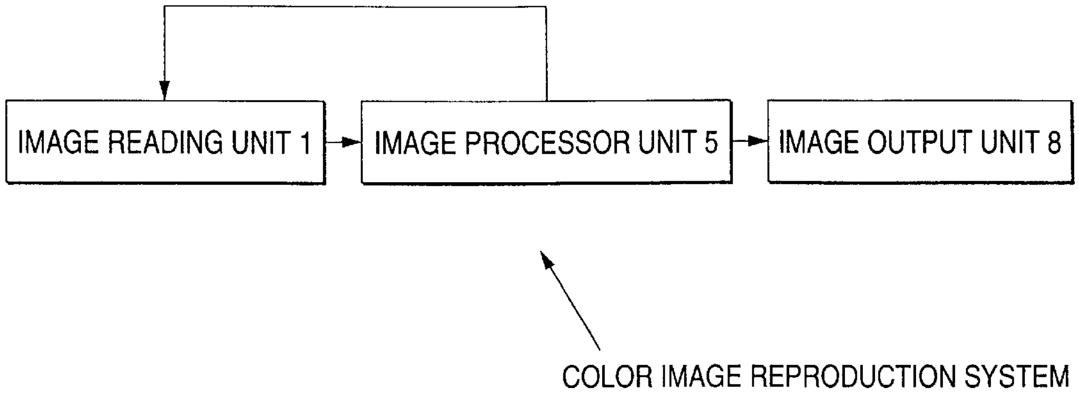
FIG. 2 is a block diagram showing the basic construction of the image reproduction system according to the present invention.

FIG. 2 is a block diagram showing the basic construction of the image reproduction system according to the present invention. As shown, the image reproduction system has an image reading unit 1 which reads a color image to produce digital image data, an image processor unit 5 which processes the image data from the image reading unit 1, and an image output unit 8 which reproduces a color image based on the processed image data.

IV-1. Reading of Image Information from Developed Films:

Image reading can be conducted by the following three systems.

(i) A developed film is wound around a rotating drum. The film is irradiated with measuring light through a color separation filter while rotating the drum. At the same time, the film is sub-scanned in the same direction with the drum rotation, and the reflection density of each pixel is read as electrical signals by photoelectric conversion and multiplied by means of a photomultiplier.

(ii) A developed film is sub-scanned by using a line CCD in which receptor devices are arrayed in one dimension. The transmission or reflection density received by the line CCD is converted to electrical signals by electrical scanning (called line CCD-scan system).

(iii) The density of two-dimensional pixels is read by using an area CCD and converted into electrical signals arranged in time sequence by electrical scanning from the area CCD (called area CCD system).

Of these systems the area CCD system is particularly preferred. While the image reading will hereinafter be explained with reference to the area CCD system, the present invention can be carried out with no problem in accordance with the other two systems.

Figure 3:
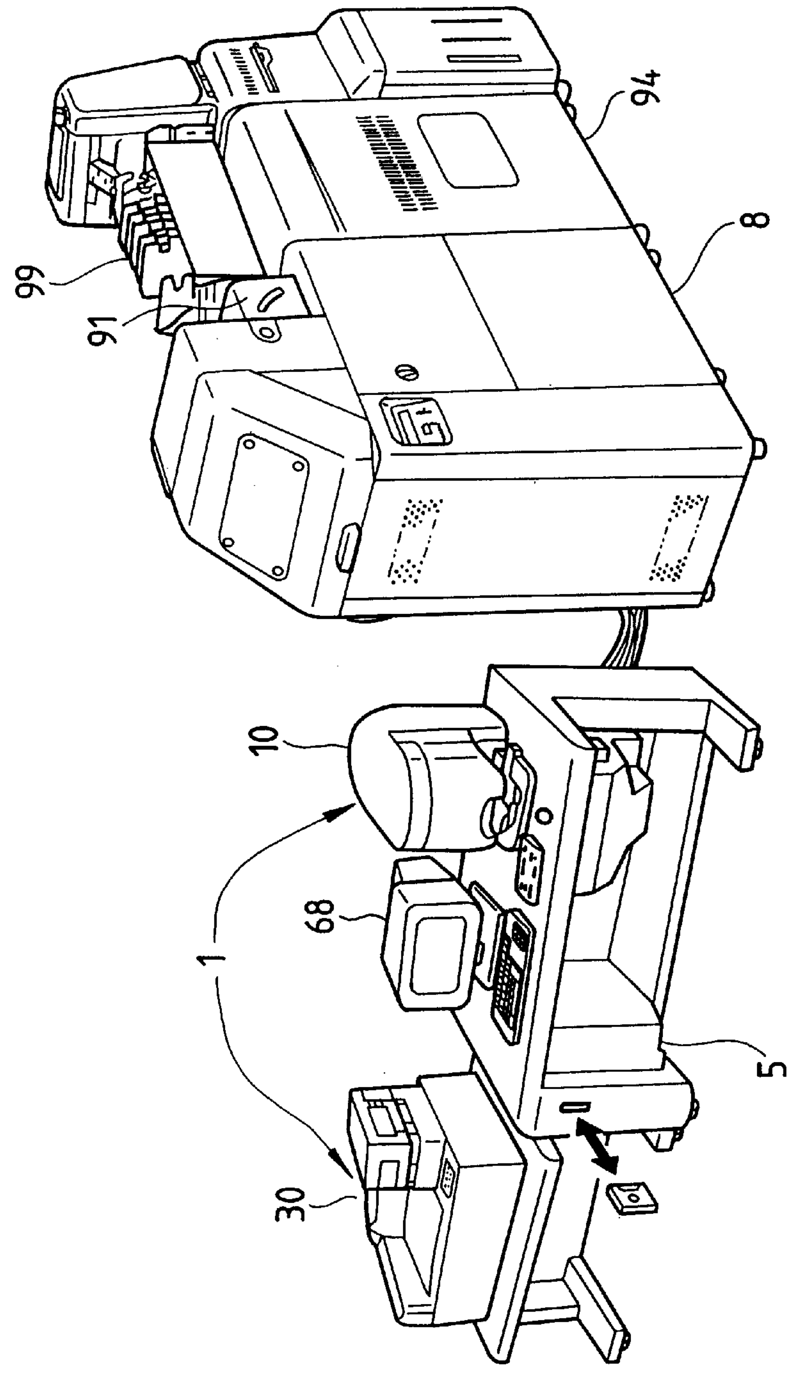
FIG. 3 illustrates the appearance of the image reproduction system of FIG. 2.

The appearance of the image reproduction system of FIG. 2 is shown in FIG. 3. As shown, in the actual image reproduction system, a transmission image reading unit 10 for photoelectrically reading a color image recorded on a film and a reflection image reading unit 30 for photoelectrically reading a color image recorded on a color print are selectively connected as an image reading unit 1 to an image processor unit 5 so that either a color image recorded on a film or a color image recorded on a color print may be reproduced. In what follows, however, the image reading unit will be described with respect to reading and reproduction of an image on the color negative film according to the present invention.

Figure 4:
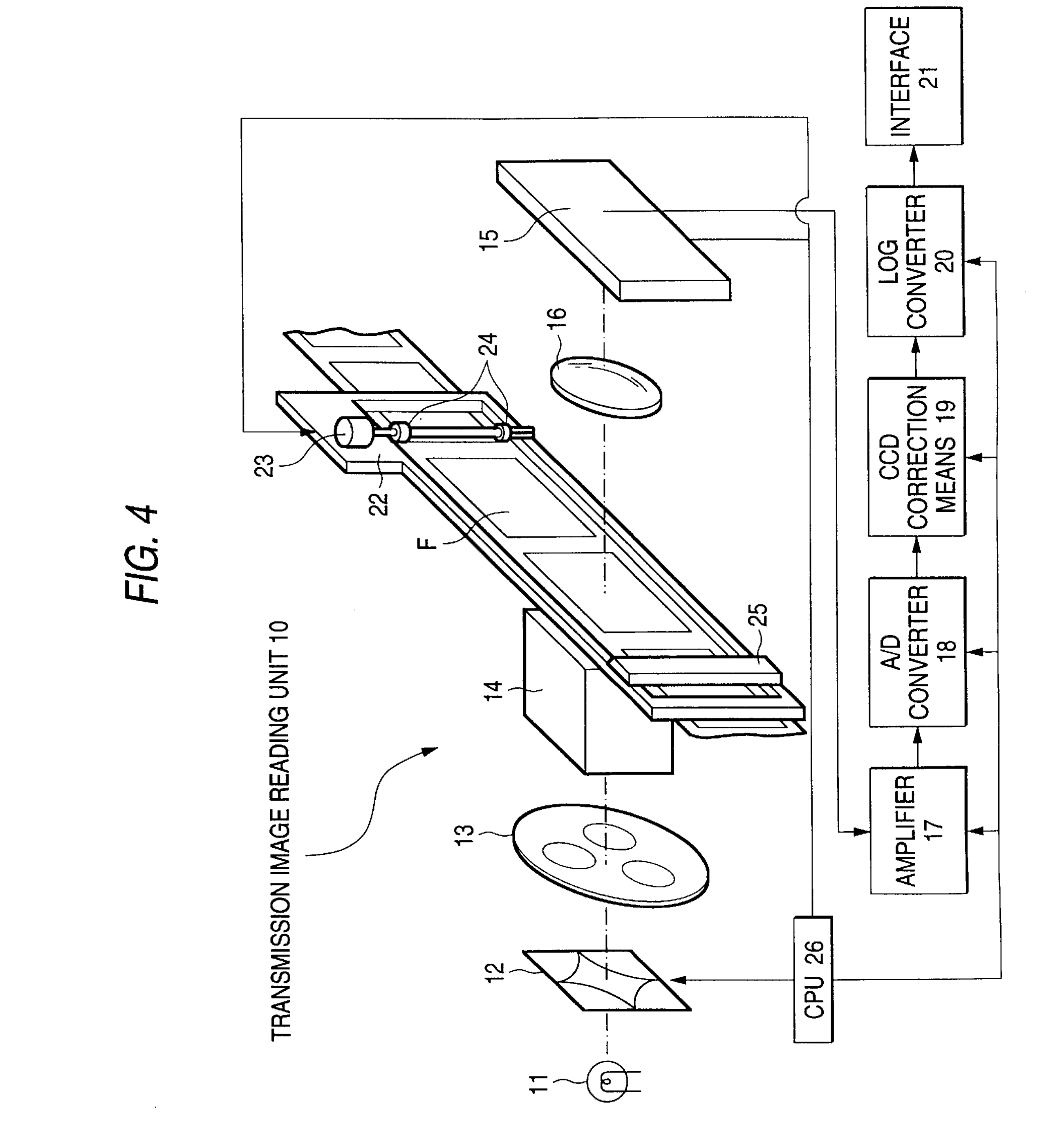
FIG. 4 schematically illustrates a transmission image reading unit.

FIG. 4 schematically illustrates the transmission image reading unit 10 for a color image reproduction system. As shown in FIG. 4, the transmission image reading unit 10 is constructed so that a color image recorded on film F may be read out photoelectrically by irradiating film F with light and detecting the light transmitted through the film. The transmission image reading unit 10 comprises a light source 11, a liquid volume adjusting unit 12 for adjusting the amount of light emitted from the light source 11, a color separation unit 13 for separating the light from the light source 11 into R (red), G green) and B (blue), a diffuser unit 14 for diffusing the light from the light source 11 so as to irradiate film F evenly, a CCD area sensor 15 for photoelectrically detect the light transmitted through film F, and an electrically-operated zoom lens 16 for focusing the light transmitted through film F on the CCD area sensor 15. A film carrier 22 of the transmission image reading unit 10 is exchangeable so as to read various kinds of films, such as a 135 negative film, a 136 positive film, and an advanced photosystem (APS) film.

A halogen lamp is used as a light source 11. The light volume adjusting unit 12 is designed to change the amount of light exponentially for the moving distance of a pair of diaphragms. The color separation unit 13 is a disk having three filters R, G and B, which rotates to conduct successive color separation into three colors. The CCD area sensor 15 has a two-dimensional receptor device composed of 920 pixels in vertical direction by 1380 pixels in horizontal direction and is capable of reading the image information on the film with high resolving power. The CCD area sensor 15 is constructed so as to successively transfer image data from the odd number field consisting of image data of odd number lines and image data from the even number field consisting of image data of even number lines.

The transmission image reading unit 10 further has an amplifier 17 for amplifying the R, G, and B image signals which have been photoelectrically detected and produced; an A/D convertor for digitizing the image signals; a CCD correction means 19 with which corrections are made for variations in sensitivity among pixels or for a dark current; and a log convertor 20 for converting the R, G and B image data to density data. The log convertor 20 is connected to an interface 21.

Film F, being held by a carrier 22, is forwarded by each frame by a roller 24 which is driven by a motor 23 to a prescribed position, at which it is stopped until the color image of a frame is read out. Autocarriers that have been used in conventional mini laboratories, such as NC135S produced by Fuji Photo Film Co., Ltd., can be used for color negative films. These autocarriers are applicable to various print sizes, such as a full size, a panoramic size, and other formats (e.g., dynamic size). When a trimming carrier conventionally used in mini laboratories is used, an about 1.4-fold enlargement is possible, with the axis being at the center. Further, reversal carriers disclosed in Japanese Patent Application Nos. 271048/95, 275358/95, 275359/95, 277455/95, and 285015/96 can be used.

A frame detecting sensor 25 detects the density distribution of a color image recorded on film F and sends the detected density signals to a CPU 26 which controls the transmission image reading unit 10. The CPU 26 calculates the position of the color image on film F based on the density signals and, on judging that a frame of the film has reached a prescribed position, stops the motor 23.

The image reading unit can be installed at the inlet or outlet of a drying zone of a development unit or be fitted to an independent image reading/processing unit or a printer, etc.

Figure 11:
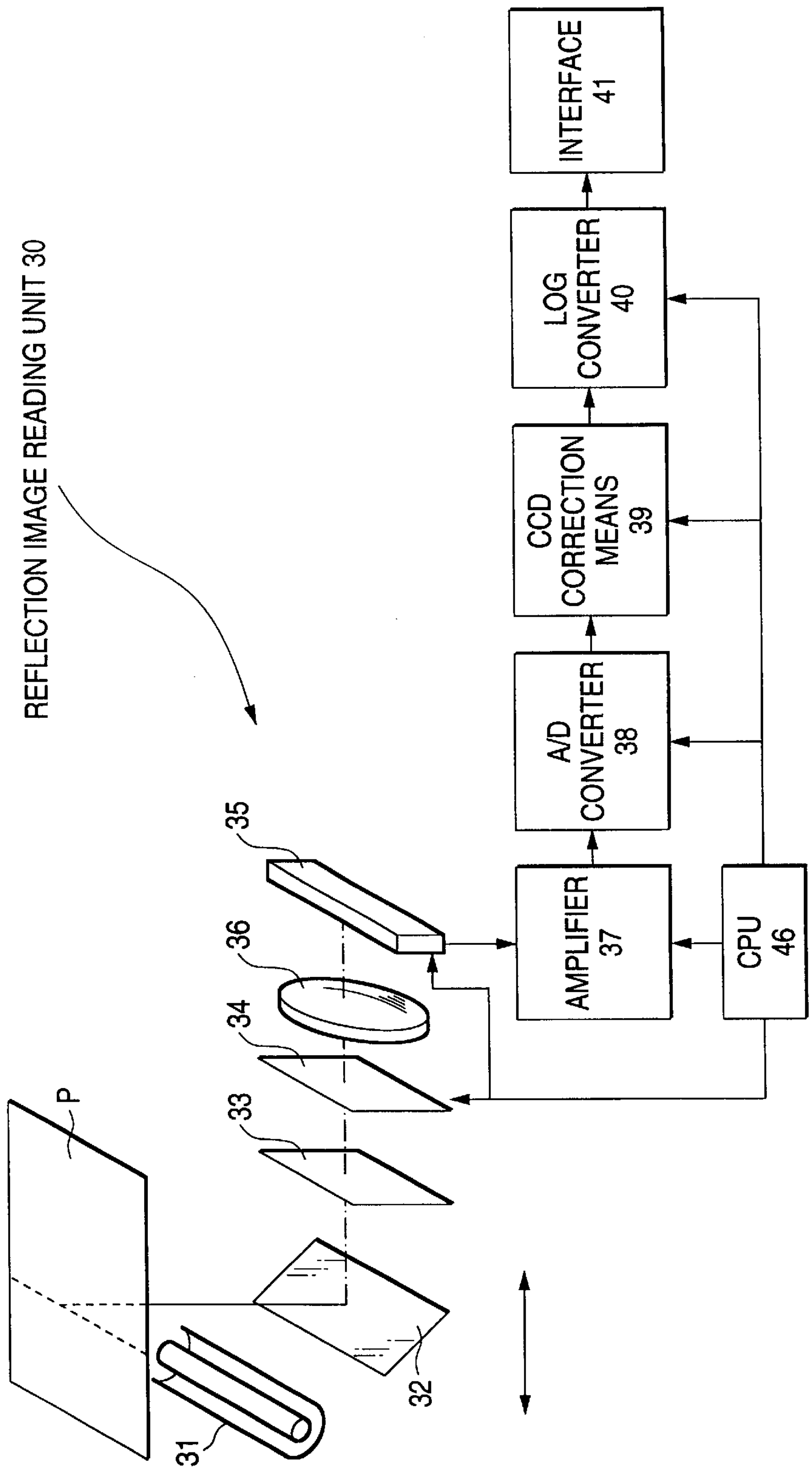
FIG. 11 schematically illustrates a reflection image reading unit.

On the other hand, image reading by way of reflection density, which is one of preferred embodiments of the present invention (especially in the first embodiment of the present invention where a fixing step is omitted), is shown in FIG. 11. A reflection image reading unit 30 is so constructed as to detect and read a reflected light image of high contrast from a film containing silver halide having a high reflectance (as a result of bleaching) and a dye image showing a high light absorption. The reflection image reading unit 30 comprises a light source 31; a mirror 32 which reflects the light having been emitted from the light source 32 and reflected on the surface of the film; a color balance filter 33 for adjusting the R, G and B sensitivities of the reflected light; a light volume adjusting unit 34, a CCD line sensor 35 for photoelectrically detecting the reflected light, and a lens 36 for focusing the reflected light on the CCD line sensor 35.

The CCD line sensor 35 is composed of three line sensors corresponding to R, G and B three colors. While the light source 31 and the mirror 32 are moved in the direction indicated by the arrow, the reflected light is detected by the CCD line sensor 35 to read image information in two dimensions.

The reflection image reading unit 30 also has an amplifier 37 for amplifying the detected R, G, and B image signals; an A/D convertor for digitizing the image signals; a CCD correction means 39 with which the digitized image signals are corrected for variations in sensitivity among pixels or for a dark current; and a log convertor 40 for converting the R, G and B image data to density data. The log convertor 40 is connected to an interface 41. This reflection image reading unit is controlled by a CPU 46.

Figure 5:
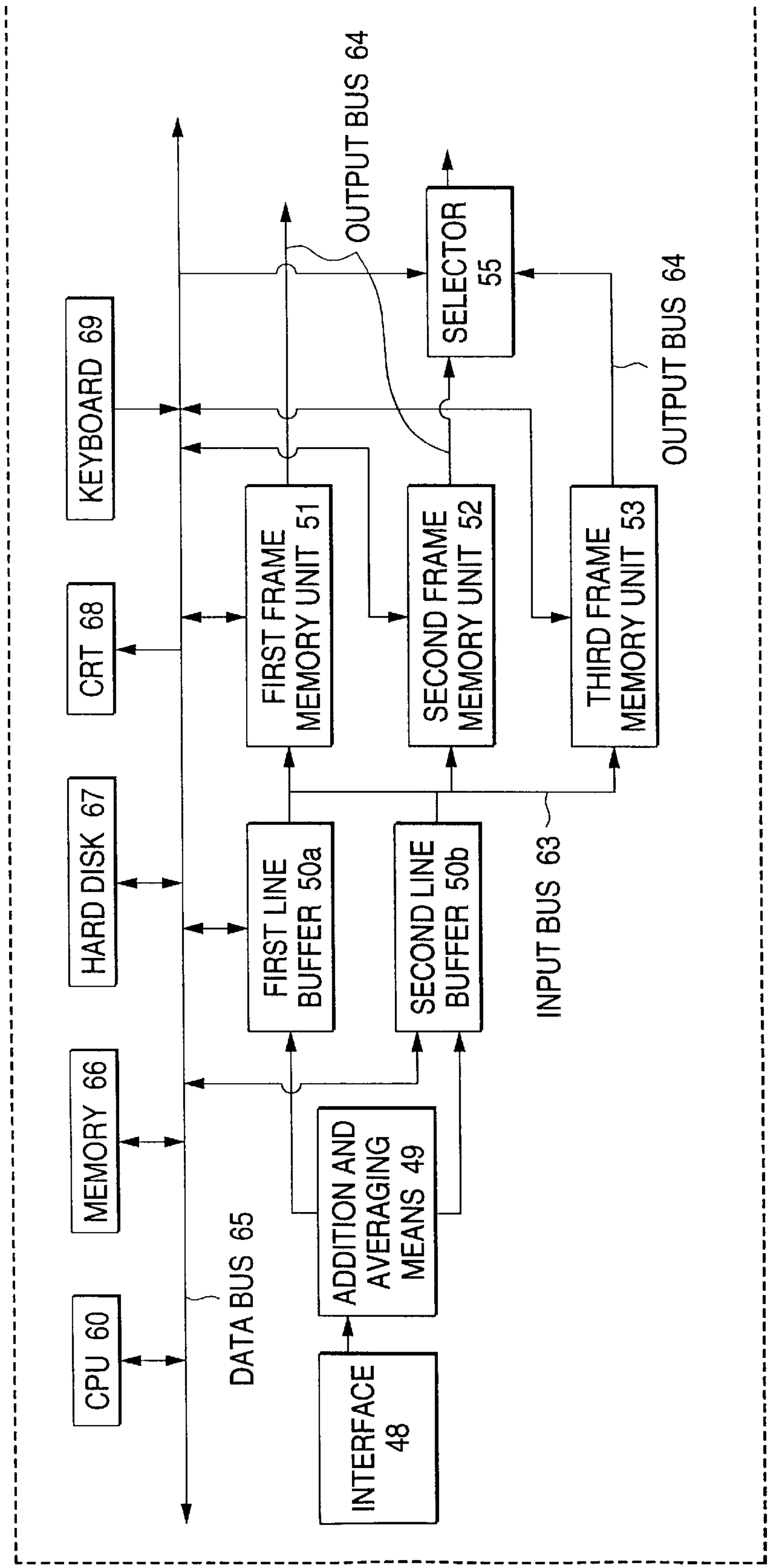
FIGS. 5 and 6 are combined to provide a block diagram showing the construction of the image processor unit shown in FIG. 2.
Figure 6:
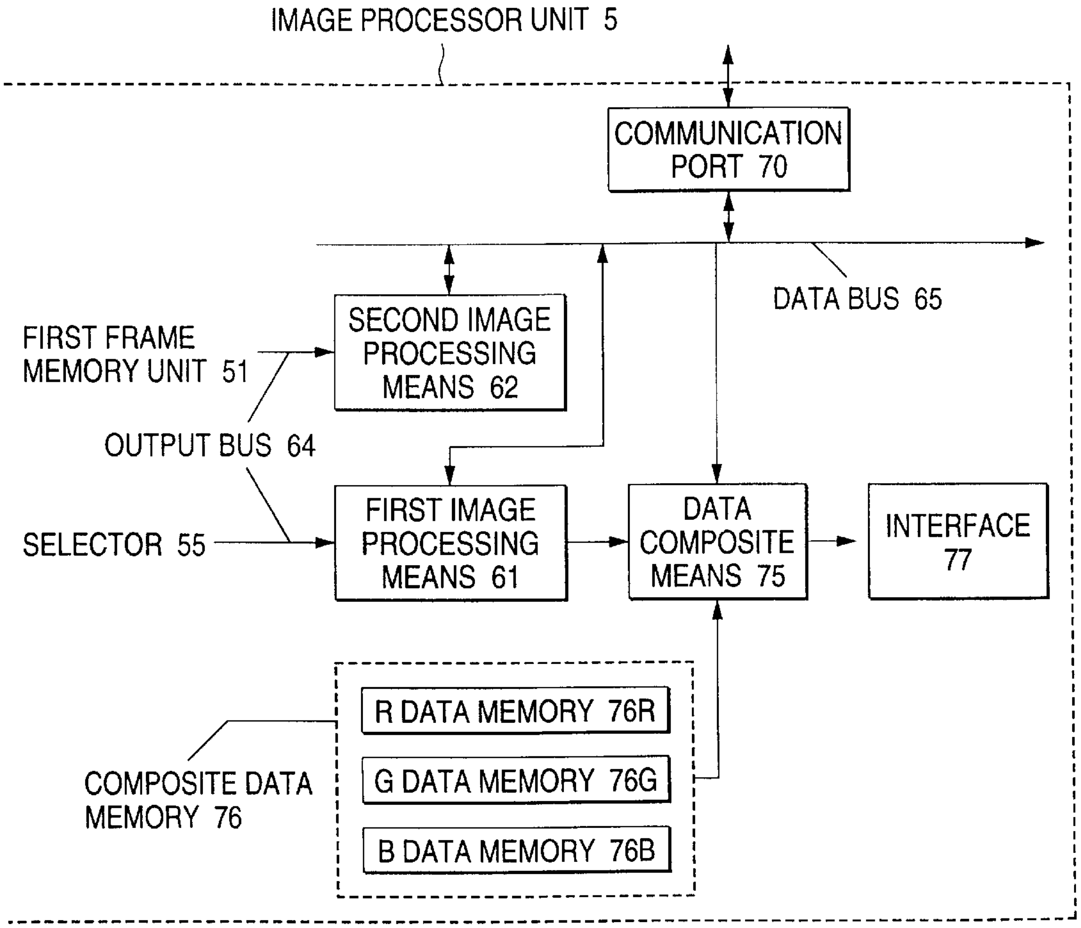

IV-2. Image Data Processing:

A block diagram showing the construction of the image processor unit 5 is dividedly shown in FIGS. 5 and 6. As shown, the image processor unit 5 has an interface 48 which can be connected to the interface 21 of the transmission image reading unit 10 or the interface 41 of the reflection image reading unit 30; an addition and averaging means 49 in which data of two adjoining pixels, produced in the image reading unit 1 and sent for every line, are added up and averaged to obtain data of one pixel; a first line buffer **50*a* and a second line buffer 50*b* which alternately memorize the image data for each line of the image data sent from the addition and averaging means 49; and a first frame memory unit 51, a second frame memory unit 52, and a third frame memory unit 53 to which the line data memorized in the line buffers 50*a* and 50*b* are sent and in which the image data corresponding to one frame of film F (FIG. 4) are memorized. The first and second line buffers 50*a* and 50*b*** are constructed so as to alternate with each other in memorizing so that image data of the lines of odd number are memorized in one of them, and image data of the lines of even number in the other.

In the embodiment shown, the color image of one frame of film F is firstly read and digitized in the image reading unit 1, and the image processor unit 5 sets the conditions for second image reading based on the first image data obtained. Under the thus set reading conditions, the color image is again read to produce digital image data to be processed for reproduction. In order to carry out such processing, the image processor unit 5 memorizes the image data obtained by the first reading in the first frame memory unit 51 and the image data obtained by the second reading in the second frame memory unit 52 and the third frame memory unit 53.

Figure 7:
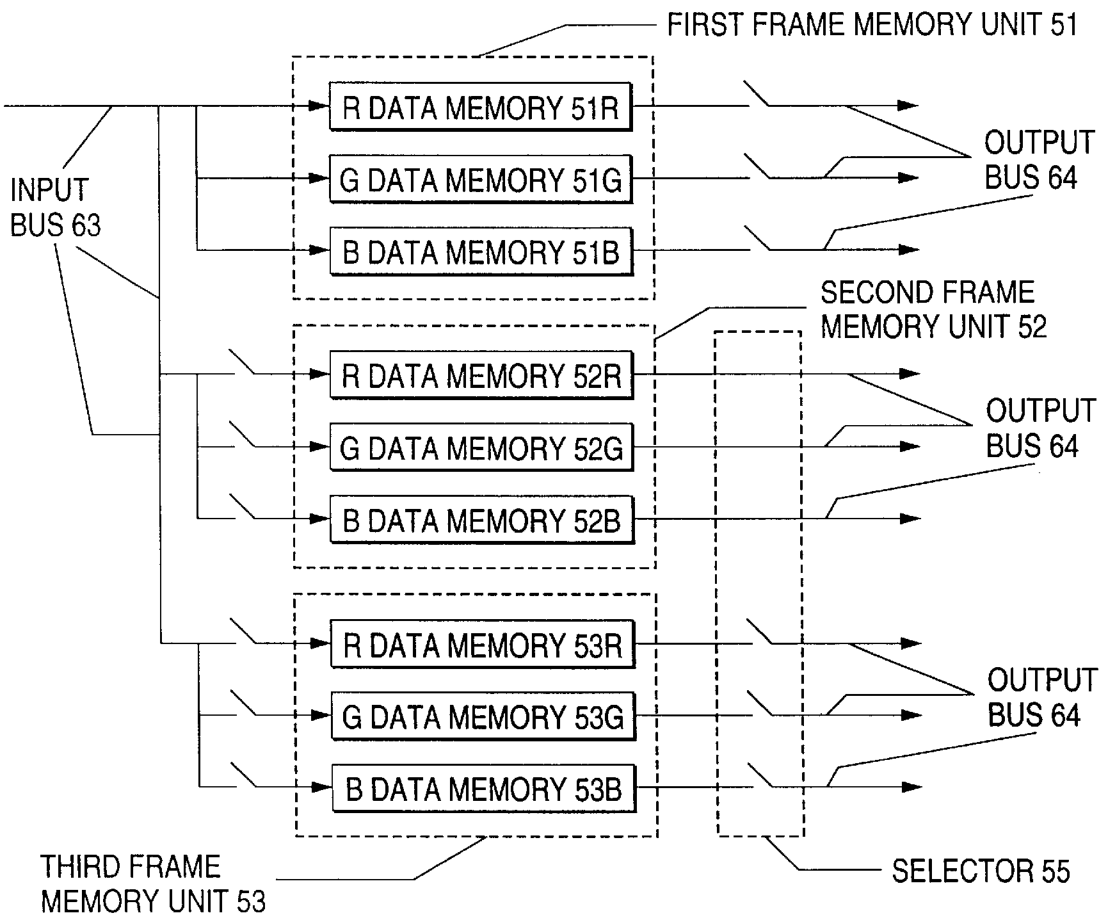
FIG. 7 is a block diagram showing the details of the first, second and third frame memory units shown in FIG. 5.

These frame memory units are explained in detail here before entering into the details of other constituent elements shown in FIGS. 5 and 6. FIG. 7 is a block diagram showing the details of the first frame memory unit 51, the second frame memory unit 52, and the third frame memory unit 53. The first to third frame memory units 51, 52 and 53 each have an R data memory for memorizing image data corresponding to R (red) (51R, 52R or 53R, respectively); a G data memory for memorizing image data corresponding to G (green) (51G, 52G or 53G, respectively); and a B data memory for memorizing image data corresponding to B (blue) (51B, 52B or 53B, respectively). As mentioned above, the first memory unit 51 memorizes the image data obtained by the first reading, and the second and third frame memory units 52 and 53 memorize the image data obtained by the second reading. In the situation shown in FIG. 7, the image data obtained by the first reading is input to the first frame memory unit 51 through an input bus 63, while the image data memorized in the second frame memory unit 52 is output through an output bus 64.

Back to FIGS. 5 and 6, the image processor unit 5 has a CPU 60 controlling the whole processing unit 5. The CPU 60 is capable of communication with the CPU 26 (FIG. 4) controlling the transmission image reading unit 10 via a communication wire (not shown) and also with a CPU controlling the image output unit 8 via a communication wire (not shown). This construction enables the CPU 60 to alter the image reading conditions for the second reading based on the image data obtained by the first reading and memorized in the first frame memory unit 51 and, according to necessary, to alter the conditions for image processing after reading.

That is, the CPU 60 decides the second reading conditions based on the image data obtained by the first reading so that the dynamic range of the CCD area sensor 15 or the CCD line sensor 35 may be utilized efficiently in the second reading and transfers the reading control signals to the CPU 26 of the transmission image reading unit 10 or the CPU 46 of the reflection image reading unit 30. On receipt of the reading control signals, CPU 26 of the transmission image reading unit 10 or the CPU 46 of the reflection image reading unit 30 controls the light volume, which is adjusted by the light volume adjusting unit 12 or 34, or the storage time of the CCD area sensor 15 or CCD line sensor 35. Simultaneously, the CPU 60 outputs, to first and second image processing means hereinafter described, control signals for altering the image processing conditions, such as parameters for image processing, according to necessity based on the resulting image data so as to make it possible to reproduce a positive color image having the optimum density, gradient, and color tone on color paper. The image reading conditions or image processing conditions thus decided by the CPU 60 are memorized in a memory 66.

Where image reading conditions or image processing conditions have previously been set and saved according to operator's instructions, the CPU 60 does not make the above-described decisions on the conditions based on the first read image data but outputs various control signals based on the saved conditions. Where an operator sets various conditions through an input device such as a keyboard 69 and instructs saving of the conditions, these conditions are memorized in memory 66. If the operator instructs to release the saving of these conditions, the conditions memorized in the memory 66 become invalid. In carrying out the above-described control, the CPU 60 first makes reference to the memory 66 and follows the conditions if memorized there. If not, the conditions are decided by the CPU 60 based on the image data obtained by the first reading. Therefore, an operator can make instructions on conditions according to the kind of the film to be processed as detected from the DX code or on customer's special demand. Otherwise the conditions are set for the kind of films beforehand so that image processing may proceed automatically as instructed. These conditions are not necessarily saved in large groups, such as a group of image reading conditions or a group of image processing conditions. That is, memorization of the conditions in the memory 66 or reference to the memory 66 may be made for a smaller group of conditions. For example, the conditions can be saved in such a manner that the condition on saturation is saved while the sharpness is controlled under an automatically decided condition.

The construction of the image processor unit 5 has been described within the range shown in FIG. 5. The explanation further goes into the details of the image processing which is carried out while the image data produced in the image reading unit 1 is input into the image processor unit 5 through the interface 48 and memorized in the first to third frame memory units.

Then the construction of the image processor unit 5 for carrying out image processing on the image data obtained by the second reading and memorized in the second frame memory unit 52 and the third frame memory unit 53 is explained.

The image processor unit 5 has a first image processing means 61 and a second image processing means 62 (FIG. 6). The first image processing means 61 is for conducting image processing, such as gradient correction, color conversion and density conversion, on the image data memorized in the second frame memory unit 52 and the third frame memory unit 53 through a look-up table or a matrix operation so as to enable reproduction of a color image on color paper with desired density, gradient, and color tone. The second image processing means 62 is for conducting image processing, such as gradient correction, color conversion and density conversion, on the image data memorized in the first frame memory unit 51 through a look-up table or a matrix operation so as to enable reproduction of a color image on the screen of a CRT hereinafter described with desired image quality. The outputs from the second and third frame memory units 52 and 53 are connected to a selector 55 (FIG. 6). The selector 55 selectively inputs the image data memorized in either the second frame memory unit 52 or the third frame memory unit 53 into the first image processing means 61.

Figure 8:
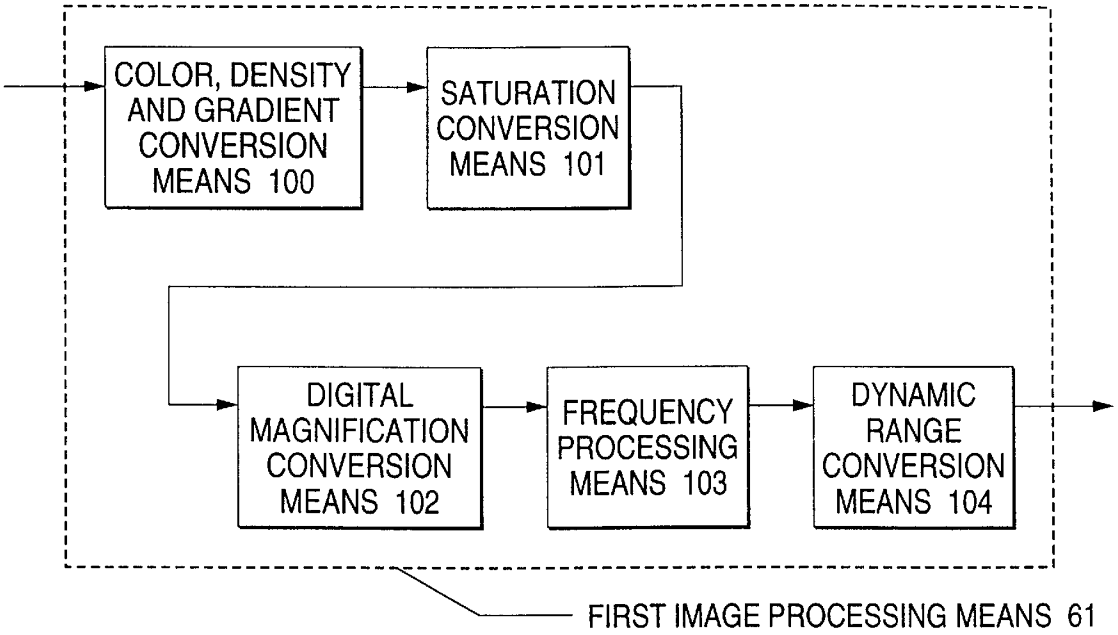
FIG. 8 is a block diagram showing the details of the first image processing means shown in FIG. 6.

FIG. 8 is a block diagram of the first image processing means 61. As shown in FIG. 8, the first image processing means 61 comprises a color, density and gradient conversion means 100 for converting density data, color data and gradient data of the image data; a saturation conversion means 101 for converting saturation data of the image data; a digital magnification conversion means 102 for converting pixel data numbers of the image data; a frequency processing means 103 for processing the frequency of the image data; and a dynamic range conversion means 104 for converting the dynamic range of the image data. These conversion means are constructed so that they can operate simultaneously as we call pipeline processing and, upon completion of their operations, the next processing may be carried out. Thus high-speed processing is possible.

The construction of the first image processing means 61 as shown in FIG. 8 makes it possible to carry out not only such processing as gradient correction, color conversion and density conversion but also processing for improving sharpness while suppressing the granularity of the film as described in Japanese Patent Application No. 337510/95 or JP-A-9-22460. Further, the construction is capable of automatic dodging processing which is effective for satisfactory image reproduction from an image having high contrast as disclosed in Japanese Patent Application No. 165965/95 or JP-A-9-18704.

The film having been processed by non-basic development processing (e.g., rapid development processing) suffers from the following deviations from the target image quality. (i) The gradation is softer (the gradient is lower). (ii) The color balance is lost. (iii) In particular, the high density area has much softer gradation and, with some films, the low density area is also softer due to underdevelopment. (iv) The fog is smaller, but dyes have not been completely washed away, or there is the possibility that an antihalation layer comprising colloidal grains remains, and $D_{min}$ is considerably shifted either high or low according to the kind of the film. Therefore, the conditions of image processing for correcting the digitized image information about the above-described four characteristics into the target characteristics are set in the CPU. On converting the four characteristics to the target characteristics, the converted information is stored and then output to a positive image printer.

Of the above-described series of image processing for image reproduction, the correction of the lower gradient (i) to the target gradient is the most important. The gradient conversion means 100 is capable of correcting density data within the dispersion of basic development processing to the target values. In most cases, pieces of density information as obtained after non-basic development processing (e.g., rapid development processing) which show scatter to the lower density side can be corrected to the target values under the thus set image processing conditions. If the resulting correction is still insufficient, it is necessary to re-set the image processing conditions so as to enable greater corrections for increasing the gradient. The large portion of the necessary correction on the color balance (ii) can be effected through the above-described gradient adjustment for each color. Subtle color balance adjustment will be effected by combination of the image processing functions hereinafter described. Corrections on the softer gradation in the high density area and the low density area (toe) described in (iii) above can be made by setting the saturation emphasis level of the saturation conversion means 101 high and correcting the form of the characteristic curve in the toe and the high density area by a combination of the dynamic range conversion means 104, the gradient conversion means 100, and alteration of the degree of density amplification in terms of spatial frequency (hereinafter described). In this image processing, too, if the correction under the previously set image processing conditions is insufficient, the conditions should be re-set.

Additionally, image processing for emphasizing the fringes and for increasing the gradient in the low density area can be incorporated into the image processing system, to thereby improve the sharpness of the whole image and of minute image areas. This processing can be effected by the frequency processing means 103, where the spatial frequencies of the image area are analyzed to set emphasis processing conditions for the fringes at which the frequency largely changes and for the minute image areas where the frequency rises.

The image quality correction on a developed film by the above-described image processing is made to an accuracy of ±10%, preferably ±8%, of the target values, in terms of density values. As far as the characteristics, inclusive of color balance and gradation characteristics, in terms of density values fall within the above range, it is safe to say that the image reproduced is of the same quality as what should have been obtained by basic development processing.

Conversion into the target characteristics can be carried out either by automatically selecting the conditions previously set for every kind of films or by manual selection of conditions by an operator.

The film having been processed by fixing-omitted development processing according to the first embodiment of the present invention suffers from (i) gradient deviation due to superimposition of a color image and silver halide, (ii) reduction in the detectable density range due to an increase of $D_{min}$ and reduction in saturation, and (iii) reduction in reading precision in the high exposure section due to an increase in $D_{max}$. The degrees of the deviations (i) to (iii) vary depending on the kind of the film. Therefore, the conditions of image processing for correcting the digitized image information about the above-described three characteristics into the target characteristics which should have been obtained if basic development processing had been chosen are set in the CPU 60. As can be seen from the above, image data processing especially necessary for the image obtained by fixing-omitted development processing includes the following items.

1) Correction processing on the gradient deviated from the target gradient.
2) Processing for converting the color balance data to the target color balance data.
3) Processing for correcting the nonlinearity of the density vs. exposure relationship which resulted from the fixing-omitted development processing into the target density vs. exposure relationship (especially in the high density area and the low density area).
4) Correction processing on the influences of $D_{min}$ which is considerably higher than the target value.

The corrections of these four characteristics factors can be carried out by the following roughly divided two methods A and B. In method A, the density information read from an image is subjected as such to image reproduction processing by the above-described image processing manipulations. In method B, the image information read from an image is once converted into analytical density information by operations, and the resulting analytical density information is then subjected to image reproduction processing. While method B seems more accurate, method A has been proved sufficient for grasping the image, which will be described further.

Of the above-described series of image processing for image reproduction, the correction of the softer gradation (i) to the target gradient is the most important. The gradient conversion means 100 functions in correcting the input slope of density vs. exposure to the target value. At the same time, the large portion of the necessary correction on the color balance (ii) can be effected through the above-described gradient adjustment for each color. Subtle color balance adjustment will be effected by combination of the image processing functions hereinafter described. Corrections on the softer gradation in the high density area and the low density area (toe) described in (iii) above can be made by setting the saturation emphasis level of the saturation conversion means 101 high and correcting the form of the characteristic curve in the toe and the high density area by a combination of the dynamic range conversion means 104, the gradient conversion means 100, and alteration of the degree of density amplification in terms of spatial frequency (hereinafter described). In this case, it goes without saying that the conditions are set so that the saturation correction to the target value may be carried out simultaneously.

The increase in $D_{min}$ due to residual silver, etc. will be contained in the background level at the toe and thus eliminated in the image processing and therefore has no influence on the output image characteristics unless the reading range is extremely high.

Where image information is once converted to analytical density information and then processed according to method B (Japanese Patent Application No. 135154/97), the CPU 60 of FIG. 5 has a circuit for operations. In the present invention, analytical densities for each of yellow, magenta and cyan colors can be obtained by operations from blue, green, and red filter light density values read from a developed film. The details of method B will be given later.

The image quality correction on a developed film by image processing is made to an accuracy of ±10%, preferably ±8%, of the target values, with each of the image characteristics being expressed in terms of density values. The main image characteristics that are impaired through fixing-omitted development processing are color balance, gradation characteristics, and graininess. As far as these characteristics, when expressed in terms of density values, fall within the above range, it is safe to say that the image reproduced has the same quality as could be obtained by basic development processing.

Conversion into the target characteristics can be carried out either by automatically selecting the conditions previously set for every kind of films or by manual selection of conditions by an operator.

The thus corrected information is once stored and then output to a printer for a positive image.

The film having been processed by desilvering-omitted development processing according to the second embodiment of the present invention suffers from (i) gradation deviation due to superimposition of a color image, a silver image, and silver halide, (ii) reduction in the detectable density range due to an increase of $D_{min}$ and reduction in saturation, and (iii) reduction in reading precision in the high exposure section due to an increase in $D_{max}$. The degrees of the deviations (i) to (iii) vary depending on the kind of the film. Therefore, the conditions of image processing for correcting the digitized image information about the above-described three characteristics into the target characteristics are set in the CPU. As can be seen from the above, the image data processing especially necessary for the image obtained by desilvering-omitted development processing includes the following items.

1) Correction processing on the gradient deviated from the target gradient.
2) Processing for converting the color balance data to the target color balance data.
3) Processing for correcting the nonlinearity of the density vs. exposure relationship which resulted from the desilvering-omitted development processing into the target density vs. exposure relationship (especially in the high density area and the low density area).
4) Correction processing on the influences of $D_{min}$ which is considerably higher than the target value.

While the corrections of these four characteristics factors can be carried out by the above-described methods A and B, the further explanation on correction processing will be made in accordance with method A (using no analytical density) for the same reason as described above.

Of the above-described series of image processing for image reproduction, the correction of the softer gradation (i) to the target gradient is the most important. The gradient conversion means 100 functions in correcting the input slope of density vs. exposure to the target value. At the same time, the large portion of the necessary correction on the color balance (ii) can be effected through the above-described gradient adjustment for each color. Subtle color balance adjustment will be effected by combination of the image processing functions hereinafter described. Corrections on the softer gradation in the high density area and the low density area (toe) described in (iii) above can be made by setting the saturation emphasis level of the saturation conversion means 101 high and correcting the form of the characteristic curve in the toe and the high density area by a combination of the dynamic range conversion means 104, the gradient conversion means 100, and alteration of the degree of density amplification in terms of spatial frequency (hereinafter described). In this case, it goes without saying that the conditions are set so that the saturation correction to the target value may be carried out simultaneously.

The increase in $D_{min}$ due to residual silver, etc. will be contained in the background level and thus eliminated in the image processing and therefore has no influence on the output image characteristics.

Where image information is once converted to analytical density information and then processed according to method B, the CPU 60 of FIG. 5 has a circuit for operations. In the present invention, analytical densities for each of yellow, magenta and cyan colors can be obtained from blue, green, and red filter light density values read from a developed film. The details of method B will be given later.

The image quality correction on a developed film by image processing is made to an accuracy of ±10%, preferably ±8%, of the target values, with each of the image characteristics being expressed in terms of density values. As far as the characteristics, inclusive of color balance and gradation characteristics, in terms of density values fall within the above range, it is safe to say that the image reproduced has the same quality as could be obtained by basic development processing.

Conversion into the target characteristics can be carried out either by automatically selecting the conditions previously set for every kind of films or by manual selection of conditions by an operator.

The thus corrected information is once stored and then output to a printer for a positive image.

The film having been processed by bleaching-omitted development processing according to the third embodiment of the present invention suffers from (i) gradation deviation due to superimposition of a color image and a silver image, (ii) reduction in saturation and increase in $D_{min}$ due to the presence of an antihalation layer or colloidal silver of a yellow filter layer, (iii) color imbalance, especially color imbalance due to the strong absorption of the colloidal silver of a yellow filter layer in a blue light region, and (iv) increase in $D_{min}$ due to the silver halide which remains as a result of retardation of fixing. The degrees of the deviations (i) to (iv) vary depending on the kind of the film. Therefore, the conditions of image processing for correcting the digitized image information about the above-described four characteristics into the respective target characteristics are set in the CPU. As can be seen from the above, the processing especially necessary for image quality correction on the image obtained by bleaching-omitted development processing includes the following items.

1) Correction processing on the gradation deviated from the target gradient.
2) Processing for converting the color balance data to the target color balance data.
3) Processing for correcting the nonlinearity of the density vs. exposure relationship which resulted from the bleaching-omitted development processing into the target density vs. exposure relationship (especially in the high density area and the low density area) in terms of analytical density values.
4) Correction processing on the influences of $D_{min}$ which is considerably higher than the target value.

The corrections of these four characteristics factors can be carried out by the above-described methods A and B. Since the film processed by bleaching-omitted development processing contains a residual silver image superimposed on the color image, it appears theoretically that satisfactory image processing for image reproduction could not be effected unless method B using analytical density values is adopted.

However, as a result of the inventors' trial, it unexpectedly turned out that fairly satisfactory image reproduction can be achieved even when the operations for conversion to analytical density values are omitted (method A). This holds true particularly where a fixing accelerator is used in the fixing step. Better results can be, of necessity, obtained when method B is followed.

The image processing on the image information as obtained by reading (method A) is first described.

Of the above-described series of image processing for image reproduction, the correction of the softer gradation (i) to the target gradient is the most important. The gradient conversion means 100 functions in correcting the input slope of density vs. exposure to the target value. At the same time, the large portion of the necessary correction on the color balance (ii) can be effected through the above-described gradient adjustment for each color. Subtle color balance adjustment will be effected by combination of the image processing functions hereinafter described. Corrections on the softer gradation in the high density area and the low density area (toe) described in (iii) above can be made by setting the saturation emphasis level of the saturation conversion means 101 high and correcting the form of the characteristic curve in the toe and the high density area by a combination of the dynamic range conversion means 104, the gradient conversion means 100, and alteration of the degree of density amplification in terms of spatial frequency (hereinafter described). In this case, it goes without saying that the conditions are set so that the saturation correction to the target value may be carried out simultaneously.

The increase in $D_{min}$ due to residual silver, etc. will be contained in the background level and thus eliminated in the image processing and therefore does not influence the output image characteristics.

Where image information is once converted to analytical density information according to method B, the CPU 60 of FIG. 5 has a circuit for operations. In the present invention, analytical densities for each of yellow, magenta and cyan colors (dyb, dmg, and dcr) are obtained from blue, green, and red filter light density values (Db, Dg, and Dr) read from a developed film in accordance with the following operations:

$$Db=dyb+dmb+dcb+Agb \quad (1)$$

$$Dg=dyg+dmg+dcg+Agg \quad (2)$$

$$Dr=dyr+dmr+dcr+Agr \quad (3)$$

$$Dir=Agir \quad (4)$$

In the above formulae, dyb, dyg, and dyr represent blue, green, and red filter light density components, respectively, of a yellow dye; dmb, dmg, and dmr represent blue, green, and red filter light density components, respectively, of a magenta dye; dcb, dcg, and dcr represent blue, green, and red filter light density components, respectively, of a cyan dye; and Agb, Agg, and Agr represent blue, green, and red filter light density components, respectively, of a silver image. Agb has a high density value because of the existence of a yellow filter layer, whereas Agg and Agr are almost equal to an infrared light density Agir which is hardly influenced by other dyes.

As the absorption spectrum of each dye is known, absorption components in the spectral regions other than the maximum absorption wavelength region are in the following relationships. The coefficients Ayg, Ayr, Amb, Amr, Acb, and Acg are known and also easy to measure.

$$dyg=Ayg*dyb,\ dyr=Ayr*dyb,$$

$$dmb=Amb*dmg,\ dmr=Amr*dmg,$$

$$dcb=Acd*dcr,\ dcg=Acg*dcr.$$

Further, the green, red, and infrared light densities of a yellow filter layer can be-substituted by 0 as is well known.

The analytical densities of the individual developed dyes (cyan, magenta and yellow) can be thus obtained. Further, the use of analytical densities eliminates the danger that the blue light absorption by a yellow filter layer is superimposed on the absorption by a yellow dye when density data are output to a printer, resulting in color imbalance.

Likewise, the use of analytical densities makes it possible to completely exclude the influences of the neutral background densities of an antihalation layer, etc., however high they may be, on the printer output.

JP-B-7-52287 discloses the technique for obtaining the target photographic characteristics after the image density values read from a developed color film obtained through bleaching-omitted development processing are once converted to analytical density values, but it is not until the yellow filter light density is corrected as in the present invention that a practical precision can be obtained.

The image quality correction on a developed film by image processing is made to an accuracy of ±10%, preferably ±8%, of the target values, in terms of density values. As far as the characteristics, inclusive of color balance and gradation characteristics, in terms of density values fall within the above range, it is safe to say that the image reproduced has the same quality as could be obtained by basic development processing.

Conversion into the target characteristics can be carried out either by automatically selecting the conditions previously set for every kind of films or by manual selection of conditions by an operator.

The thus corrected information is once stored and then put into a printer for a positive image.

The operations of the image processor unit used in the above-described image processing are disclosed in JP-A-10-20457 and JP-A-9-146247.

Additionally, the image processor unit 5 has a data bus 65 (FIG. 5) in addition to the input bath 63 and output bus 64 for the first frame memory unit 51, the second frame memory unit 52 and the third frame memory unit 53. To the data bus 65 are connected the CPU 60 controlling the whole color image reproduction system, the memory 66 for saving the operation program or data relating to image processing conditions, a hard disc 67 for memorizing and storing image data, a CRT 68, the keyboard 69, a communication port 70 which is connected to other color image reproduction systems via a communication circuit, a communication wire to the CPU 26 of the transmission image reading unit 10, etc.

Figure 9:
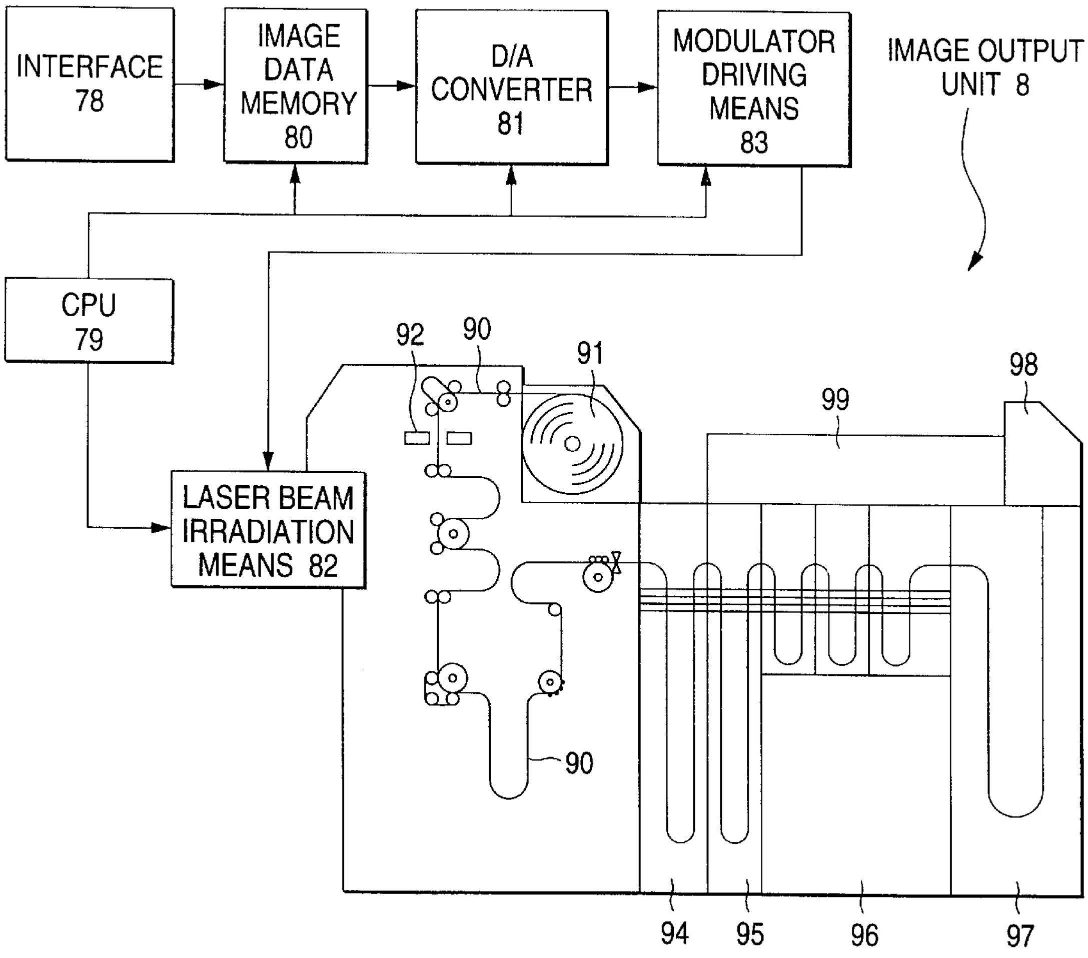
FIG. 9 schematically shows the image output unit shown in FIG. 2.

IV-3. Output of Processed Image Signals to Printer:

The image data having been processed in the above-described image processor unit in accordance with preferred embodiments of the present invention are send to an image output unit for positive image formation. FIG. 9 is a schematic view of the image output unit 8 used in the color image reproduction system for reproducing a color positive image on color paper based on the processed image data.

The image output unit 8 comprises an interface 78 connected to the interface 77 (FIG. 6) of the image processor unit 5, a CPU 79 controlling the image output unit 8, an image data memory 80 composed of a plurality of frame memories for memorizing the image data input from the image processor unit 5, a D/A convertor 81 for converting the digital image data into analogue signals, a laser beam irradiation means 82, and a modulator driving means 83 which outputs modulating signals for modulating the intensity of a laser beam. The CPU 79 is capable of communicating with the CPU 60 of the image processor unit 5 via a communication wire (not shown).

Figure 10:
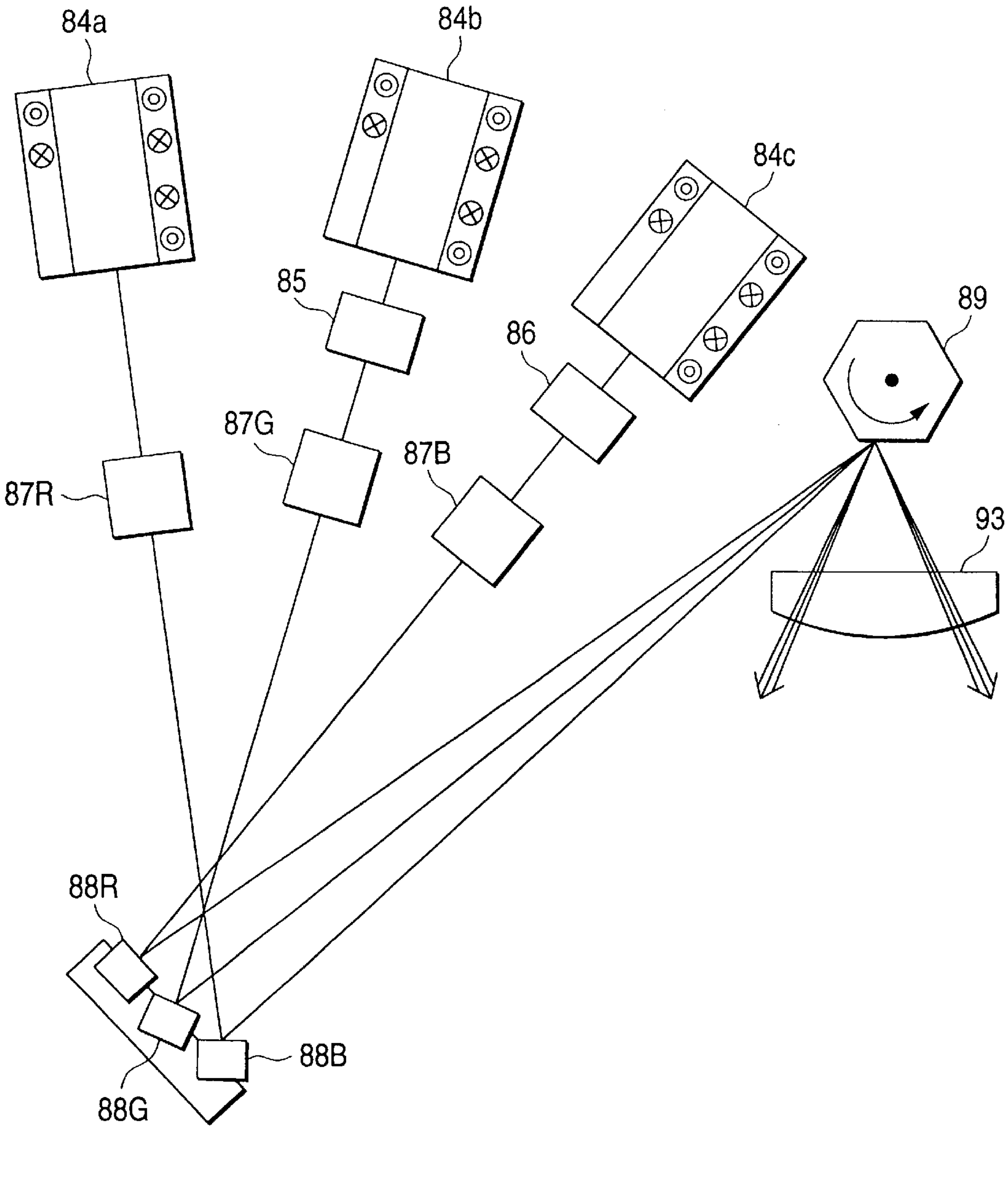
FIG. 10 illustrates the laser beam irradiation means of the image output unit shown in FIG. 9.

FIG. 10 schematically illustrates the laser beam irradiation means 82 of FIG. 9. The laser beam irradiation means 82 has a semiconductor laser beam sources 84*a*, 84*b*, and 84*c*. A laser beam emitted from the semiconductor laser beam source 84*b* is converted to a green laser beam having a wavelength of 532 nm by means of a wavelength conversion means 85, and a laser beam emitted from the semiconductor laser beam source 84*c* is converted to a blue laser beam having a wavelength of 473 nm by a wavelength conversion means 86.

A red laser beam having an arbitrary wavelength between 670 nm and 690 nm which is emitted from the semiconductor laser beam source 84*a*, the green laser beam having its wavelength converted by the wavelength conversion means 85, and the blue laser having its wavelength converted by the wavelength conversion means 86 enter the respective optical modulators 87R, 87G, and 87B, such as acoustic optical modulators. Modulating signals from the modulator driving means 83 are input into the optical modulators 87R, 87G, and 87B, and the laser beam intensity is modulated in accordance with the modulating signals. If the semiconductor laser beam source 84*a* is capable of high-speed working, it can be directly modulated so that the optical modulator 87R can be omitted.

The laser beams with their intensity modulated by the respective optical modulators 87R, 87G and 87B are reflected on the respective reflectors 88R, 88G and 87B and then reflected on a polygonal reflector 89. At this time, paper is transferred at a speed of about 75 mm/sec. The scanning line-density is 600/in. Each pixel is modulated for every 100 nsec.

The image output unit 8 is equipped with a magazine 91 containing a roll of color paper 90. Color paper 90 is transferred in the sub-scanning direction along a predetermined route at a speed of about 110 mm/sec. The color paper can have a width of from 89 mm up to 210 mm. Color paper generally employed in mini laboratories, etc. and color paper exclusive for high illumination intensity short exposure with a laser beam can be used. The magazine 91 can be a general one used in mini laboratories, for example, the one described in Japanese Patent Application No. 317051/92. A perforation means 92 is provided in the route of color paper 90, with which a perforation is made in the edge of color paper 90 at an interval corresponding to a length of a color print. The perforation is used as a register mark for synchronizing the transport of color paper 90 with driving of other means in the image output unit 8. The color paper transport means described in JP-A-4-147259 and the processing tanks described in JP-A-4-155333 can be used.

The modulated laser beams from optical modulators 87R, 87G and 87B are reflected on the polygonal mirror 89 to scan the color paper 90 through an fθ lens 93 in the main scanning direction. Color paper 90, being transported in the sub-scanning direction, is thus scanned with the laser beams over its entire surface. The transport speed of the color paper 90 in the sub-scanning direction is controlled by the CPU 79 so as to synchronize with the main scanning speed of the laser beams, i.e., the rotational speed of the polygonal mirror 89.

The exposed color paper 90 is forwarded at a speed of about 29 mm/sec to a development processing zone composed of a color development tank 94, a bleach-fixing tank 95, and a wash tank 96, where it is subjected to color development, bleach-fixing, and washing to reproduce a color image on the color paper 90 based on the image data processed in the image processor unit 5. The developed color paper 90 is sent to a drying zone 97. After drying, the color paper 90 is cut to the lengths in conformity to the frame length of film F or the length of the color image on color paper P with a cutter 98 which is driven synchronously with the moving color paper 90 (the above-mentioned register perforation is made use of), forwarded to a sorter 99, where the color prints are laid one on another for each roll of film F or for each customer. The sorter to be used here is disclosed in JP-A-4-199052.

The color developing tank 94, bleach-fixing tank 95, wash tank 96, drying zone 97, cutter 98 and sorter 99 can be those used in general automatic processors for mini laboratories. While the embodiments of the present invention use a processing formula CP47L, the system is also applicable to CP40FA and CP43FA formulae.

According to the embodiments of the present invention, calibration can be carried out as follows in order to absorb dispersions and variations of characteristics of color paper, laser beam sources, optical modulators, and developing processors thereby carrying out image reproduction in a stable manner. Color paper is exposed through a pattern having density steps according to memorized density data (cyan, magenta or yellow monochrome or gray formed by superimposition of the three colors) and developed, and the developed densities are automatically measured with a densitometer. Based on the differences between the target densities and the measured densities, memorized tables of the characteristics of electrical signals to be sent to the modulators on exposure are rewritten to correct the density data to be reproduced. The influences of the kind of the paper used and the variations of equipment or environmental conditions are thus excluded to carry out image reproduction always in a stable manner. The input equipment separately has its own calibration function in order to absorb characteristics variations accompanying exchange of halogen lamps, etc. That is, the input equipment and the output equipment are independently managed to make image reproduction stable.

V. Positive Light-Sensitive Materials as Output Media:

The output media useful for positive image formation in the present invention include those used for printers which reproduce an image according to time-sequence electrical or optical signals, such as ink jet printers, sublimation type heat sensitive transfer printers, color diffusion transfer printers, color photographic printers, heat developable silver salt color diffusion transfer printers, heat developable multilayer color diazo printers, and silver salt color printers.

Preferred of these output media is color paper. It is preferred that the light-sensitive silver halide emulsions used in the light-sensitive material each have a silver chloride content of at least 95 mol %, the balance being silver bromide, and contain substantially no silver iodide. The phrase "substantially no silver iodide" as used herein is intended to mean that the silver iodide content is not more than 1 mol %, preferably not more than 0.2 mol %, still preferably 0 mol %. From the viewpoint of suitability to rapid processing, silver halide emulsions having a silver chloride content of 98 mol % or more are preferred. Silver halide grains having a localized silver bromide phase on their surface are particularly preferred for their high sensitivity and stabilized photographic performance.

A silver halide emulsion which is present in at least one light-sensitive silver halide emulsion layer is preferably a mono-dispersed emulsion having a grain size distribution coefficient of variation (a standard deviation of grain size distribution divided by a mean grain size) of 15% or less, particularly 10% or less. For obtaining broader latitude, a mixture of two or more kinds of such mono-dispersed emulsions is preferably used in a layer. It is preferred for the two or more mono-dispersed emulsions to be combined to be different from each other in average grain size by 15% or more, particularly 20 to 60%, especially 25 to 50%, and in sensitivity by 0.15 to 0.50 logE, particularly 0.20 to 0.40 logE, especially 0.25 to 0.35 logE.

It is effective for obtaining desired image gradation to use an emulsion of silver chlorobromide grains having a silver chloride content of at least 95 mol % with substantially no silver iodide content, containing $1\times10^{-5}$ to $1\times10^{-3}$ mol of an iron and/or ruthenium and/or osmium compound per mole of the silver-halide, and containing $1\times10^{-7}$ to $1\times10^{-5}$ mol, per mole of the silver halide, of an iridium compound in the localized silver bromide phase.

The silver halide light-sensitive materials used as an output medium can contain known photographic materials and additives.

Usable supports include transmission types and reflection types. Suitable transmission type supports include transparent films such as a cellulose nitrate film and a polyethylene terephthalate film; and polyester films (such as a polyester of 2,6-naphthalenedicarboxylic acid (NDCA) and ethylene glycol (EG) or a polyester of NDCA, terephthalic acid, and EG) having an information recording layer, such as a magnetic layer. Reflection type supports (i.e., reflective supports) are preferably used in the present invention. Particularly preferred are reflective supports having a water-resistant resin laminate layer comprising a plurality of polyethylene layers or polyester layers at least one of which contains a white pigment, such as titanium oxide.

The water-resistant resin layer preferably contains a fluorescent whitening agent. A fluorescent whitening agent can be dispersed in a hydrophilic colloidal layer of the light-sensitive material. Useful fluorescent whitening agents include benzoxazole compounds, coumarin compounds and pyrazoline compounds. Benzoxazolylnaphthalene or benzoxazolylstilben fluorescent whitening agents are preferred. While not limiting, the fluorescent whitening agent is used in an amount of 1 to 100 mg/m$^2$. Where mixed with the water-resistant resins, the fluorescent whitening agent is preferably used in an amount of 0.0005 to 3% by weight, particularly 0.001 to 0.5% by weight, base on the water-resistant resin.

A support coated with a hydrophilic colloidal layer containing a white pigment is also useful as a reflective support. A reflective support with a metal surface having specular reflection properties or diffused reflection properties of second kind is useful as well.

The following list of prior arts gives sources to which reference can be made for the details on useful reflective supports, silver halide emulsions, dopant metal ion species in silver halide grains, storage stabilizers or antifoggants for silver halide emulsions, chemical sensitization and sensitizers used therefor, spectral sensitization and spectral sensitizers used therefor, cyan, magenta or yellow couplers and dispersion methods therefor, color image storage characteristics improving agents (stain inhibitors and fading inhibitors), dyes and colored layers containing the same, gelatin species, layer structures of the light-sensitive materials, and the pH of the coating layer of the light-sensitive materials.

TABLE 1

| Item | JP-A-7-104448 | JP-A-7-77775 | JP-A-7-310895 |
|---|---|---|---|
| Reflective support | col. 7, l. 12–col. 12, l. 19 | col. 35, l. 43–col. 44, l. 1 | col. 5, l. 40–col. 9, l. 26 |
| Silver halide emulsion | col. 72, l. 29–col. 74, l. 18 | col. 44, l. 36–col. 46, l. 29 | col. 77, l. 48–col. 80, l. 28 |
| Dopant metal ion species | col. 74, ll. 19–44 | col. 46, l. 30–col. 47, l. 5 | col. 80, l. 29–col. 81, l. 6 |
| Storage stabilizer or antifoggant | col. 75, ll. 9–18 | col. 47, ll. 20–29 | col. 18, l. 11–col. 31, l. 37 (esp. mercapto-heterocyclic compounds) |
| Chemical sensitization (chemical sensitizer) | col. 74, l. 45–col. 75, l. 6 | col. 47, ll. 7–17 | col. 81. ll. 9–17 |
| Spectral sensitization (spectral sensitizer) | col. 75, l. 19–col. 76, l. 45 | col. 47, l. 30–col. 49, l. 6 | col. 81, l. 21–col. 82, l. 48 |
| Cyan coupler | col. 12, l. 20–col. 39, l. 49 | col. 62, ll. 50–16 | col. 88, l. 49–col. 89, l. 16 |
| Yellow coupler | col. 87, l. 40–col. 88, l. 3 | col. 63, ll. 17–30 | col. 89, ll. 17–30 |
| Magenta coupler | col. 88, ll. 4–18 | col. 63, l. 3–col. 64, l. 11 | col. 31, l. 34–col. 77, l. 44 & col. 89, ll. 32–46 |
| Dispersion method for couplers | col. 71, l. 3–col. 72, l. 11 | col. 61, ll. 36–49 | col. 87, ll. 35–48 |
| Color image storage characteristics improving agent (stain inhibitor) | col. 39, l. 50–col. 70, l. 9 | col. 61, l. 50–col. 62, l. 49 | col. 87, l. 49–col. 88, l. 48 |
| Fading inhibitor | col. 70, l. 10–col. 71, l. 2 | | |
| Dye (colored layer) | col. 77, l. 42–col. 78, l. 41 | col. 7, l. 14–col. 19, l. 42 & col. 50, l. 3–col. 51, l. 14 | col. 9, l. 27–col. 18, l. 10 |
| Gelatin species | col. 78, ll. 42–48 | col. 51, ll. 15–20 | col. 83, ll. 13–19 |
| Layer structure of light-sensitive material | col. 39, ll. 11–26 | col. 44 ll. 2–35 | col. 31, l. 38–col. 32, l. 33 |
| Coating layer pH of light-sensitive material | col. 72, ll. 12–28 | | |
| Scanning exposure | col. 76, l. 6–col. 77, l. 41 | col. 49, l. 7–col. 50, l. 2 | col. 82, l. 49–col. 83, l. 12 |
| Preservative for developer | col. 88, l. 19–col. 89, l. 22 | | |

Cyan, magenta and yellow couplers which can be used in the light-sensitive materials as an output medium (color paper) additionally include those described in JP-A-62-215272, p. 91, right upper col., 1. 5 to p. 121, left upper col., 1. 6; JP-A-2-33144, p. 3, right upper col., 1. 14 to p. 18, left upper col., the last line and p. 30, right upper col., 1. 6 to p. 35, right lower col., 1. 11; and EP 0355,660A, p. 4, 11. 15–27, p. 5, 1. 30 to p. 28, the last line, p. 45, 11. 29–31, and p. 47, 1. 23 to p. 63, 1. 50.

Antibacterial or antifungal agents which can be used in the light-sensitive materials as an output medium are described in JP-A-63-271247.

In order to make the image reproduction system more compact and less expensive, a light source capable of secondary harmonic generation (SHG) composed of a semiconductor laser or a solid state laser and a nonlinear optical crystal is preferably used. A semiconductor laser is preferred for design of a compact, inexpensive, long-life and safe system. It is preferable that at least one of exposure sources be a semiconductor laser.

Where such a scanning exposure light source is used, the spectral sensitivity maximum wavelength of the color light-sensitive material can be set arbitrarily based on the wavelength of the scanning exposure light source. With the use of an SHG light source composed of a nonlinear optical crystal and a solid state laser or semiconductor laser using a semiconductor laser as an exciting light source, since the oscillation wavelength of the laser can be cut by half, blue light and green light can be obtained. In this case, it is possible to make the light-sensitive material have its spectral sensitivity maximum in each of blue, green and red wavelength regions.

The exposure time in such scanning exposure is preferably $10^{-4}$ second or shorter, still preferably $10^{-6}$ second or shorter, the exposure time being defined as a time for exposing a pixel size at a pixel density of 400 dpi.

For the details of preferred scanning exposure systems for use in the present invention, refer to the publications listed in the above table.

Processing of the color light-sensitive material as an output medium can preferably be carried out by using the materials and methods disclosed in JP-A-2-207250, p. 26, lower right col., l. 1 to p. 34, upper right col., l. 9 and JP-A-4-97355, p. 5, upper left col, l. 17 to p. 18, lower right col., l. 20. Preferred preservatives for use in the disclosed developers are described in the publications listed in the above table.

The exposed color light-sensitive materials is typically developed with a conventional developing solution containing an alkali agent and a color developing agent. A color light-sensitive material containing therein a color developing agent (reducing agent for color formation) can be developed with an activator solution, such as an alkali solution containing no developing agent. Other developing methods are used for the above-described silver salt or non-silver salt type light-sensitive materials.

VI. Development Processing and Color Light-Sensitive Materials for Photographing Applicable to the Present Invention:

In the foregoing, basic development processing has been explained based on currently spread common processing, such as CN16 series formulae and C41 series formulae, but is not limited thereto, and any standardized formula can be regarded as basic development processing.

The color development processing to which the present invention is applicable is described hereunder.

Color developing solutions contain known aromatic primary amine color developing agents, preferably p-phenylenediamine derivatives. Typical examples of suitable p-phenylenediamine developing agents are listed below.

1) N,N-Diethyl-p-phenylenediamine
2) 4-Amino-N,N-diethyl-3-methylaniline
3) 4-Amino-N-(β-hydroxyethyl)-N-methylaniline
4) 4-Amino-N-ethyl-N-(β-hydroxyethyl)aniline
5) 4-Amino-N-ethyl-N-(β-hydroxyethyl)-3-methylaniline
6) 4-Amino-N-ethyl-N-(3-hydroxypropyl)-3-methylaniline
7) 4-Amino-N-ethyl-N-(4-hydroxybutyl)-3-methylaniline
8) 4-Amino-N-ethyl-N-(β-methanesulfonamidoethyl)-3-methylaniline
9) 4-Amino-N,N-diethyl-3-(β-hydroxyethyl)aniline
10) 4-amino-N-ethyl-N-(β-methoxyethyl)-3-methylaniline
11) 4-Amino-N-(β-ethoxyethyl)-N-ethyl-3-methylaniline
12) 4-Amino-N-(3-carbamoylpropyl)-N-n-propyl-3-methylaniline
13) 4-Amino-N-(4-carbamoylbutyl)-N-n-propyl-3-methylaniline
15) N-(4-Amino-3-methylphenyl)-3-hydroxypyrrolidine
16) N-(4-Amino-3-methylphenyl)-3-(hydroxymethyl) pyrrolidine
17) N-(4-Amino-3-methylphenyl)-3-pyrrolidinecarboxamide Particularly preferred of these p-phenylenediamine derivatives are compounds (5) to (8) and (12). When supplied in a solid form, they are usually available as a salt, such as a sulfate, a hydrochloride, a sulfite, a naphthalenedisulfonate or a p-toluenesulfonate. The aromatic primary amine developing agent is usually used in concentrations of 2 to 200 mmol, preferably 12 to 200 mmol, still preferably 12 to 150 mmol, per liter of a developing solution or a replenisher thereof.

A developing solution or a developing solution replenisher sometimes contains a small amount of sulfite ions and sometimes contains substantially no sulfite ions, according to the kind of a light-sensitive material; for sulfite ions exhibit an appreciable preservative action for a developing solution but can adversely affect the photographic performance of some kinds of light-sensitive materials.

Similarly hydroxylamines are sometimes incorporated into constituent components of a light-sensitive material and sometimes not; for they have a function as a preservative for a developing solution but can influence the photographic characteristics on account of their silver developing activity.

That is, a developing solution or a replenisher thereof can contain inorganic preservatives, e.g., hydroxylamines and sulfite ions, or organic preservatives. The organic preservatives include general organic compounds which retard deterioration of the aromatic primary amine color developing agents, namely organic compounds which function in protecting color developing agents against aerial oxidation when added to a developing solution. Particularly effective organic preservatives include hydroxylamine derivatives, hydroxamic acids, hydrazide derivatives, phenol derivatives, α-hydroxyketone derivatives, α-aminoketone derivatives, saccharides, monoamines, diamines, polyamines, quaternary ammonium salts, nitroxyl radical compounds, alcohols, oximes, diamide compounds, and condensed cyclic amines. These compounds are disclosed in JP-A-63-4235, JP-A-63-30845, JP-A-21647, JP-A-63-44655, JP-A-63-53551, JP-A-63-43140, JP-A-63-56654, JP-A-63-58346, JP-A-63-43138, JP-A-63-146041, JP-A-63-44657, JP-A-63-44656, U.S. Pat. Nos. 3,615,503 and 2,494,903, JP-A-52-143020, and JP-B-48-30496.

Other preservatives, such as various metals described in JP-A-57-44148 and JP-A-57-53749, salicylic acid compounds described in JP-A-59-180588, alkanolamines described in JP-A-54-3532, polyethyleneimine compounds described in JP-A-56-94349, aromatic polyhydroxy compounds described in U.S. Pat. No. 3,746,544, and the like, can be added if desired. In particular, addition of alkanolamines other than those described above, such as triethanolamine; substituted or unsubstituted dialkylhydroxylamines, such as disulfoethylhydroxylamine and diethylhydroxylamine; or aromatic polyhydroxy compounds is preferred.

Of the above-mentioned organic preservatives hydroxylamine derivatives are preferred. The details of the hydroxylamine derivatives are described in JP-A-1-97953, JP-A-1-186939, JP-A-1-186940, and JP-A-1-187557. A combined use of a hydroxylamine derivative and an amine is especially preferred for improvements in stability of a color developing solution and stability in continuous processing. The amine includes cyclic amines described in JP-A-63-239447, amines described in JP-A-63-128340, and amines described in JP-A-1-186939 and JP-A-1-187557.

The developing solution used in the development processing according to the present invention contains bromide ions or chloride ions. The bromide ion concentration is preferably about 1 to $5\times10^{-3}$ mol/l for processing light-sensitive materials for photographing; and $1.0\times10^{-3}$ mol/l or less for processing printing materials. The developing solution used for materials for photographing often contains about 0.1 to $5.0\times10^{-4}$ mol/l of iodide ions.

The color developing solution or a replenisher thereof used in the present invention is designed to have a pH of 10 or higher, preferably 10.1 to 12.5 and can contain known components in addition to the above-described developing agents and preservatives, such as buffering agents, chelating agents, development accelerators, antifoggants, and surface active agents.

The pH adjustment of the color developing solution or a replenisher is preferably effected by the use of buffering agents. Useful buffering agents include carbonates, phosphates, borates, tetraborates, hydroxybenzoates, glycine salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts, and lysine salts. Carbonates, phosphates, tetraborates and hydroxybenzoates are particularly preferred; for they are superior in buffering capacity in a high pH region of 9.0 or higher, give no adverse influences on photographic performance (e.g., fog) when added to color or black-and-white developing solutions, and are inexpensive. Specific examples of these buffering agents are sodium carbonate, potassium carbonate, sodium hydrogencarbonate, potassium hydrogencarbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), and potassium 5-sulfo-2-hydroxybenzoate (potassium 5-sulfosalicylate).

The buffering agents are used in a concentration of 0.01 to 2.0 mol, preferably 0.1 to 0.5 mol, per liter of a developing solution replenisher as prepared by diluting a stock solution with water.

The chelating agents function as an agent for preventing deposition of calcium or magnesium or as an agent for improving the stabilizer of the developing solution. Examples of useful chelating agents are nitrilotriacetic acid, diethylenetriaminepentaacetic acid, ethylenediaminetetraacetic acid, N,N,N-trimethylenephosphonic acid, ethylenediamine-N,N,N',N'-tetramethylenesulfonic acid, trans-cyclohexanediaminetetraacetic acid, 1,2-diaminopropanetetraacetic acid, glycol ether diaminetetraacetic acid, ethylenediamine-o-hydroxyphenylacetic acid, 2-phosphonobutane-1,2,4-tricarboxylic acid, 1-hydroxyethylidene-1,1-diphosphonic acid, N,N'-bis(2-hydroxybenzyl)ethylenediamine-N,N'-diacetic acid, and 1,2-dihydroxybenzene-4,6-disulfonic acid. These chelating agents may be used either individually or as a combination of two or more thereof.

Useful developing accelerators include thioether compounds described in JP-B-37-16088, JP-B-37-5987, JP-B-38-7826, JP-B-44-12380, JP-B-45-9019, and U.S. Pat. No. 3,813,247; p-phenylenediamine compounds described in JP-A-52-49829 and JP-A-50-15554; quaternary ammonium salts described in JP-A-50-137726, JP-B-44-30074, JP-A-56-156826, and JP-A-52-43429; amine compounds described in U.S. Pat. Nos. 2,494,903, 3,128,182, 4,230,796, and 3,253,919, JP-B-41-11431, and U.S. Pat. Nos. 2,482,546, 2,596,926, and 3,582,346; polyalkylene oxides described in JP-B-37-16088, JP-B-42-25201, U.S. Pat. No. 3,128,183, JP-B-41-11431, JP-B-42-238883, and U.S. Pat. No. 3,532,501; 1-phenyl-3-pyrazolidone derivatives; imidazole derivatives; and the like.

Useful antifoggants include alkali metal halides, such as sodium chloride, potassium bromide, and potassium iodide; and organic antifoggants, typically nitrogen-containing heterocyclic compounds, such as benzotriazole, 6-nitrobenzimidazole, 5-nitroisoindazole, 5-methylbenzotriazole, 5-nitrobenzotriazole, 5-chlorobenzotriazole, 2-thiazolylbenzimidazole, 2-thiazolylmethylbenzimidazole, indazole, hydroxyazaindolidine, and adenine.

The antifoggants are used in a concentration of 0.01 mg to 2 g per liter of a working solution as prepared by diluting a stock solution with water. More specifically, for processing silver iodobromide light-sensitive materials, mercaptoazole compounds are used in a concentration of 0.2 mg to 0.2 g/l, and non-mercaptoazole compounds are used in a concentration of 1 mg to 2 g/l. For processing silver chlorobromide, silver bromide or silver chloride light-sensitive materials, mercaptoazole compounds and non-mercaptoazole compounds are used in a concentration of 0.01 mg to 0.3 g/l and of 0.1 mg to 1 g/l, respectively.

Usable surface active agents include alkylsulfonic acids, arylsulfonic acids, aliphatic carboxylic acids, and aromatic carboxylic acids.

The color development can be followed by bleaching with a known bleaching solution, bleach-fixing with a known bleach-fix solution, or fixing with a known fixing solution.

The bleaching agent to be used in the bleaching or bleach-fixing solution is not particularly limited. Preferred bleaching agents include organic complex salts of iron (III) (e.g., aminopolycarboxylates), organic acids, e.g., citric acid, tartaric acid and malic acid, persulfates, and hydrogen peroxide.

The organic complex salts of iron (III) are especially preferred from the standpoint of suitability to rapid processing and environmental conversation. Examples of aminopolycarboxylic acids useful for forming the organic iron (III) complex salts are ethylenediaminesuccinic acid (SS-form), N-2-carboxylatoethyl)-L-aspartic acid, β-alaninediacetic acid, and methyliminodiacetic acid, which are biodegradable; ethylenediaminetetraacetic acid, diethylenetriaminepentaacetic acid, 1,3-diaminopropanetetraacetic acid, propylenediaminetetraacetic acid, nitrilotriacetic acid, cyclohexanediaminetetraacetic acid, iminodiacetic acid, and glycol ether diaminetetraacetic acid. These compounds may have a salt form with sodium, potassium, lithium or ammonium. Of these compounds preferred are ethylenediaminedisuccinic acid (SS-form), N-(2-carboxylatoethyl)-L-aspartic acid, β-alaninediacetic acid, ethylenediaminetetraacetic acid, 1,3-diaminopropanetetraacetic acid, and methyliminodiacetic acid; for the iron (III) complex salts formed by using these compounds bring about satisfactory photographic characteristics. The iron (III) complex salts may be supplied as such or formed in situ by addition of a ferric salt (e.g., ferric sulfate, ferric chloride, ferric nitrate, ammonium ferric sulfate, ferric phosphate, etc.) and a chelating agent, such as an aminopolycarboxylic acid. The chelating agent can be added in excess over the amount necessary for forming the ferric ion complex salt. The iron complex is used in a concentration of 0.01 to 1.0 mol, preferably 0.05 to 0.50 mol, still preferably 0.10 to 0.50 mol, particularly preferably 0.15 to 0.40 mol, per liter of a processing solution as prepared by diluting a stock solution with water.

The bleach-fix solution or bleaching solution for color processing contains one or more known fixing agents, i.e., water-soluble silver halide solvents, such as thiosulfates (e.g., sodium thiosulfate and ammonium thiosulfate), thiocyanates (e.g., sodium thiocyanate and ammonium thiocyanate), thioether compounds (e.g., ethylenebisthioglycolic acid and 3,6-dithia-1,8-octanediol), and thioureas. A special bleach-fix solution containing a fixing agent combined with a large quantity of a halide, e.g., potassium iodide, as disclosed in JP-A-55-155354, is also useful. In the present invention thiosulfates, especially ammonium thiosulfate, are preferred. The fixing agent is used preferably in a concentration of 0.3 to 2 mol, particularly 0.5 to 1.0 mol, per liter of a prepared processing solution.

The pH of the prepared bleach-fix or fixing solution is preferably 3 to 8, still preferably 4 to 7. At a lower pH the desilvering performance is enhanced, but deterioration of the solution and reduction of a cyan dye are accelerated. At a higher pH desilvering is retarded, and staining can easily result.

The pH of the prepared bleaching solution is 8 or lower, preferably 2 to 7, still preferably 2 to 6. At a lower pH, deterioration of the solution and reduction of a cyan dye are accelerated. At a higher pH desilvering is retarded, and staining can easily result.

For pH adjustment, hydrochloric acid, sulfuric acid, nitric acid, a hydrogencarbonate, ammonia, potassium hydroxide, sodium hydroxide, sodium carbonate, potassium carbonate, etc. can be added if necessary.

The composition of the bleach-fixing agent can further contain a fluorescent whitening agent (examples of fluorescent whitening agents have previously been given), an antifoaming agent or a surface active agent, and an organic solvent (e.g., polyvinylpyrrolidone, methanol, etc.).

The composition of the bleach-fixing agent or fixing agent preferably contains, as preservatives, sulfite ion-releasing compounds, such as sulfites (e.g., sodium sulfite, potassium sulfite, ammonium sulfite), bisulfites (e.g., ammonium hydrogensulfite, sodium hydrogensulfite, potassium hydrogensulfite), and metabisulfites (e.g., sodium metabisulfate, potassium metabisulfite, ammonium metabisulfite); or arylsulfinic acids, such as p-toluenesulfinic acid and m-carboxybenzenesulfinic acid. These compounds are preferably used in a concentration of about 0.02 to 1.0 mol/l in terms of sulfite ions or sulfinate ions.

Ascorbic acid, a carbonyl/bisulfite addition compound or a carbonyl compound can also be used as a preservative. If desired, the composition of the bleach-fixing or fixing agent can contain a buffering agent, a fluorescent whitening agent, a chelating agent, an antifoaming agent, an antifungal agent, and the like.

In carrying out the basic development processing, the temperature of the color developing solution is preferably 30° C. or higher, still preferably 35 to 55° C., particularly preferably 38 to 45° C. The development time for developing color printing materials is preferably not longer than 60 seconds, preferably 15 to 45 seconds, still preferably 5 to 20 seconds. The rate of replenishment is preferably as low as possible, suitably ranging from 20 to 600 ml, preferably 30 to 120 ml, still preferably 15 to 60 ml, per $m^2$ of a light-sensitive material. The development time for developing color negative films or color reversal films is not longer than 6 minutes, preferably 1 to 4 minutes, still preferably 1 to 3 minutes and 15 seconds for color negative films or 1 to 4 minutes for color reversal films.

The bleaching, fixing or bleach-fix step is carried out for a processing time of 5 to 240 seconds, preferably 10 to 60 seconds, at a processing temperature of 25 to 50° C., preferably 30 to 45° C. The rate of replenishment is 20 to 250 ml, preferably 30 to 100 ml, still preferably 15 to 60 ml, per $m^2$ of a light-sensitive material.

The desilvering step (fixing, bleach-fix, etc.) is generally followed by washing and/or stabilization processing.

The amount of water in the washing step can be selected from a broad range according to the characteristics of a light-sensitive material (for example, the kind of materials such as couplers), the use of the light-sensitive material, the temperature of washing water, the number of wash tanks, and other various conditions. In particular, the relationship between the number of wash tanks and the amount of water in a multistage counter-flow system is obtained through the method described in *Journal of the Society of Motion Picture and Television Engineers*, Vol. 64, pp. 248–253 (May, 1955). The number of stages (the number of wash tanks) in a multistage counter-flow system is usually 3 to 15, preferably 3 to 10.

According to the multistage counter-flow system, the quantity of water can be diminished considerably, but because the water retention time in the tanks is so much extended, there inevitably arises the problem that bacteria grow in the tanks to stain light-sensitive materials. The method for reducing calcium and magnesium ions disclosed in JP-A-62-288838 is a very effective solution for this problem. It is also effective to use bactericides or fungicides, such as isothiazolone compounds and thiabendazole compounds described in JP-A-57-8542, chlorine-containing bactericide such as chlorinated sodium isocyanurate described in JP-A-61-120145, benzotriazole compounds described in JP-A-61-267761, copper ions, and those described in Horiguchi Hiroshi, *BOKIN BOBAI NO KAGAKU*, Sankyo Shuppan 1986), Eisei Gijutsukai (ed.), *BISEIBUTSU NO GENKIN, SAKKIN, BOBAIGIJUTSU*, Kogyo Gijutsukai (1982), and Nihon Bokin Bobai Gakkai (ed.), *BOKIN BOBAIZAI JITEN* (1986).

To the wash tank can be added aldehydes that deactivate any remaining magenta couplers to prevent fading or stain formation, such as formaldehyde, acetaldehyde, and pyruvic aldehyde; methylol compounds or hexamethylenetetramine as described in U.S. Pat. No. 4,786,583; hexahydrotriazine compounds described in JP-A-2-153348; formaldehyde/bisulfite addition compounds described in U.S. Pat. No. 4,921,779; and azolylmethylamines described in EP 504609 and EP 519190.

In addition, water for washing can contain a surface active agent to improve drainage or a chelating agent, e.g., EDTA, as a water softener.

The washing step may be followed by or replaced with stabilization processing with a stabilizing bath. The stabilizing bath contains compounds having an image stabilizing function, such as aldehyde compounds (e.g., formalin), buffering agents for adjusting the film to a pH suitable for dye stabilization, and ammonium compounds. The above-described bactericides or fungicides can be added to the stabilizing bath to prevent bacteria growth in the bath or to make the processed light-sensitive material mildewproof. The stabilizing bath can further contain surface active agents, fluorescent whitening agents, and hardeners.

Where a washing step is replaced with stabilization processing, all the known techniques taught, e.g., in JP-A-57-8543, JP-A-58-14834, and JP-A-60-220345, can be applied. Use of chelating agents, such as 1-hydroxyethylidene-1,1-diphosphonic acid and ethylenediaminetetramethylenephosphonic acid, or magnesium or bismuth compounds is also a preferred embodiment of stabilization.

A rinsing bath, which can follow desilvering processing as a washing solution or a stabilizing bath, can be used in the same manner as described above.

The pH of the washing water or stabilizing bath is preferably 4 to 10, still preferably 5 to 8. The temperature of the washing water or stabilizing bath is selected appropriately according to the use and characteristics of the light-sensitive material but is usually in the range of from 20 to 50° C., preferably from 25 to 45° C.

The washing and/or stabilization processing is followed by drying. Drying can be accelerated by squeezing the processed light-sensitive material through rollers or wiping up with cloth, etc. immediately after the material is taken out of the washing or stabilization bath so as to minimize penetration of water into the film. Drying can also be accelerated by raising the drying temperature or modifying the shape of the nozzle to strengthen the drying air flow. Such manipulations as adjustment of the blowing angle and discharge of air (ventilation) as described in JP-A-3-157650 are also effective for drying acceleration.

It is preferable to incorporate such antifungal agents as disclosed in JP-A-63-271247 into the light-sensitive materials to prevent various fungi and bacteria which grow in the hydrophilic colloidal layers to deteriorate the image.

The supports which can be used in the light-sensitive materials include cellulose triacetate, polyethylene terephthalate, and polyethylene naphthalate which are used for light-sensitive films for photographing; and resin coated paper having a polyethylene laminate layer containing a white pigment and polyethylene terephthalate film containing a white pigment for display which are used for light-sensitive materials for color printing.

The silver halide emulsions and other materials, inclusive of additives, and photographic layers, inclusive of layer structures which are preferably applicable to the light-sensitive materials and processing methods and processing chemicals which are preferably used in processing the light-sensitive materials are described in EP 355660A2, JP-A-2-33144, and JP-A-62-215272. Photographic additives which are preferably used in the present invention are also described in *Research Disclosure* (RD) Nos. 17643, 18716, and 307105 as listed in Table 2 below. In Table 2, "RC" and "LC" stand for right column and left column, respectively.

TABLE 2

| Additive | RD 17643 | RD 18716 | RD 307105 |
|---|---|---|---|
| Chemical sensitizer | p. 23 | p. 648, RC | p. 866 |
| Speed increasing agent | | p. 648, RC | |
| Spectral sensitizer and supersensitizer | pp. 23–24 | p. 648, RC to p. 649, RC | pp. 866–868 |
| Brightening agent | p. 24 | P. 647, RC | p. 868 |
| Light absorber, filter dye and UV absorber | pp. 25–26 | p. 649, RC to p. 650, LC | p. 873 |
| Binder | p. 26 | p. 651, LC | pp. 873–874 |
| Plasticizer and lubricant | p. 27 | p. 650, RC | p. 876 |
| Coating aid and surface active agent | pp. 26–27 | p. 650, RC | pp. 875–876 |
| Antistatic agent | p. 27 | p. 650, RC | pp. 876–877 |
| Matting agent | | | pp. 878–879 |

Cyan couplers which can be used in the present invention include those described in JP-A-2-33144, EP 333185A2, and JP-A-64-32260.

Cyan, magenta or yellow couplers are preferably emulsified and dispersed in a hydrophilic colloid aqueous solution as infiltrated into a loadable latex polymer (disclosed, e.g., U.S. Pat. No. 4,203,716) in the presence or absence of a high-boiling organic solvent (see Table 1) or as dissolved in a water-insoluble and organic solvent-soluble polymer.

Suitable water-soluble and organic solvent-insoluble polymers include the homopolymers and copolymers described in U.S. Pat. No. 4,857,559 (cols. 7–15) and WO 88/00723 (pp. 12–30). Methacrylate polymers and acrylamide polymers are particularly preferred for dye image stability.

It is preferred for pyrazoloazole couplers, pyrrolotriazole couplers or acylacetamide yellow couplers to be used in combination with compounds which improve dye image storage characteristics, such as those described in EP 277589A2.

Suitable cyan couplers include phenol couplers and naphthol couplers as described in the literature shown in Table 1 and those described in JP-A-2-33144, EP 333185A2, JP-A-64-32260, EP 456226A1, EP 484909, EP 488248, and EP 491197A1.

Useful magenta couplers include 5-pyrazolone couplers as disclosed in the literature shown in Table 1 and those described in WO 92/18901, WO 92/18902, and WO 92/18903. In addition to these 5-pyrazolone magenta couplers, known pyrazoloazole couplers are also useful. In particular, the pyrazoloazole couplers described in JP-A-61-65245, JP-A-61-65246, JP-A-61-14254, EP 226849A, and EP 294785A are preferred in view of hue, image stability, and color forming properties.

Suitable yellow couplers include known acylacetanilide couplers. Inter alia, those described in EP 447969A, JP-A-5-107701, JP-A-5-113642, EP 482552A, and EP 524540A are preferred.

Desilvering is generally followed by washing and/or stabilization processing except where the developed films do not need to be stored. The amount of water in the washing step can be selected from a broad range according to the characteristics of a light-sensitive material (for example, the kind of materials such as couplers), the use of the light-sensitive material, the temperature of washing water, the number of wash tanks, the replenishment system (counter-flow system or down-flow system), and other various conditions. In particular, the relationship between the number of wash tanks and the amount of water in a multistage counter-flow system is obtained through the method described in *Journal of the Society of Motion Picture and Television Engineers*, Vol. 64, pp. 248–253 (May, 1955).

According to the multistage counter-flow system, the quantity of water can be diminished considerably, but because the water retention time in the tanks is so much extended, there inevitably arises the problem that bacteria grow in the tanks to stain light-sensitive materials. The method for reducing calcium and magnesium ions disclosed in JP-A-62-288838 is a very effective solution for this problem. It is also effective to use bactericide or fungicides, such as isothiazolone compounds and thiabendazole compounds described in JP-A-57-8542, chlorine-containing bactericide such as chlorinated sodium isocyanurate described in JP-A-61-120145, benzotriazole compounds described in JP-A-61-267761, copper ions, and those described in Horiguchi Hiroshi, *BOKIN BOBAI NO KAGAKU*, Sankyo Shuppan 1986), Eisei Gijutsukai (ed.), *BISEIBUTSU NO GENKIN, SAKKIN, BOBAIGIJUTSU*, Kogyo Gijutsukai (1982), and Nihon Bokin Bobai Gakkai (ed.), *BOKIN BOBAIZAI JITEN* (1986).

Washing water has a pH of 4 to 9, preferably 5 to 8. The water temperature and washing time to be set vary according to the characteristics and use of the light-sensitive material but are generally 15 to 45° C. and 20 seconds to 10 minutes, preferably 25 to 40° C. and 30 seconds to 5 minutes. The washing step may be replaced with stabilization processing with a stabilizing bath. In this case, all the known techniques taught, e.g., in JP-A-57-8543, JP-A-58-14834, and JP-A-60-220345, can be applied.

The image stabilizing bath contains compounds stabilizing a color image, such as formalin, benzaldehydes (e.g., m-hydroxybenzaldehyde), a formaldehyde/bisulfite addition compound, hexamethylenetetramine and derivatives thereof, hexahydrotriazine and derivatives thereof, N-methylol compounds (e.g., dimethylolurea and N-methylolpyrazole), organic acids, and pH buffering agents. These additives are preferably used in a concentration of 0.001 to 0.02 mol per liter of the stabilizing bath. The concentration of free formaldehyde in the stabilizing bath is preferably as low as possible for preventing diffusion of formaldehyde gas. From this point of view, preferred color image stabilizers include m-hydroxybenzaldehyde, hexamethylenetetramine, N-methylolazole compounds described in JP-A-4-270344 (e.g., N-methylolpyrazole), and azolylmethylamines described in JP-A-4-313753 (e.g., N,N'-bis(1,2,4-triazol-1-ylmethyl)piperazine). In particular, a combination of an azole compound described in JP-A-4-359249 (corresponding to EP 519190A2) (e.g., 1,2,4-triazole) and an azolylmethylamine derivative (e.g., 1,4-bis(1,2,4-triazol-1-ylmethyl)piperazine) is preferred for the high image stabilizing activity and a low formaldehyde vapor pressure. If desired, the stabilizing bath can contain an ammonium compound (e.g., ammonium chloride or ammonium sulfite), a bismuth or aluminum compound, a fluorescent whitening agent, a hardener, an alkanolamine (described in U.S. Pat. No. 4,786,583), and a preservative (selected from those usable in the fixing solution or bleach-fix solution, such as sulfinic acid compounds described in JP-A-1-231051).

In order to prevent water marks during drying, various surface active agents can be added to the washing water and/or the stabilizing bath substituting for washing and the image stabilizing bath. Nonionic surface active agents, particularly alkylphenol ethylene oxide adducts, are preferred for this purpose. Preferred alkylphenols include octylphenol, nonylphenol, dodecylphenol and dinonylphenol. The number of moles of ethylene oxide to be added is preferably 8 to 14. Silicone type surface active agents having a high defoaming effect are also preferred.

The washing water and/or the stabilizing bath and the image stabilizing bath preferably contain various chelating agents. Preferred chelating agents include aminopolycarboxylic acids, such as ethylenediaminetetraacetic acid and diethylenetriaminepentaacetic acid; organic phosphonic acids, such as 1-hydroxyethylidene-1,1-diphosphonic acid, N,N,N'-trimethylenephosphonic acid, and diethylenetriamine-N,N,N', N'-tetramethylenephosphonic acid; and the hydrolyzed maleic anhydride polymer described in EP 345172A1.

The overflow from the wash tank and/or the stabilization tank accompanying replenishment can be reused in the other steps such as a desilvering step.

The open area of the color development tank and the color development replenisher tank, namely, the liquid surface area in contact with air, is preferably as small as possible. The open area ratio, being defined as the open area ($cm^2$) divided by the liquid volume ($cm^3$), is preferably not more than 0.01 ($cm^{-1}$), still preferably not more than 0.005, particularly preferably not more than 0.001.

It is desirable for rapid processing that the cross-over time, i.e., the time involved for a light-sensitive material to be transported from a tank to another tank, be as short as possible. It is preferably not longer than 20 seconds, still preferably not longer than 10 seconds, and particularly preferably 5 seconds or shorter. In order to achieve such a short cross-over time, automatic motion-picture film processors are preferably used in the present invention. Leader transport type or roller transport type processors are particularly preferred. These types of processors are adopted in FP-560B and PP1820V, the automatic processors manufactured by Fuji Photo Film Co., Ltd. The line speed of transport, the higher, the better, is usually 30 cm to 30 m/min, preferably 50 cm to 10 m/min. The leader and the light-sensitive materials are preferably transported by the belt transfer system taught in JP-A-60-191257, JP-A-60-191258, and JP-A-60-191259. A cross-over rack structure with a plate is preferred, which is effective for shortening the cross-over time as well as prevention of inter-solution contamination.

Each processing solution is preferably replenished with water in an amount corresponding to the evaporation loss (evaporation correction). The evaporation correction is particularly preferred for the color developing solution. The evaporation correction is preferably carried out with a liquid level sensor or an overflow sensor. In the most preferred evaporation correction, an estimated amount of water corresponding to an evaporation loss is added, which amount is calculated by using a coefficient obtained based on the operation time, suspension time, and temperature control time of an automatic processor.

Manipulations for diminishing the evaporation loss, such as reduction in open area or adjustment of an air flow of a ventilator, are also necessary. A preferred open area ratio of the color development tank having been described above, the open area of other processing tanks is preferably minimized likewise. A ventilator, which is fitted for prevention of moisture condensation during temperature control, is preferably set to have a rate of ventilation of 0.1 to 1 $m^3$/min, particularly 0.2 to 0.4 $m^3$/min. Drying conditions are also influential on the evaporation of processing solutions. A ceramic heater is preferably used for drying. A preferred drying air flow rate is 4 $m^3$ to 20 $m^3$/min, particularly 6 to 10 $m^3$/min. The thermoregulator of the ceramic heater against overheating is preferably of the type operated through heat transfer. It is preferably fitted to leeward or windward in contact with fins or a heat transfer part. The drying temperature is preferably adjusted according to the water content of the light-sensitive material to be dried. The optimum drying temperature is 45 to 55° C. for 35-mm film, 55 to 65° C. for Brownie film, and 60 to 90° C. for printing materials.

A replenishing pump is used for processing solution replenishment. A bellows pump is preferred. The tube feeding the replenisher to a replenishing nozzle can be narrowed to prevent a back flow when the pump is at rest, which is effective for improving the accuracy of replenishment. A preferred inner diameter of the feed tube is 1 to 8 mm, particularly 2 to 5 mm.

The processing tanks, the temperature control tanks, etc. are preferably made of modified polyphenylene oxide resins or modified polyphenylene ether resins. Useful modified polyphenylene oxide resins include Nolyl produced by Nippon GE Plastics K. K., and useful modified polyphenylene ether resins include Xylon produced by Asahi Chemical Industry Co., Ltd., and Yupiace produced by Mitsubishi Gas Chemical Co., Inc. These materials are also suited to the parts coming into contact with processing solutions, such as racks and cross-over parts.

The drying time is preferably 10 seconds to 2 minutes, still preferably 20 to 80 seconds.

While the processing steps have been described with reference to continuous processing with replenishment, the present invention is applicable as well to batch system processing in which development processing is conducted with a given amount of each processing solution without replenishment, and the whole or part of each processing solution is changed for a fresh one occasionally.

The color negative films which can be used for photographing in the present invention will be described in detail.

The color negative film comprises a support having provided thereon at least one light-sensitive layer. Typical is a silver halide light-sensitive material comprising a support having thereon at least one light-sensitive layer composed of a plurality of silver halide emulsion layers which are substantially equal in color sensitivity but different in photographic speed. The plural silver halide emulsions layers make up a unit light-sensitive layer sensitive to any one of blue light, green light and red light. In multilayer silver halide color light-sensitive materials, unit light-sensitive layers are usually provided in the order of a red-sensitive layer, a green-sensitive layer, and a blue-sensitive layer from the support. According to the purpose, this order of layers can be reversed, or two layers having the same color sensitivity can have a light-sensitive layer having different color sensitivity sandwitched therebetween. A light-insensitive layer can be provided between silver halide light-sensitive layers or as a top layer or a bottom layer.

These layers may contain couplers, DIR compounds, color mixture preventives, and the like. Each unit light-sensitive layer generally has a two-layer structure composed of a high-speed emulsion layer and a low-speed emulsion layer, which are preferably provided in an order of descending sensitivity toward the support, as described in West German Patent 1,121,470 and British Patent 923,045. It is also possible to provide a low-speed emulsion layer farther from the support, and a high-speed emulsion layer nearer to the support, as described in JP-A-57-112751, JP-A-62-200350, JP-A-62-206541, and JP-A-62-206543.

Examples of layer orders include an order of low-speed blue-sensitive layer (BL)/high-speed blue-sensitive layer (BH)/high-speed green-sensitive layer (GH)/low-speed green-sensitive layer (GL)/high-speed red-sensitive layer (RH)/low-speed red-sensitive layer (RL), an order of BH/BL/GL/GH/RH/RL, and an order of BH/BL/GH/GL/RL/RH, each from the side farthest from the support. A layer order of blue-sensitive layer/GH/RH/GL/RL from the side farthest from the support as described in JP-B-55-34932 and a layer order of blue-sensitive layer/GL/RL/GH/RH from the side farthest from the support as described in JP-A-56-25738 and JP-A-62-63936 are also employable.

Further, a unit light-sensitive layer may be composed of three layers whose sensitivity varies in a descending order toward the support, i.e., the highest-speed emulsion layer as the upper layer, a middle-speed emulsion layer as an intermediate layer, and the lowest-speed emulsion layer as the lower layer, as proposed in JP-B-49-15495. Three layers of different sensitivity in each unit may also be arranged in the order of middle-speed emulsion layer/high-speed emulsion layer/low-speed emulsion layer from the side farther from a support as described in JP-A-59-202464. Furthermore, an order of high-speed emulsion layer/low-speed emulsion layer/middle-speed emulsion layer or an order of low-speed emulsion layer/middle-speed emulsion layer/high-speed emulsion layer are also useful. In the case of multilayer structures composed of 4 or more unit light-sensitive layers, the order of silver halide emulsion layers may be altered similarly.

An interlayer effect-donating layer (CL) which has a different spectral sensitivity distribution from a main light-sensitive layer (BL, GL or RL) is preferably provided next or close to the main light-sensitive layer for the purpose of improving color reproducibility, as described in U.S. Pat. Nos. 4,663,271, 4,705,744 and 4,707,436, JP-A-62-160448, and JP-A-63-89850.

Silver halides which can be preferably used in the present invention are silver iodobromide, silver iodochloride and silver iodochlorobromide having a silver iodide content of not more than about 30 mol %. Silver iodobromide or silver iodochlorobromide having a silver iodide content of about 2 mol % to about 10 mol % are still preferred.

The silver halide emulsion grains include those having a regular crystal form, such as a cubic form, an octahedral form or a tetradecahedral form; those having an irregular crystal form, such as a spherical form and a tabular form; those having a crystal defect such as a twinning plane; and those having a composite form of these crystal forms. The silver halide grains can have a broad range of size, form about 0.2 μm or even smaller up to about 10 μm in terms of a projected area diameter. The emulsion may be either a polydispersion or a monodispersion.

The silver halide emulsions to be used in the present invention can be prepared by known techniques described, e.g., in *Research Disclosure*, No. 17643, pp. 22–23, "I. Emulsion preparation and types" (December, 1978), ibid., No. 18716, p. 648 (November, 1979), ibid., No. 307105, pp. 863–865 (November, 1989), P. Glafkides, *Chemie et Phisique Photographique*, Paul Montel (1967), G. F. Duffin, *Photographic Emulsion Chemistry*, Focal Press (1966), and V. L. Zelikman, et al., *Making and Coating Photographic Emulsion*, Focal Press (1964).

The monodispersed emulsions described in U.S. Pat. Nos. 3,574,628 and 3,655,394 and British Patent 1,413,748 are also preferred. Tabular grains having an aspect ratio of about 3 or more are also useful in the present invention. The tabular grains can easily be prepared by known processes described, e.g., in Gutoff, *Photographic Science and Engineering*, Vol. 14, pp. 248–257 (1970), U.S. Pat. Nos. 4,434,226, 4,414,310, 4.433,048, and 4,439,520, and British Patent 2,112,157.

The silver halide grains may have a homogeneous crystal structure, or may have a heterogeneous structure in which the inside and the outside have different halogen compositions, or may have a layered structure. Silver halides of different composition may be fused by epitaxy. Compounds other than silver halides, such as silver thiocyanate or lead oxide, may be fused to silver halide grains. Further, a mixture of various grains having different crystal forms may be used.

The emulsions may be any of a surface latent image type which forms a latent image predominantly on the surface of the grains, an internal latent image type which forms a latent image predominantly in the inside of the grains, and a type which forms a latent image both on the surface and in the inside. Anyway, the emulsion must be of negative type. The internal latent image type emulsion may be a core/shell type emulsion as described in JP-A-63-264740. The process for preparing a core/shell type internal latent image type emulsion is described in JP-A-59-133542. The shell thickness is preferably 3 to 40 nm, still preferably 5 to 20 nm, while varying depending on development processing, etc.

The silver halide emulsions are usually used after being subjected to physical ripening, chemical ripening, and spectral sensitization. Additives used in these steps are described in *Research Disclosure*, Nos. 17643, 18716, and 307105 as hereinafter tabulated.

A mixture of two or more emulsions different in at least one of grain size, grain size distribution, halogen composition, grain shape, and sensitivity may be used in the same layer. Surface fogged silver halide grains described in U.S. Pat. No. 4,082,553, internal fogged silver halide grains described in U.S. Pat. No. 4,626,498 and JP-A-59-214852, and colloidal silver are preferably applied to light-sensitive silver halide emulsion layers and/or substantially light-insensitive hydrophilic colloid layers. The terminology "surface or internal fogged silver halide grains" as used herein means silver halide grains which are developable uniformly (i.e., non-imagewise) irrespective of exposure. The methods for preparing these fogged grains are described in U.S. Pat. No. 4,626,498 and JP-A-59-214852. In internal fogged core/shell type grains, the silver halide forming the core may have a different halogen composition. Internal or surface fogged silver halide grains may be silver chloride grains, silver chlorobromide grains, silver iodobromide grains or silver chloroiodobromide grains. The fogged grains preferably have an average grain size of 0.01 to 0.75 μm, particularly 0.05 to 0.6 μm. The fogged grains may be regular crystals and may be either polydispersed or monodispersed but are preferably monodispersed (at least 95% by weight or number of the total grains have a grain size falling within ±40% of a mean).

It is preferable to use light-insensitive fine silver halide grains in the color negative films of the present invention. The terminology "light-insensitive fine silver halide grains" as used herein means fine silver halide grains which are insensitive to imagewise exposure for color image formation and therefore undergo substantially no development in the subsequent development processing. It is preferable for the light-insensitive fine silver halide grains not to be fogged previously. The fine silver halide grains have a silver bromide content of from 0 up to 100 mol % and, if necessary, may contain silver chloride and/or silver iodide, preferably contain 0.5 to 10 mol % of silver iodide. The fine silver halide grains preferably have an average grain size (an average projected area circle-equivalent diameter) of 0.01 to 0.5 μm, still preferably 0.02 to 0.2 μm. The fine silver halide grains can be prepared in the same manner as for general light-sensitive silver halide grains. The surface of the fine silver halide grains needs neither optical sensitization nor spectral sensitization. It is preferable to add known stabilizers, such as triazole compounds, azaindene compounds, benzothiazolium compounds, mercapto compounds, and zinc compounds, to the fine silver halide grains prior to addition to a coating composition. Colloidal silver may be incorporated into the layer containing the fine silver halide grains. The silver coating weight of the color negative films used in the present invention is preferably not more than 8.0 g/$m^2$, still preferably not more than 6.0 g/$m^2$.

Photographic additives which are preferably used in the present invention are also described in *Research Disclosure* (RD) Nos. 17643, 18716, and 307105 as listed in Table 3 below. In Table 3, "RC" and "LC" stand for right column and left column, respectively.

TABLE 2

| Additive | RD 17643 | RD 18716 | RD 307105 |
|---|---|---|---|
| Chemical sensitizer | p. 23 | p. 648, RC | p. 866 |
| Speed increasing agent | | p. 648, RC | |
| Spectral sensitizer and supersensitizer | pp. 23–24 | p. 648, RC to p. 649, RC | pp. 866–868 |
| Brightening agent | p. 24 | p. 647, RC | p. 868 |
| Light absorber, filter dye and UV absorber | pp. 25–26 | p. 649, RC to p. 650, LC | p. 873 |
| Binder | p. 26 | p. 651, LC | pp. 873–874 |
| Plasticizer and lubricant | p. 27 | p. 650, RC | p. 876 |
| coating aid and surface active agent | pp. 26–27 | p. 650, RC | pp. 875–876 |
| Antistatic agent | p. 27 | p. 650, RC | pp. 876–877 |
| Matting agent | | | pp. 878–879 |

While various color forming couplers can be used in the color negative films of the present invention, the following couplers are particularly preferred.

Yellow Couplers:

Couplers represented by formulae (I) and (II) of EP 502424A, couplers represented by formulae (1) and (2) of EP 513496A (especially Y-28), couplers represented by formula (I) claimed in claim 1 of EP 568037A, couplers represented by formula (I) of U.S. Pat. No. 5,066,576, col. 1, pp. 45–55, couplers represented by formula (I) of JP-A-4-274425, couplers claimed in claim 1 of EP 498381A (especially D-35), couplers represented by formula (Y) of EP 447969A, page 4 (especially Y-1 and Y-54), and couplers represented by formulae (II) to (IV) of U.S. Pat. No. 4,476,219, col. 7, 11. 36–58 (especially II-17, II-19, and II-24).

Magenta Coupler:

L-57, L-68, and L-77 of JP-A-3-39737; A-4-63, A-4-73, A-4-75 of EP 456257; M-4, M-6, and M-7 of EP 486965; M-45 of EP 571959A; M-1 of JP-A-5-204106; and M-22 of JP-A-4-362631.

Cyan Coupler:

CX-1 to 5, 11, 12, 14, and 15 of JP-A-4-204843; C-7, C-10, C-34, C-35, (I-1) and (I-17) of JP-A-4-43345; and couplers represented by formulae (Ia) or (Ib) claimed in claim 1 of JP-A-6-67385.

Polymer Coupler:

P-1 and P-5 of JP-A-2-44345.

Examples of suitable couplers which form a dye having moderate diffusibility are described in U.S. Pat. No. 4,366, 237, British Patent 2,125,570, EP 96,873B, and West German Patent (OLS) No. 3,234,533.

Examples of suitable colored couplers for correcting unnecessary absorption of a developed dye are yellow-colored cyan couplers represented by formulae (CI), (CII), (CIII), and (CIV) described in EP 456257A1 (especially YC-86); yellow-colored magenta couplers ExM-7, EX-1, and EX-7 of EP 456257A1; magenta-colored cyan couplers CC-9 and C-13 of U.S. Pat. No. 4,833,069; coupler (2) of U.S. Pat. No. 4,837,136; and colorless masking couplers represented by formula (A) claimed in claim 1 of WO 92/11575 (especially the compounds on pp. 36–45).

Compounds (inclusive of couplers) capable of releasing a photographically useful residue on reacting with an oxidized developing agent include development inhibitor-releasing compounds, such as the compounds represented by formulae (I) to (IV) of EP 378236A1 (especially T-101, T-104, T-113, T-131, T-144, and T-158), the compounds represented by formula (I) of EP 436938A2 (especially D-49), the compounds represented by formula (1) of EP 568037A (especially compound (23)), and the compounds represented by formulae (I) to (III) of EP 440195A2 (especially I-(1)); bleaching accelerator-releasing compounds, such as the compounds represented by formulae (I) and (I') of EP 310125A2 (especially compounds (60) and (61)) and the compounds represented by formula (I) claimed in claim 1 of JP-A-6-59411 (especially compound (7)); ligand-releasing compounds, such as the compounds represented by formula LIG-X claimed in claim 1 of U.S. Pat. No. 4,555,478 (especially the compounds in col. 12, 11. 21–41); leuco dye-releasing compounds, such as compounds 1 to 6 of U.S. Pat. No. 4,749,641; fluorescent dye-releasing compounds, such as the compounds represented by formula COUP-DYE claimed in claim 1 of U.S. Pat. No. 4,774,181 (especially compounds 1 to 11); development accelerator- or fogging agent-releasing compounds, such as the compounds represented by formulae (1) to (3) of U.S. Pat. No. 4,656,123 (especially (I-22)), and ExZK-2 of EP 450637A2; and compounds releasing a group which becomes a dye on release, such as the compounds represented by formula (I) claimed in claim 1 of U.S. Pat. No. 4,857,447 (especially Y-1 to Y-19).

Additives other than couplers which can preferably be used in the color negative films of the present invention are as follows. Dispersing media for oil-soluble organic compounds include P-3, 5, 16, 19, 25, 30, 42, 49, 54, 55, 66, 81, 85, 86, and 93 of JP-A-62-215272. Loadable lateces for oil-soluble organic compounds include those described in U.S. Pat. No. 4,199,363. Scavengers for an oxidized developing agent include the compounds represented by formula (I) of U.S. Pat. No. 4,978,606 (especially I-(1), (2), (6) and (12)) and the compounds in col. 2, 11. 5–10 of U.S. Pat. No. 4,923,787 (especially compound 1). Stain inhibitors include the compounds of formulae (I) to (III) of EP 298321A (especially I-47, I-72, III-1, and III-27). Discoloration preventives include A-6, 7, 20, 21, 23 to 26, 30, 37, 40, 42, 48, 63, 90, 92, 94, and 164 of EP 298321A, compounds II-1 to III-23 of U.S. Pat. No. 5,122,444 (especially III-10), compounds I-1 to III-4 of EP 471347A (especially II-2), and A-1 to 48 of U.S. Pat. No. 5,139,931 (especially A-39 and 42). Color formation enhancing agents or materials effective in reducing the amount of color mixing preventives include compounds I-1 to II-15 of EP 411324A (especially I-46). Formalin scavengers include SCV-1 to 28 of EP 477932A (especially SCV-8). Hardeners include H-1, 4, 6, 8 and 14 of JP-A-1-214845, the compounds represented by formulae (VII) to (XII) (compounds H-1 to 54) of U.S. Pat. No. 4,618,573, the compounds represented by formula (6) (compounds H-1 to 76, especially H-14) of JP-A-2-214852, and the compounds claimed in claim 1 of U.S. Pat. No. 3,325,287. Development inhibitor precursors include P-24, 37 and 39 of JP-A-62-168139 and the compounds claimed in claim 1 of U.S. Pat. No. 5,019,492 (especially compounds 28 and 29). Antiseptics and antifungal agents include compounds I-1 to III-43 of U.S. Pat. No. 4,923,790 (especially compounds II-1, 9, 10 and 18 and III-25). Stabilizers and antifoggants include compounds I-1 to (14), especially I-1, 60, (2), and (13), of U.S. Pat. No. 4,923,793, and compounds 1 to 65, especially 36, of U.S. Pat. No. 4,952,483. Chemical sensitizers include triphenylphosphine selenide, and compound 50 of JP-A-5-40324. Dyes include compounds a-1 to b-20 (especially a-1, 12, 18, 27, 35 and 36 and b-5) and compounds V-1 to V-23 (especially V-1) of JP-A-3-156450; compounds F-1-1 to F-II-43 (especially F-1-11 and F-II-8) of EP 445627A; compounds III-1 to 36 (especially III-1 and 3) of EP 457153A, microcrystalline dispersions of Dye-1 to 124 of WO 88/04794; compounds 1 to 22 (especially compound 1) of EP 319999A; compounds D-1 to 87 represented by formulae (1) to (3) of EP 519306A, compounds 1 to 22 represented by formula (I) of U.S. Pat. No. 4,268,622; and compounds (1) to (31) represented by formula (I) of U.S. Pat. No. 4,923,788. UV absorbers include compounds (18b) to (18r) and compounds 101 to 427 represented by formula (1) of JP-A-46-3335; compounds (3) to (66) represented by formula (I) and compounds HBT-1 to 10 represented by formula (III) of EP 520938A; and compounds (1) to (31) represented by formula (1) of EP 521823A.

The present invention can be applied to universal color negative films for general use or for motion pictures. The present invention is also suited to color negative films of film units with a lens described in JP-B-2-32615 and JP-A-U-3-39784 (the term "JP-A-U" as used herein means an "unexamined published Japanese utility model application").

Examples of the supports which can be suitably used in the color negative films of the present invention are described, e.g., in *Research Disclosure*, No. 17643, p. 28, ibid., No. 18716, p. 647, right column to p. 648, left column, and ibid., No. 307105, p. 879. Polyester supports are preferred.

It is preferred for the color negative film to have a magnetic recording layer. The magnetic recording layer is formed by coating a support with an aqueous or organic magnetic coating composition prepared by dispersing magnetic powder in a binder resin. Useful magnetic powder includes ferromagnetic iron oxide, e.g., $\gamma$-$Fe_2O_3$, Co-doped $\gamma$-$Fe_2O_3$, Co-doped magnetite, Co-containing magnetite, ferromagnetic chromium dioxide, ferromagnetic metals, ferromagnetic alloys, hexagonal barium ferrite, strontium ferrite, lead ferrite, and calcium ferrite. Co-Doped ferromagnetic iron oxides, e.g., Co-doped $\gamma$-$Fe_2O_3$, are preferred. The magnetic particles can have any shape, such as an acicular shape, an oval shape, a spherical shape, a cubic shape, and a tabular shape. The magnetic particles preferably have a BET specific surface area of 20 $m^2/g$ or more, particularly 30 $m^2/g$ or more. The ferromagnetic particles preferably have a saturation magnetization ($\sigma s$) of $3.0\times10^4$ to $3.0\times10^5$ A/m, particularly $4.0\times10^4$ to $2.5\times10^4$ A/m. The ferromagnetic particles may be subjected to surface treatment with silica and/or alumina or organic substances. Surface treatment with silane coupling agents or titan coupling agents as described in JP-A-6-161032 is also effective. The magnetic particles coated with organic or inorganic substances described in JP-A-259911 and JP-A-5-81652 are useful as well.

Binder resins in which the magnetic particles are dispersed include thermoplastic resins, thermosetting resins, radiation-curing resins, reactive resins, acid- or alkali-degradable polymers, biodegradable polymers, naturally occurring polymers (e.g., cellulose derivatives and sugar derivatives), and mixtures thereof. The binder resins have a glass transition point of −40° C. to 300° C. and a weight average molecular weight of 2,000 to 1,000,000. Specific examples of suitable binder resins are vinyl copolymers; cellulose derivatives, such as cellulose diacetate, cellulose triacetate, cellulose acetate propionate, cellulose acetate butyrate, and cellulose tripropionate; acrylic resins; polyvinylacetal resins; and gelatin. Cellulose di- or triacetate is preferred. The binder resin can be used in combination with a hardening agent, such as epoxy, aziridine or isocyanate crosslinking agents. Examples of the isocyanate crosslinking agents include isocyanate compounds, such as tolylene diisocyanate, 4,4'-diphenylmethane diisocyanate, hexamethylene diisocyanate, and xylylene diisocyanate; reaction products between these isocyanate compounds and polyalcohols (e.g., a reaction product between 3 mol of tolylene diisocyanate and 1 mol of trimethylolpropane); and polyisocyanate compounds produced by condensation of these isocyanate compounds. Specific examples of these crosslinking agents are described in JP-A-6-59357.

The magnetic particles are dispersed in the binder resin by means of a kneader, a pin mill, an annular mill, or a combination thereof as described in JP-A-6-35092. The dispersants described in JP-A-5-88283 and other known dispersants can be used. The magnetic recording layer usually has a thickness of 0.1 to 10 $\mu$m, preferably 0.2 to 5 $\mu$m, still preferably 0.3 to 3 $\mu$m. A magnetic powder to binder weight ratio is preferably 0.5:100 to 60:100, still preferably 1:100 to 30:100. The coating weight of the magnetic powder is 0.005 to 3 g/m$^2$, preferably 0.01 to 2 g/m$^2$, still preferably 0.02 to 0.5 g/m$^2$. The magnetic recording layer preferably has a transmission yellow density of 0.01 to 0.50, particularly 0.03 to 0.20, especially 0.04 to 0.15. The magnetic recording layer can be formed on the back side of the support of a color negative film over the entire surface thereof or in a stripe by application or printing. The coating methods include air doctor coating, blade coating, air knife coating, squeegee coating, impregnation, reverse roll coating, transfer roll coating, gravure coating, kiss coating, casting, spray coating, dip coating, bar coating, and extrusion coating. The magnetic coating composition described in JP-A-5-341436 is preferred.

The magnetic recording layer can be provided with such functions as slippage, curl suppression, static electrification prevention, blocking prevention, head polishing, and the like, or a layer having these functions may be provided separately. For this purpose, an abrasive comprising non-spherical inorganic particles having a Mohs hardness of 5 or higher is preferably used. The non-spherical organic particles include fine powder of oxides, such as aluminum oxide, chromium oxide, silicon dioxide, and titanium dioxide; carbides, such as silicon carbide and titanium carbide; and diamond. These abrasive grains can be surface-treated with a silane coupling agent or a titan coupling agent. The abrasive can be incorporated into the magnetic recording layer or an overcoat (e.g., a protective layer or a lubricating layer) which is provided on the magnetic recording layer. The above-described binders can be used in the formation of the overcoat. The same binder as used in the magnetic recording layer is preferred. Color negative films having a magnetic recording layer are disclosed in U.S. Pat. Nos. 5,336,589, 5,250,404, 5,229,259, and 5,215,874, and EP 466130.

A polyester support which can be used in the color negative film will be described (for the details, refer to Technical Disclosure Bulletin 94-6023, Japan Institute of Invention and Innovation, (Mar. 15, 1994)). The polyester to be used comprises a diol component and an aromatic dicarboxylic acid component. The aromatic dicarboxylic acids include 2,6-, 1,5-, 1,4- or 2,7-naphthalenedicarboxylic acid, terephthalic acid, isophthalic acid, and phthalic acid; and the dial includes diethylene glycol, triethylene glycol, cyclohexanedimethanol, bisphenol A, and bisphenol. The polyester includes polyethylene terephthalate, polyethylene naphthalate, and polycyclohexanedimethanol terephthalate. A polyester comprising 50 to 100 mol % of a 2,6-naphthalenedicarboxylic acid component, particularly polyethylene 2,6-naphthalate, is preferred. The polyester having an average molecular weight of about 5,000 to 200,000 and a glass transition point (Tg) of 50° C. or higher, preferably 90° C. or higher, is used.

The polyester support is heat treated at or above 40° C. and below Tg, preferably at or above (Tg −20° C.) and below Tg, for curl suppression. The heat treatment is carried out at a constant temperature or a decreasing temperature within the above range. The treating time is 0.1 to 1500 hours, preferably 0.5 to 200 hours. The polyester support can be heat-treated in a roll form or while being transported in a web form. The support may have its surface roughened by coating with conductive inorganic fine particles of $SnO_2$, $Sb_2O_5$, etc. to improve its surface properties. It is preferred that the edges of the support be knurled to have a slightly increased thickness, which is effective in preventing the cut end of a film from leaving a mark at the core of a roll film. The heat treatment on the polyester film can be effected in any stage, i.e., immediately after support film formation, after surface treatment (hereinafter described), after backing layer formation (application of an antistatic agent, a lubricant, etc.), or after subbing layer formation. It is preferably carried out after formation of an antistatic backing layer. The polyester film may contain a UV absorber. It may also contain a dye or a pigment (commercially available for polyester use, e.g., Diaresin produced by Mitsubishi Chemical Industries, Ltd. or Kayaset produced by Nippon Kayaku Co., Ltd.) for prevention of light piping.

In order to improve adhesion of the support and layers constituting a light-sensitive material, the support is preferably subjected to surface activating treatment, such as a chemical treatment, a mechanical treatment, a corona discharge treatment, a flame treatment, an ultraviolet treatment, a radio frequency treatment, a glow discharge treatment, an active plasma treatment, a laser treatment, a mixed acid treatment, and an ozone treatment. An ultraviolet treatment, a flame treatment, a corona discharge treatment and a glow discharge treatment are preferred. A subbing layer is provided on the support for the same purpose. The subbing layer has either a single layer structure or a multilayer structure. Binders used in the subbing layer include copolymers comprising monomers selected from vinyl chloride, vinylidene chloride, butadiene, methacrylic acid, acrylic acid, itaconic acid, maleic anhydride, etc.; polyethyleneimine, epoxy resins, grafted gelatin, nitrocellulose, and gelatin. The subbing layer can contain a compound capable of swelling the support, e.g., resorcin or p-chlorophenol; a gelatin hardener, such as chromium salts (e.g., chromium alum), aldehydes (e.g., formaldehyde, glutaraldehyde), isocyanates, active halogen compounds (e.g., 2,4-dichloro-6-hydroxy-S-triazine), epichlorohydrin resins, and active vinylsulfone compounds; and a matting agent, such as $SiO_2$, $TiO_2$, inorganic fine particles or polymethyl methacrylate copolymer fine particles (0.01 to 10 $\mu$m in average particle size).

It is preferred for the color negative film to contain antistatic agents. Useful antistatic agents include high polymers having a carboxyl group or a salt thereof or a sulfonate group, cationic high polymers, and ionic surface active agents. The most suitable antistatic agent is fine particles of at least one conductive crystalline metal oxide selected from $ZnO$, $TiO_2$, $SnO_2$, $Al_2O_3$, $In_2O_3$, $SiO_2$, $MgO$, $BaO$, $MoO_3$, and $V_2O_5$ or a complex oxide of the above metals (e.g., with Sb, P, B, In, S, Si, and C) or colloidal fine particles of these metal oxides or complex oxides, having a volume resistivity of not more than $10^7$ $\Omega\cdot$cm, particularly not more than $10^5$ $\Omega\cdot$cm, and a particle size of 0.001 to 1.0 $\mu$m. The antistatic agent is preferably used in an amount of 5 to 500 $mg/m^2$, still preferably 10 to 350 $mg/m^2$. A weight ratio of the conductive crystalline oxide or complex oxide to the binder is preferably 1/300 to 100/1, still preferably 1/100 to 100/5.

The color negative film is preferably endowed with slip properties. For this purpose, a lubricant-containing layer is preferably provided on both the light-sensitive layer side and the back side. Suitable slip properties are such that the coefficient of dynamic friction ranges from 0.01 to 0.25 as measured by sliding a sample film on stainless steel balls of 5 mm in diameter at a speed of 60 cm/min at 25° C. and 60% RH. The above measurement gives substantially the equal results even if the material to be combined in rolling friction is replaced with the light-sensitive layer surface. Useful lubricants include organopolysiloxanes, higher fatty acid amides, higher fatty acid metal salts, and esters of higher fatty acids and higher alcohols. Examples of the organopolysiloxanes are dimethyl polysiloxane, diethyl polysiloxane, styrylmethyl polysiloxane, and methylphenyl polysiloxane. The lubricants are preferably added to the top layer on the emulsion layer side or a backing layer. Dimethyl polysiloxane or esters having a long-chain alkyl group are particularly preferred as a lubricant.

The color negative film preferably contains a matting agent on either the emulsion layer side or the back side, preferably in the top layer of the emulsion layer side. Matting agents used may be either soluble or insoluble in processing solutions. It is preferable to use both in combination. For example, particles of polymethyl methacrylate, a methyl methacrylate/methacrylic acid copolymer (9/1 or 5/5 by mole) or polystyrene are preferred. A preferred particle size of the matting agent is 0.8 to 10 μm. The particles preferably have such a narrow size distribution that 90% or more of the number of the total particles have their particle diameter falling within a range of from 90 to 110% of the mean particle diameter. In order to increase the matte effect, it is also preferable to use finer particles of 0.8 μm or smaller in combination. Examples of such finer particles are polymethyl methacrylate fine particles of 0.2 μm, methyl methacrylate/methacrylic acid copolymer particles (9/1 by mole) of 0.3 μm, polystyrene resin particles of 0.25 μm, and colloidal silica of 0.03 μm.

The magazine (cartridge) in which the color negative film is put may be made mainly of a metallic or plastic material. Preferred plastic materials include polystyrene, polyethylene, polypropylene, and polyphenyl ether. The magazine may contain various antistatic agents, such as carbon black, metal oxide fine particles, nonionic, anionic, cationic or betaine surface active agents, and conductive polymers. Magazines thus prevented from static electrification are described in JP-A-1-312537 and JP-A-1-312538. A preferred surface resistivity of the magazines is not more than $10^{12}$ Ω at 25° C. and 25% RH. Plastic magazines are usually made of plastics having incorporated therein carbon black or other pigments for light imperviousness. The magazine may have a currently spread 135 size or may have its diameter reduced from 25 mm (the diameter of 135 size magazines) to 22 mm or even smaller for miniature cameras. The magazine capacity is 30 $cm^3$ or less, preferably 25 $cm^3$ or less. The magazine and the magazine case preferably have a total weight of plastic of 5 to 15 g.

The magazine may be of the type in which a film is advanced by rotating a spool or of the type in which the film leader is put inside the magazine and let out from the magazine port by rotating the spool to the film advance direction. These magazine structures are described in U.S. Pat. Nos. 4,834,306 and 5,226,613. The photographic films which can be used in the invention include not only so-called raw films before development but development-processed photographic films. A raw film and a developed photographic film may be put in the same new magazine or in different magazines.

In the color negative film of the invention, the hydrophilic colloidal layers on the light-sensitive emulsion side preferably have a total film thickness of not more than 28 μm, still preferably not more than 23 μm, yet preferably not more than 18 μm, and particularly preferably not more than 16 μm, and a rate of swelling $T_{1/2}$ of not more than 30 seconds, still preferably not more than 20 seconds. The terminology "total film thickness" as used herein means a film thickness as measured after conditioning at 25° C. and a relative humidity of 55% for 2 days. The terminology "rate of swelling $T_{1/2}$" means a time required for a light-sensitive material to be swollen to half the saturated swollen thickness, the saturated swollen thickness being defined to be 90% of the maximum swollen thickness which is reached when the light-sensitive material is swollen with a color developing solution at 30° C. for 3 minutes and 15 seconds. The rate of swelling can be measured with a swellometer of the type described in A. Green, et al., *Photographic Science and Engineering*, Vol. 19, No. 2, pp. 124–129. $T_{1/2}$ can be controlled by adding a proper amount of a hardener for a gelatin binder or by varying aging conditions after coating. Further, the color negative film preferably has a degree of swelling of from 150 to 400%. The terminology "degree of swelling" as used herein means a value obtained from the maximum swollen film thickness as defined above according to formula: (maximum swollen film thickness−film thickness)/film thickness.

The color negative film of the invention preferably has a hydrophilic colloidal layer(s) called a backing layer having a total dry thickness of from 2 to 20 μm on the side opposite to the light-sensitive emulsion layer side. The backing layer preferably contains the above-described additives, such as light absorbers, filter dyes, ultraviolet absorbers, antistatic agents, hardeners, binders, plasticizers, lubricants, coating aids, and surface active agents. The backing layer preferably has a degree of swelling of from 150 to 500%.

The residual color reduction bath has a pH ranging from 4 to 9, preferably from 5 to 8. A suitable bath temperature and a suitable processing time are generally 30 to 45° C. and 20 seconds to 10 minutes, preferably 35 to 43° C. and 30 seconds to 5 minutes, while dependent on the characteristics and use of the light-sensitive material. The residual color reduction bath can contain arbitrary components that are generally added to a water-saving type washing bath. Such components are described in JP-A-57-8543, JP-A-58-14834, and JP-A-60-220345.

The residual color reduction processing may be followed by processing with an image stabilizing bath. When particularly necessary, for example, where the film after development processing is required to be stored, the components used in the image stabilizing bath can also be added to the residual color reduction bath. The image stabilizing bath contains compounds stabilizing a color image, such as formalin, benzaldehydes (e.g., m-hydroxybenzaldehyde), a formaldehyde/bisulfite addition compound, hexamethylenetetramine and derivatives thereof, hexahydrotriazine and derivatives thereof, N-methylol compounds (e.g., dimethylolurea and N-methylolpyrazole), organic acids, and pH buffering agents. These additives are preferably used in a concentration of 0.001 to 0.02 mol per liter of the stabilizing bath. The concentration of free formaldehyde in the stabilizing bath is preferably as low as possible for preventing diffusion of formaldehyde gas. From this point of view, preferred color image stabilizers include m-hydroxybenzaldehyde, hexamethylenetetramine, N-methylolazole compounds described in JP-A-4-270344 (e.g., N-methylolpyrazole), and azolylmethylamines described in JP-A-4-313753 (e.g., N,N'-bis(1,2,4-triazol-1-ylmethyl)piperazine). In particular, a combination of an azole compound described in JP-A-4-359249 (corresponding to EP 519190A2) (e.g., 1,2,4-triazole) and an azolylmethylamine derivative (e.g., 1,4-bis(1,2,4-triazol-1-ylmethyl)piperazine) is preferred for the high image stabilizing activity and low formaldehyde vapor pressure. If desired, the stabilizing bath can contain an ammonium compound (e.g., ammonium chloride or ammonium sulfite), a bismuth or aluminum compound, a fluorescent whitening agent, a hardener, an alkanolamine (described in U.S. Pat. No. 4,786,583), and a preservative (selected from those usable in the fixing solution or bleach-fix solution, such as sulfinic acid compounds described in JP-A-1-231051).

In order to prevent water marks during drying, various surface active agents can be added to the residual color reduction bath and the image stabilizing bath. Nonionic surface active agents, particularly alkylphenol ethylene oxide adducts, are preferred for this purpose. Preferred alkylphenols include octylphenol, nonylphenol, dodecylphenol and dinonylphenol. The number of moles of ethylene oxide to be added is preferably 8 to 14. Silicone type surface active agents having a high defoaming effect are also preferred.

The residual color reduction bath can contain various chelating agents. Preferred chelating agents include aminopolycarboxylic acids, such as ethylenediaminetetraacetic acid and diethylenetriaminepentaacetic acid; organic phosphonic acids, such as 1-hydroxyethylidene-1,1-diphosphonic acid, N,N,N'-trimethylenephosphonic acid, and diethylenetriamine-N,N,N',N'-tetramethylenephosphonic acid; and the hydrolyzed maleic anhydride polymer, which is mentioned as an additive for an image stabilizing bath in EP 345172A1.

The open area of the color development tank and the color development replenisher tank, namely, the liquid surface area in contact with air, is preferably as small as possible. The open area ratio, being defined as the open area ($cm^2$) divided by the liquid volume ($cm^3$), is preferably not more than 0.01 ($cm^{-1}$), still preferably not more than 0.005, particularly preferably not more than 0.001.

It is desirable for rapid processing that the cross-over time, i.e., the time involved for a light-sensitive material to be transported from tank to tank, be as short as possible. It is preferably not longer than 20 seconds, still preferably not longer than 10 seconds, and particularly preferably 5 seconds or shorter. In order to achieve such a short cross-over time, automatic motion-picture film processors are preferably used in the present invention. Leader transport type or roller transport type processors are particularly preferred. Currently used automatic processors of these types, such as FP-560B and PP1820V manufactured by Fuji Photo Film Co., Ltd., can be adapted for use in the present invention. The line speed of transport, the higher, the better, is usually 30 cm to 30 m/min, preferably 50 cm to 10 m/min. The leader and the light-sensitive materials are preferably transported by the belt transfer system taught in JP-A-60-191257, JP-A-60-191258, and JP-A-60-191259. A crossover rack structure with a plate (Japanese Patent Application No. 265795/89) is preferred, which is effective for shortening the cross-over time as well as prevention of inter-solution contamination.

Each processing solution is preferably replenished with water in an amount corresponding to the evaporation loss (evaporation correction). The evaporation correction is particularly preferred for the color developing solution. The evaporation correction is preferably carried out with a liquid level sensor or an overflow sensor. In the most preferred evaporation correction, an estimated amount of water corresponding to an evaporation loss is added, which amount is calculated by using a coefficient obtained based on the operation time, suspension time, and temperature control time of an automatic processor.

Manipulations for diminishing the evaporation loss, such as reduction in open area or adjustment of an air flow of a ventilator, are also necessary. A preferred open area ratio of the color development tank having been described above, the open area of other processing tanks is preferably minimized likewise. A ventilator, which is fitted for prevention of moisture condensation during temperature control, is preferably set to have a rate of ventilation of 0.1 to 1 $m^3$/min, particularly 0.2 to 0.4 $m^3$/min. Drying conditions are also influential on the evaporation of processing solutions. A ceramic heater is preferably used for drying. A preferred drying air flow rate is 4 $m^3$ to 20 $m^3$/min, particularly 6 to 10 $m^3$/min. The thermoregulator of the ceramic heater against overheating is preferably of the type operated through heat transfer. It is preferably fitted to leeward or windward in contact with fins or a heat transfer part. The drying temperature is preferably adjusted according to the water content of the light-sensitive material to be dried. The optimum drying temperature is 45 to 55° C. for 35-mm film, 55 to 65° C. for Brownie film, and 60 to 90° C. for printing materials.

A replenishing pump is used for processing solution replenishment. A bellows pump is preferred. The tube feeding the replenisher to a replenishing nozzle can be narrowed to prevent a back flow when the pump is at rest, which is effective for improving the accuracy of replenishment. A preferred inner diameter of the feed tube is 1 to 8 mm, particularly 2 to 5 mm.

The processing tanks, the temperature control tank, etc. are preferably made of modified polyphenylene oxide resins or modified polyphenylene ether resins. Useful modified polyphenylene oxide resins include Nolyl produced by Nippon GE Plastics K. K., and useful modified polyphenylene ether resins include Xylon produced by Asahi Chemical Industry Co., Ltd., and Yupiace produced by Mitsubishi Gas Chemical Co., Inc. These materials are also suited to the parts coming into contact with processing solutions, such as racks and cross-over parts.

The drying time is preferably 10 seconds to 2 minutes, still preferably 20 to 80 seconds.

While the processing steps have been described with reference to continuous processing with replenishment, the present invention is also applicable to batch system processing in which development processing is conducted with a given amount of each processing solution without replenishment, and the whole or part of each processing solution is changed for a fresh one occasionally.

A color developing solution to be used for color development processing is preferably an aqueous alkali solution containing an aromatic primary amine color developing agent as a main component. Useful color developing agents include aminophenol compounds and preferably p-phenylenediamine compounds. Typical examples of p-phenylenediamine developing agents include 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-β-methoxyethylaniline, 4-amino-3-methyl-N-methyl-N-(3-hydroxypropyl)aniline, 4-amino-3-methyl-N-ethyl-N-(3-hydroxypropyl)aniline, 4-amino-3-methyl-N-ethyl-N-(2-hydroxypropyl)aniline, 4-amino-3-ethyl-N-ethyl-N-(3-hydroxypropyl)aniline, 4-amino-3-methyl-N-propyl-N-(3-hydroxypropyl)aniline, 4-amino-3-propyl-N-methyl-N-(3-hydroxypropyl)aniline, 4-amino-3-methyl-N-methyl-N-(4-hydroxybutyl)aniline, 4-amino-3-methyl-N-ethyl-N-(4-hydroxybutyl)aniline, 4-amino-3-methyl-N-propyl-N-(4-hydroxybutyl)aniline, 4-amino-3-ethyl-N-ethyl-N-(3-hydroxy-2-methylpropyl)aniline, 4-amino-3-methyl-N,N-bis(4-hydroxybutyl)aniline, 4-amino-3-methyl-N,N-bis(5-hydroxypentyl)aniline, 4-amino-3-methyl-N-(5-hydroxypentyl)-N-(4-hydroxybutyl)aniline, 4-amino-3-methoxy-N-ethyl-N-(4-hydroxybutyl)aniline, 4-amino-3-ethoxy-N,N-bis(5-hydroxypentyl)aniline, 4-amino-3-propyl-N-(4-hydroxybutyl)aniline; and a sulfate, a hydrochloride or a p-toluenesulfonate thereof. Among them 3-methyl-4-amino-N-ethyl-N-β-hydroxyethylaniline, 4-amino-3-methyl-N-ethyl-N-(3-hydroxypropyl)aniline, 4-amino-3-methyl-N-ethyl-N-(4-hydroxybutyl)aniline, 3-methyl-4-amino-N-ethyl-N-β-methanesulfonamidoethylaniline; and a hydrochloride, a p-toluenesulfonate or a sulfate thereof are particularly preferred. They can be used as a mixture of two or more thereof according to the purpose. The aromatic primary amine developing agent is preferably used in a concentration of 0.0002 to 0.2 mol/l, particularly 0.001 to 0.1 mol/l.

The color developing solution generally contains pH buffering agents, such as carbonates, borates, phosphates or 5-sulfosalicylic acid salts of alkali metals, and development inhibitors or antifoggants, such as chlorides, bromides, iodides, benzimidazoles, benzothiazoles, and mercapto compounds. If desired, the color developing solution further contains various preservatives, such as hydroxylamine, diethylhydroxylamine, hydroxylamine derivatives represented by formula (I) of JP-A-3-144446, sulfites, hydrazines (e.g., N,N-biscarboxymethylhydrazine), phenyl semicarbazides, triethanolamine, and catecholsulfonic acids; organic solvents, such as ethylene glycol and diethylene glycol; development accelerators, such as benzyl alcohol, polyethylene glycol, quaternary ammonium salts, and amines; dye-forming couplers; competing couplers; auxiliary developing agents (e.g., 1-phenyl-3-pyrazolidone); viscosity-imparting agents; and various chelating agents, such as aminopolycarboxylic acids, aminopolyphosphonic acids, alkylphosphonic acids, and phosphonocarboxylic acids. Specific examples of these chelating agents are ethylenediaminetetraacetic acid, nitrilotriacetic acid, ethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N,N-tetramethylenephosphonic acid, ethylenediamine-di(o-hydroxyphenylacetic acid), and salts thereof. Of the above-described preservatives preferred are substituted hydroxylamine compounds, with diethylhydroxylamine, monomethylhydroxylamine, and hydroxylamine compounds having an alkyl group substituted with a water-soluble group, e.g., a sulfo group, a carboxyl group or a hydroxyl group, being still preferred. N,N-Bis(2-sulfoethyl) hydroxylamine and its alkali metal salts are particularly preferred preservatives. Of the above-described chelating agents, those having biodegradability are preferred. Examples of biodegradable chelating agents are described in JP-A-63-146998, JP-A-63-199295, JP-A-63-267750, JP-A-63-267751, JP-A-2-229146, JP-A-3-186841, German Patent 3739610, and EP 468325.

It is preferred that the processing solution in the development tank or the development replenisher tank be shielded with a high-boiling organic solvent, etc. so as to reduce the contact area with air. The most suitable shielding liquid is liquid paraffin. The use of liquid paraffin is particularly preferred for the replenisher. The color development is carried out at 20 to 55° C., preferably 30 to 55° C., for 20 seconds to 5 minutes, preferably 30 seconds to 3 minutes and 20 seconds, still preferably 40 seconds to 1 minute and 30 seconds, for light-sensitive materials for photographing.

The present invention will now be illustrated in greater detail with reference to Examples, but it should be understood that the present invention is not construed as being limited thereto.

EXAMPLE 1

1. Color Negative Film

Color negative films equivalent to sample 101 prepared in Example 1 of JP-A-8-339063 were used as samples representative of universal color negative films. The color negative films have an ISO sensitivity of 400. They were used in a 135 size 24-ex. magazine according to ISO standard 1007.

2. Methods for Testing Photographic Characteristics

A Macbeth chart was photographed on a test film at three levels of exposure, i.e., a standard exposure, an underexposure (¼ of the standard exposure) or an overexposure (16 times the standard exposure), using standard illuminant C according to ISO standard 5800 (measurement of sensitivity of color negative films). The exposed films were developed under varied conditions as described below, and photographic image reproduction characteristics were evaluated.

3. Development Processor

A development processor for color negative films (FP560B, manufactured by Fuji Photo Film Co., Ltd.) into which the image processing mechanism described in JP-A-10-20457 and JP-A-9-146247 was incorporated (hereinafter referred to as an image processor-integrated type) was used. The driving motor was adapted so that the speed of film transport could be changeable.

3. Development Processing

The sample films were processed in accordance with the following specifications, which are substantially equal to CN16 universally employed in the market for various kinds of films.

| Step | Time | Temp. | Rate of Replenishment* | Tank Volume |
|---|---|---|---|---|
| Color development | 3'5" | 38.0° C. | 20 ml | 17 l |
| Bleaching | 50" | 38.0° C. | 5 ml | 5 l |
| Fixing (1) | 50" | 38.0° C. | — | 5 l |
| Fixing (2) | 50" | 38.0° C. | 8 ml | 5 l |
| Washing | 30" | 38.0° C. | 17 ml | 3.5 l |
| Stabilization (1) | 20" | 38.0° C. | — | 3 l |
| Stabilization (2) | 20" | 38.0° C. | 15 ml | 3 l |
| Drying | 1'30" | 60° C. | | |

*Per 35 mm (W) × 1.1 m (L) (corresponding to a 24-ex. roll of film)

The stabilizer was made to flow in a countercurrent from (2) toward (1). The overflow from the wash tank was all returned to the fixing tank (2). The fixing solution was also made to flow in a countercurrent from (2) to (1) through countercurrent piping. The carryover of the developing solution into the fixing bath, that of the bleaching solution into the fixing bath, and that of the fixing solution into the washing step were 2.5 ml, 2.0 ml, and 2.0 ml, respectively, per 35 mm (W)×1.1 m (L) of the color negative film. The cross-over time between every two steps was 6 seconds, which time was included in the processing time of the preceding step.

The composition of the processing solutions used is shown below.

| Color Developing Solution: | Tank Solution (g) | Replenisher (g) |
|---|---|---|
| Diethylenetriaminepentaacetic acid | 2.0 | 2.0 |
| 1-Hydroxyethylidene-1,1-diphosphonic acid | 2.0 | 2.0 |
| Sodium sulfite | 3.9 | 5.3 |
| Potassium carbonate | 37.5 | 39.0 |
| Potassium bromide | 1.4 | 0.4 |
| Potassium iodide | 1.3 mg | — |
| Disodium N,N-bis(sulfonatoethyl)-hydroxylamine | 2.0 | 2.2 |
| hydroxylamine sulfate | 2.4 | 3.3 |
| 2-Methyl-4-[N-ethyl-N-(β-hydroxy-ethyl)amino]aniline sulfate | 4.5 | 6.4 |
| Water to make | 1.0 l | 1.0 l |
| pH (adjusted with potassium hydroxide and sulfuric acid) | 10.05 | 10.18 |

| Bleaching Solution: | Tank Solution (g) | Replenisher (g) |
|---|---|---|
| Ammonium (1,3-diaminopropanetetra-acetato)iron (III) monohydrate | 118 | 180 |
| Ammonium bromide | 80 | 115 |
| Ammonium nitrate | 14 | 21 |
| Succinic acid | 40 | 60 |
| Maleic acid | 33 | 50 |
| Water to make | 1.0 l | 1.0 l |
| pH (adjusted with aqueous ammonia) | 4.4 | 4.0 |

| Fixing Solution: | Tank Solution (g) | Replenisher (g) |
|---|---|---|
| Ammonium methanesulfinate | 10 | 30 |
| Ammonium methanethiosulfonate | 4 | 12 |
| Ammonium thiosulfate aqueous solution (700 g/l) | 280 ml | 840 ml |
| Imidazole | 7 | 20 |
| Ethylenediaminetetraacetic acid | 15 | 45 |
| Water to make | 1.0 l | 1.0 l |
| pH (adjusted with aqueous ammonia and acetic acid) | 7.4 | 7.45 |

Washing Water:

Tap water was passed through a mixed bed column packed with an H type strongly acidic cation exchange resin (Amberlite IR-120B, produced by Rohm & Haas Co.) and an OH type strongly basic anion exchange resin (Amberlite IR-400, produced by Rohm & Haas Co.) to reduce calcium and magnesium ion concentrations each to 3 mg/l or less. To the thus treated water were added 20 mg/l of sodium dichloroisocyanurate and 150 mg/l of sodium sulfate. The resulting washing solution had a pH of 6.5 to 7.5.

| Stabilizer: | |
|---|---|
| The tank solution and replenisher had the same composition. | |
| Sodium p-toluenesulfinate | 0.03 (g) |
| Polyoxyethylene p-monononylphenyl ether (average degree of polymerization: 10) | 0.2 |
| Disodium ethylenediaminetetraacetate | 0.05 |
| 1,2,4-Triazole | 1.3 |
| 1,4-Bis(1,2,4-triazol-1-ylmethyl)-piperazine | 0.75 |
| 1,2-Benzisothiazolin-3-one | 0.10 |
| Water to make | 1.0 l |
| pH | 8.5 |

5. Output Unit

A commercially available printer, Laser Printer/Paper Processor LP-1000P (manufactured by Fuji Photo Film Co., Ltd.) was used, which reproduces a positive image based on electrical image signals output from FP560B.

For comparison, a commercially available printer of planar exposure system, Color Printer/Paper Processor PP728A (manufactured by Fuji Minilabo Champion Fuji Photo Film Co., Ltd.) was used. This printer is of simultaneous entire surface exposure system in which a developed color negative film is printed on color paper, and color balance is controlled by filter control, which is customarily used in the current market.

Commercially available color paper, FUJICOLOR PAPER SUPER FA3 (manufactured by Fuji Photo Film Co., Ltd.) was used as a printing medium in either printer. Development processing was carried out in accordance with universal CP-47L (color paper processing method and chemicals, produced by Fuji Photo Film Co., Ltd.).

6. Test (1) Comparative Print A:

A color negative film was developed in an image processor-integrated type FP560B according to basic development processing (the above-described CN16), and the developed film was printed in Laser Printer/Paper Processor LP-1000P to obtain a comparative color print.

(2) Comparative Print B:

The basic development processing was carried out in FP560B, and the developed film was printed in PP728A of planar exposure type to obtain a comparative color print.

(3) Comparative Print C:

Rapid development processing was carried out in FP560B at a two-fold increased speed of film transport, and the developed film was printed in PP-728P to obtain a comparative color print.

(4) Print 1 According to Invention:

Rapid development processing was carried out in the same manner as for comparative print C, and the developed film was printed on LP-1000P to obtain a color print according to the method and apparatus of the present invention. The image processing conditions were the same as those set for the basic development processing in FP-560B because of the sufficient image processing capacity.

7. Test Results:

The test results are shown in Table 4.

The image reproduction performance can be evaluated in terms of whether or not a sufficient density reproduction range is maintained without diminishing the difference between the maximum density (i.e., the density of the black patch) and the minimum density (i.e., the density of the white patch) of the Macbeth chart. In prints A and B the black and white patch densities were approximate to $D_{max}$ and $D_{min}$, respectively, of the color paper. That is, it is seen that when color negative films are processed under the basic development processing conditions, image reproducibility on the standard level can be achieved without image processing (print B). On the other hand, rapid processing results in noticeable reduction in black density when image processing is not conducted (print C). The reduction in black density is particularly pronounced at 2 stops underexposure.

In the present invention, the density reproduction range can be restored to the standard level by image processing, showing satisfactory image reproduction.

TABLE 4

| | Exposure | | | | | |
|---|---|---|---|---|---|---|
| | 2 stops under | | 0 | | 4 stops over | |
| Print | White | Black | White | Black | White | Black |
| A | 0.15 | 2.02 | 0.15 | 2.01 | 0.15 | 2.02 |
| B | 0.15 | 1.98 | 0.15 | 2.00 | 0.15 | 2.00 |
| C | 0.19 | 1.45 | 0.17 | 1.90 | 0.19 | 1.80 |
| 1 | 0.16 | 1.95 | 0.16 | 1.96 | 0.16 | 1.98 |

Note:
Exposure: 2 stops under (−2); adequate (0); 4 stops over (+4)
Gradation reproducibility: Gray densitites of $D_{min}$ (white) and $D_{max}$ (black) of a Macbeth chart gray patch as measured with X-Rite densitometer.

In the apparatus according to the present invention, an exposed color film is processed by rapid development processing, the image information is read from the developed image and converted to digital image signals optically or electrically, and the digital image signals are processed into the image characteristics which should have been obtained if basic development processing had been followed, and output to a printer. By the use of the apparatus, even when an exposed color film is rapidly processed, for example, at a film transport speed increased 1.1 to 3 times, it is possible to obtain image information of normal quality and obtain color prints of normal quality without suffering from impairment of image quality.

EXAMPLE 2

1. Color Negative Film

Multilayer color negative films for photographing (samples A101 and A102) were prepared by successively coating a cellulose triacetate film support having a subbing layer with following layers.

Main materials used in the layers are classified as follows.

ExC: Cyan coupler

ExM: Magenta coupler

ExY: Yellow coupler

ExS: Sensitizing dye

UV: UV absorber

HBS: High-boiling organic solvent

H: Gelatin hardener

In the following compositions, the amount of each component is given in gram per $m^2$, except that the amount of a silver halide is given in gram of silver per $m^2$ and that of a sensitizing dye is given in terms of mole per mole of the silver halide used in the layer where it is added.

Sample A101:

| 1st Layer (Antihalation Layer): | |
|---|---|
| Black colloidal layer | Ag: 0.09 |
| Gelatin | 1.60 |
| ExM-1 | 0.12 |
| ExF-1 | $2.0 \times 10^{-3}$ |
| Solid disperse dye ExF-2 | 0.030 |
| Solid disperse dye ExF-3 | 0.040 |
| HBS-1 | 0.15 |
| HBS-2 | 0.02 |

| 2nd Layer (Intermediate Layer): | |
|---|---|
| Silver iodobromide emulsion M | Ag: 0.065 |
| ExC-2 | 0.04 |
| Polyethyl acrylate latex | 0.20 |
| Gelatin | 1.04 |

| 3rd Layer (Low-speed Red-sensitive Emulsion Layer): | |
|---|---|
| Silver iodobromide emulsion A | Ag: 0.25 |
| Silver iodobromide emulsion B | Ag: 0.25 |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.10 |
| ExC-5 | 0.020 |
| ExC-6 | 0.010 |
| Cpd-2 | 0.025 |
| HBS-1 | 0.10 |
| Gelatin | 0.87 |

| 4th Layer (Middle-speed Red-sensitive Emulsion Layer): | |
|---|---|
| Silver iodobromide emulsion C | Ag: 0.70 |
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.015 |
| ExC-6 | 0.0070 |
| Cpd-2 | 0.023 |
| HBS-1 | 0.10 |
| Gelatin | 0.75 |

| 5th Layer (High-speed Red-sensitive Emulsion Layer): | |
|---|---|
| Silver iodobromide emulsion D | Ag: 1.40 |
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.10 |
| ExC-3 | 0.045 |
| ExC-6 | 0.020 |
| ExC-7 | 0.010 |

-continued

| 5th Layer (High-speed Red-sensitive Emulsion Layer): | |
|---|---|
| Cpd-2 | 0.050 |
| HBS-1 | 0.22 |
| HBS-2 | 0.050 |
| Gelatin | 1.10 |

| 6th Layer (Intermediate Layer): | |
|---|---|
| Cpd-1 | 0.090 |
| Solid disperse dye ExF-4 | 0.030 |
| HBS-1 | 0.050 |
| Polyethyl acrylate latex | 0.15 |
| Gelatin | 1.10 |

| 7th Layer (Low-speed Green-sensitive Emulsion Layer): | |
|---|---|
| Silver iodobromide emulsion E | Ag: 0.15 |
| Silver iodobromide emulsion F | Ag: 0.10 |
| Silver iodobromide emulsion G | Ag: 0.10 |
| ExS-4 | $3.0 \times 10^{-5}$ |
| ExS-5 | $2.1 \times 10^{-4}$ |
| ExS-6 | $8.0 \times 10^{-4}$ |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

| 8th Layer (Middle-speed Green-sensitive Emulsion Layer): | |
|---|---|
| Silver iodobromide emulsion H | Ag: 0.80 |
| ExS-4 | $3.2 \times 10^{-5}$ |
| ExS-5 | $2.2 \times 10^{-4}$ |
| ExS-6 | $8.4 \times 10^{-4}$ |
| ExC-8 | 0.010 |
| ExM-2 | 0.10 |
| ExM-3 | 0.025 |
| ExY-1 | 0.018 |
| ExY-4 | 0.010 |
| ExY-5 | 0.040 |
| HBS-1 | 0.13 |
| HBS-3 | $4.0 \times 10^{-3}$ |
| Gelatin | 0.80 |

| 9th Layer (High-speed Green-sensitive Emulsion Layer): | |
|---|---|
| Silver iodobromide emulsion I | Ag: 1.25 |
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.10 |
| ExM-1 | 0.020 |
| ExM-4 | 0.025 |
| ExM-5 | 0.040 |
| Cpd-3 | 0.040 |
| HBS-1 | 0.25 |
| Polyethyl acrylate latex | 0.15 |
| Gelatin | 1.33 |

| 10th (Yellow Filter Layer): | |
|---|---|
| Yellow collodial silver | Ag: 0.015 |
| Cpd-1 | 0.16 |
| Solid disperse dye ExF-5 | 0.060 |
| Solid disperse dye ExF-6 | 0.060 |
| Oil soluble dye ExF-7 | 0.010 |
| HBS-1 | 0.60 |
| Gelatin | 0.60 |

| 11th Layer (Low-speed Blue-sensitive Emulsion Layer): | |
|---|---|
| Silver iodobromide emulsion J | Ag: 0.09 |
| Silver iodobromide emulsion K | Ag: 0.09 |
| ExS-7 | $8.6 \times 10^{-4}$ |
| ExC-8 | $7.0 \times 10^{-3}$ |
| ExY-1 | 0.050 |
| ExY-2 | 0.22 |
| ExY-3 | 0.50 |
| ExY-4 | 0.020 |
| Cpd-2 | 0.10 |
| Cpd-3 | $4.0 \times 10^{-3}$ |
| HBS-1 | 0.28 |
| Gelatin | 1.20 |

| 12th Layer (High-speed Blue-sensitive Emulsion Layer): | |
|---|---|
| Silver iodobromide emulsion L | Ag: 1.00 |
| ExS-7 | $4.0 \times 10^{-4}$ |
| ExY-2 | 0.10 |
| ExY-3 | 0.10 |
| ExY-4 | 0.010 |
| Cpd-2 | 0.10 |
| Cpd-3 | $1.0 \times 10^{-3}$ |
| HBS-1 | 0.070 |
| Gelatin | 0.70 |

| 13th Layer (1st Protective Layer): | |
|---|---|
| UV-1 | 0.19 |
| UV-2 | 0.075 |
| UV-3 | 0.065 |
| HBS-1 | $5.0 \times 10^{-2}$ |
| HBS-4 | $5.0 \times 10^{-2}$ |
| Gelatin | 1.8 |

| 14th Layer (2nd Protective Layer): | |
|---|---|
| Silver iodobromide emulsion M | Ag: 0.10 |
| H-1 | 0.40 |
| B-1 (diameter: 1.7 $\mu$m) | $5.0 \times 10^{-2}$ |
| B-2 (diameter: 1.7 $\mu$m) | 0.15 |
| B-3 | 0.05 |
| S-1 | 0.20 |
| Gelatin | 0.70 |

In addition, W-1 to -3, B-4 to -6, F-1 to -17, an iron salt, a lead salt, a gold salt, a platinum salt, a palladium salt, an iridium salt, and a rhodium salt were added to each layer appropriately for the purpose of improving preservability, processability, pressure resistance, antifungal and antibacterial properties, antistatic properties, and coating properties.

TABLE 5

| Emulsion | Average AgI Content (%) | Coefficient of Variation in AgI Content among Grains (%) | Average Sphere-equiv. Grain size (μm) | Coefficient of Variation of Grain Size (%) | Projected Area Circle-equiv. Diameter (μm) | Diameter/Thickness Ratio |
|---|---|---|---|---|---|---|
| A | 1.7 | 10 | 0.46 | 15 | 0.56 | 5.5 |
| B | 3.5 | 15 | 0.57 | 20 | 0.78 | 4.0 |
| C | 8.9 | 25 | 0.66 | 25 | 0.87 | 5.8 |
| D | 8.9 | 18 | 0.84 | 26 | 1.03 | 3.7 |
| E | 1.7 | 10 | 0.46 | 15 | 0.56 | 5.5 |
| F | 3.5 | 15 | 0.57 | 20 | 0.78 | 4.0 |
| G | 8.8 | 25 | 0.61 | 23 | 0.77 | 4.4 |
| H | 8.8 | 25 | 0.61 | 23 | 0.77 | 4.4 |
| I | 8.9 | 18 | 0.84 | 26 | 1.03 | 3.7 |
| J | 1.7 | 10 | 0.46 | 15 | 0.50 | 4.2 |
| K | 8.8 | 18 | 0.64 | 23 | 0.85 | 5.2 |
| L | 14.0 | 25 | 1.28 | 26 | 1.46 | 3.5 |
| M | 1.0 | — | 0.07 | 15 | — | 1 |

In Table 5:

(1) Emulsions J to L had been reduction sensitized with thiourea dioxide and thiosulfonic acid during grain preparation in accordance with Examples of JP-A-2-191938.

(2) Emulsions A to I had been subjected to gold/sulfur/selenium sensitization in the presence of the spectral sensitizing dyes described for the respective layers and sodium thiocyanate in accordance with Examples of JP-A-3-237450.

(3) Low-molecular gelatin was used in the preparation of tabular grains in accordance with Examples of JP-A-1-158426.

(4) Microscopic observation on the tabular grains revealed dislocation lines as described in JP-A-3-237450.

(5) Grains of emulsion L were double-layered grains having a high iodide content in the inside (core) as described in JP-A-60-143331.

Preparation of Dispersion of Organic Solid Disperse Dye:

ExF-2 was dispersed as follows.

In a 700 ml pot mill were put 21.7 ml of water, 3 ml of a 5% aqueous solution of sodium o-octylphenoxyethoxyethoxyethanesulfonate, and 0.5 g of a 5% aqueous solution of p-octylphenoxypolyoxyethylene ether (degree of polymerization: 10), and 5.0 g of dye ExF-2 and 500 ml of zirconium oxide beads (diameter: 1 mm) were added thereto. The contents were dispersed for 2 hours by means of a BO type vibration ball mill manufactured by Chuo Koki K. K. The contents were taken out and added to 8 g of a 12.5% aqueous gelatin solution, and the beads were removed by filtration to give a gelatin dispersion of the dye. The dispersed dye particles had an average particle size of 0.44 μm.

In the same manner, solid dispersions of ExF-3, ExF-4 and ExF-6 were prepared. The dispersed dye particles had an average particle size of 0.24 μm, 0.45 μm, and 0.52 μm, respectively. ExF-5 was dispersed by a microprecipitation dispersion method described in Example 1 of EP 549489A. The dispersed ExF-5 particles had an average particle size of 0.06 μm.

ExC-1

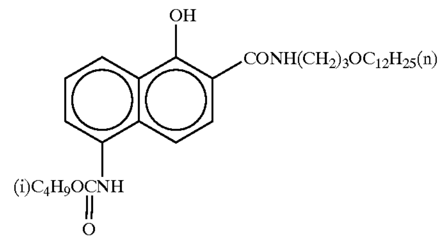

ExC-2

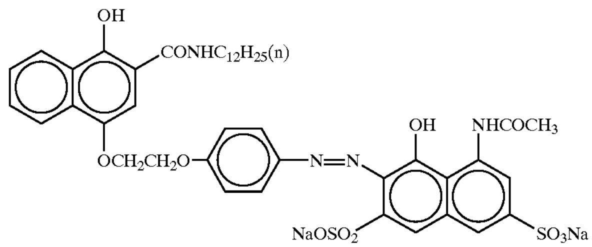

ExC-3

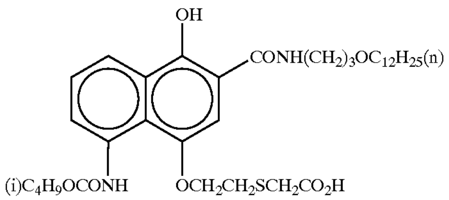

ExC-4

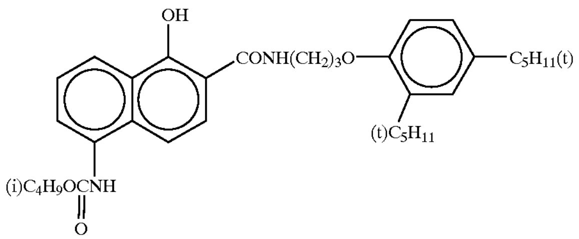

-continued
ExC-5
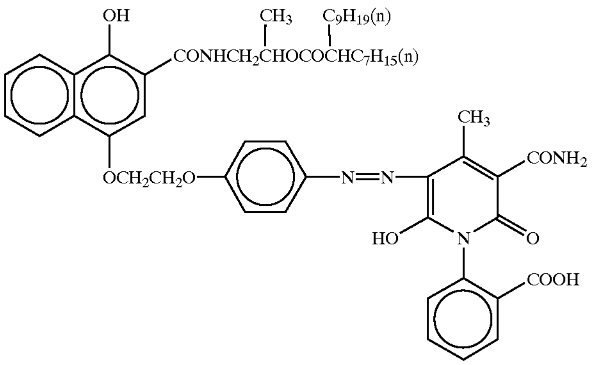
ExC-6
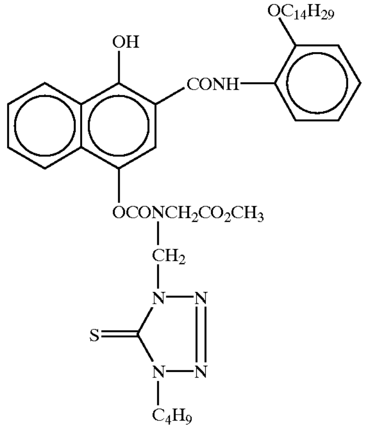
ExC-7
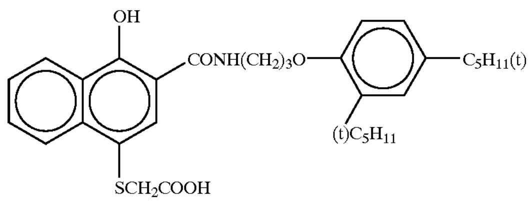
ExC-8
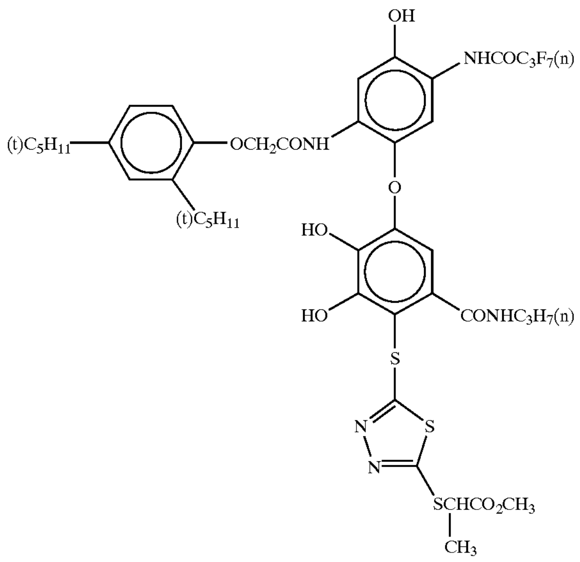
ExM-1
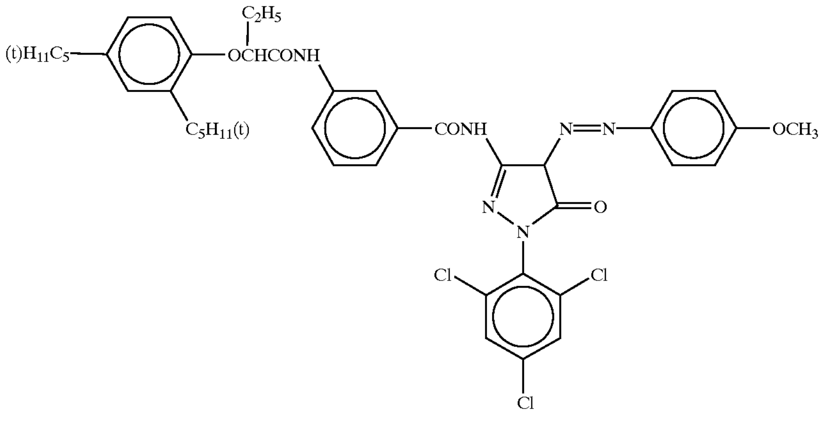

-continued
ExM-4
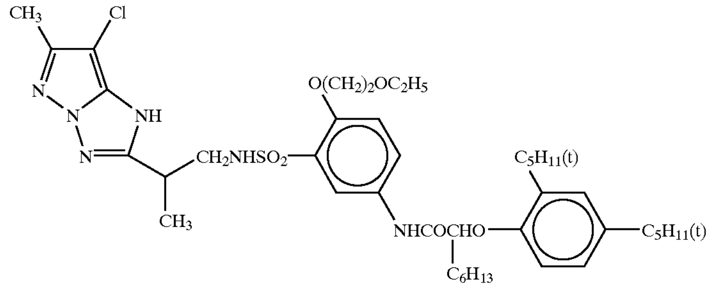
ExM-5
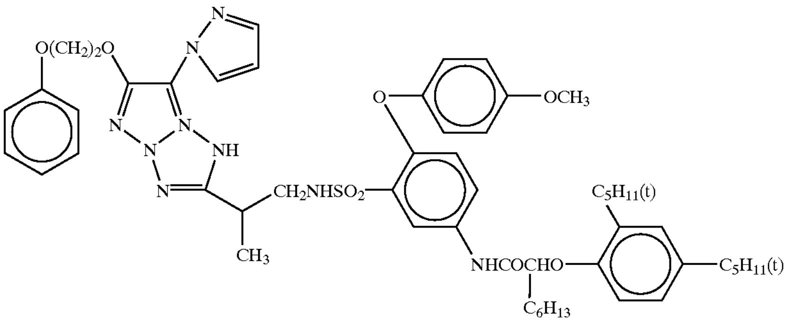
ExY-1
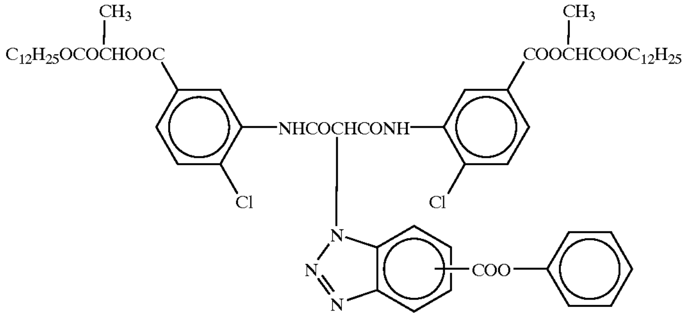
ExM-2
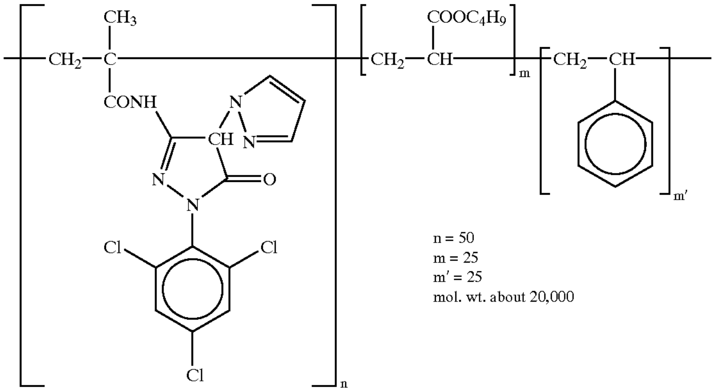
n = 50
m = 25
m' = 25
mol. wt. about 20,000

-continued
ExM-3
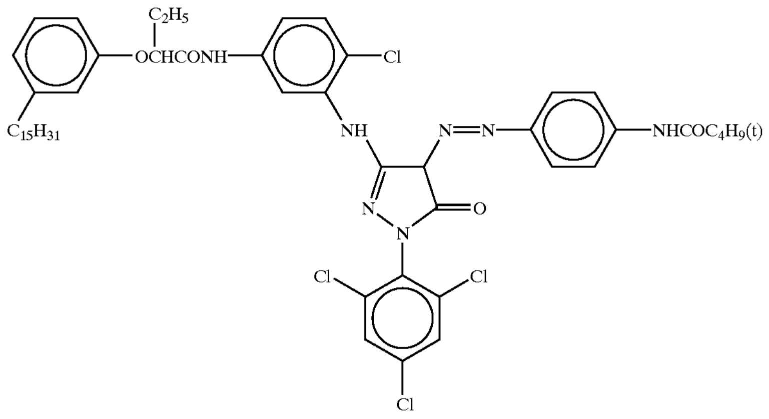
ExY-2
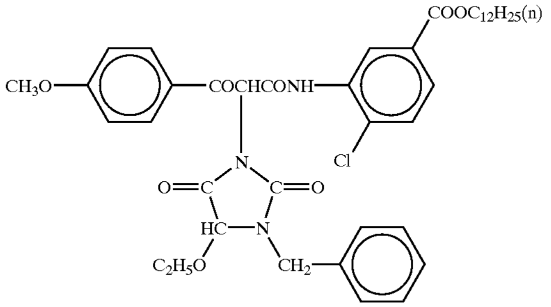
ExY-3
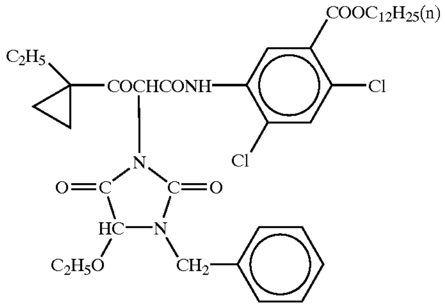
ExY-4
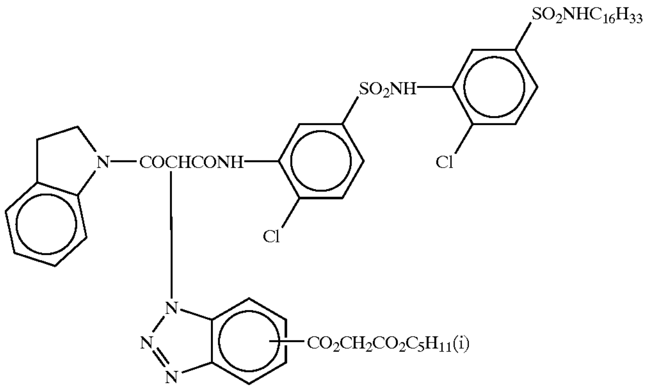
ExY-5
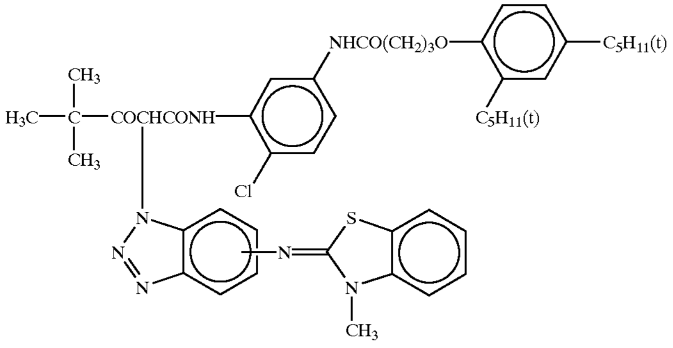

-continued
ExF-1
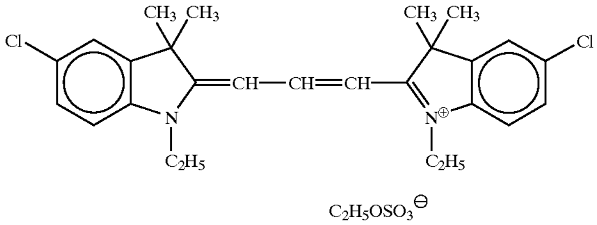
ExF-2
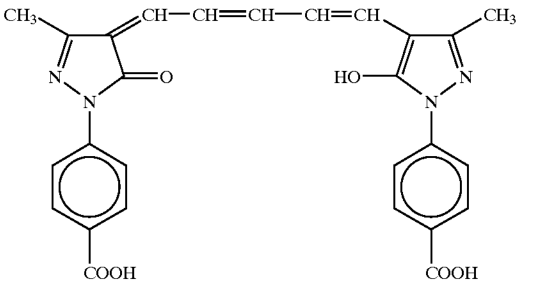
ExF-3
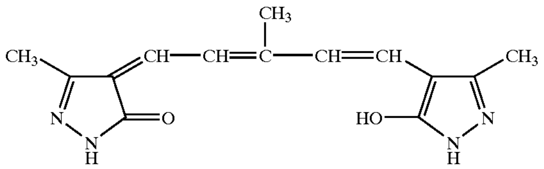
ExF-4
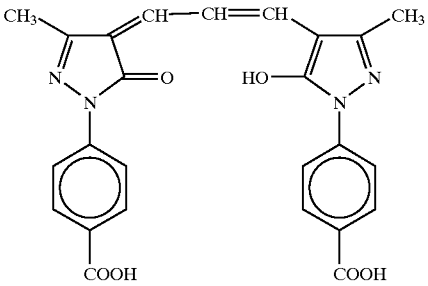
ExF-5
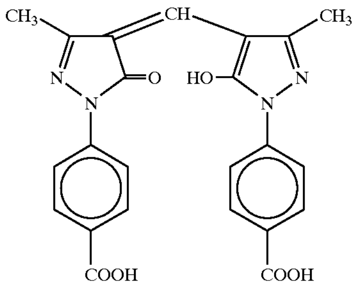
ExF-6
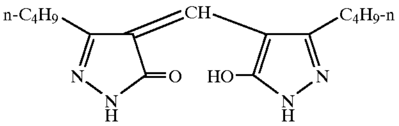
ExF-7
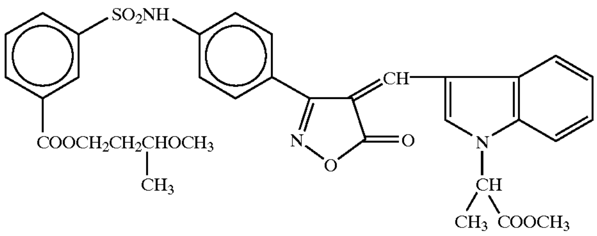
Cpd-1
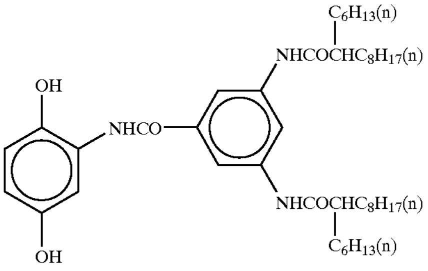
Cpd-2
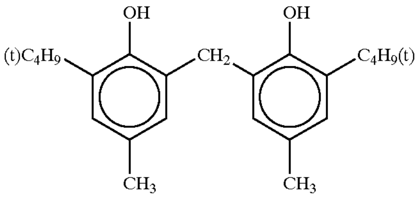
Cpd-3
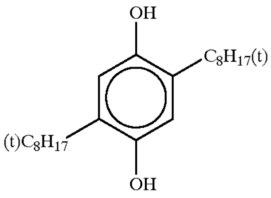
UV-1
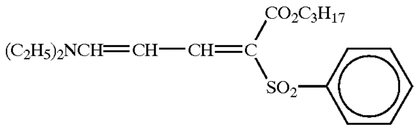

-continued
UV-2
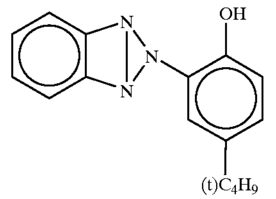
UV-3
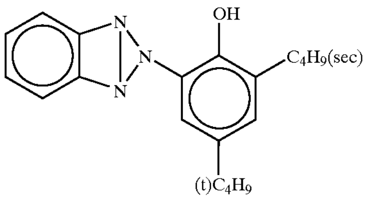
HBS-1
Tricresylphosphate
HBS-2
di-n-butylphthalate
HBS-3
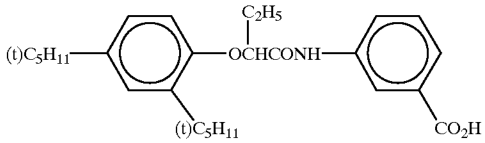
HBS-4
tri(2-ethylhexyl)phosphate
ExS-1
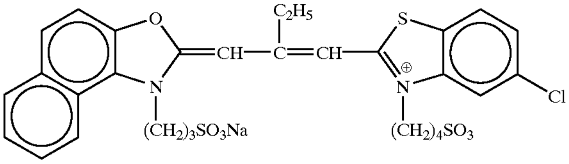
ExS-2
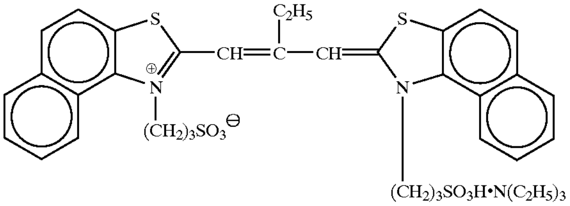
ExS-3
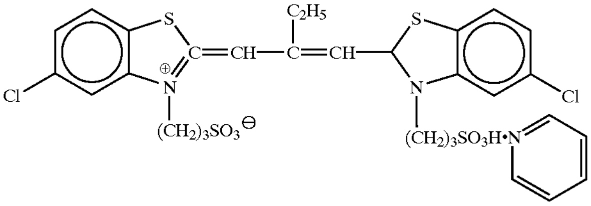
ExS-4
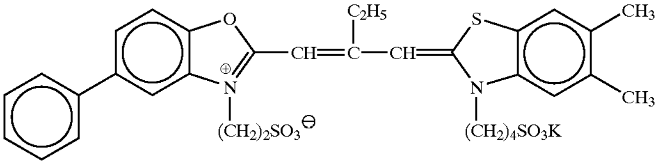
ExS-5
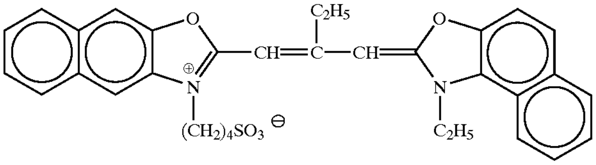
ExS-6
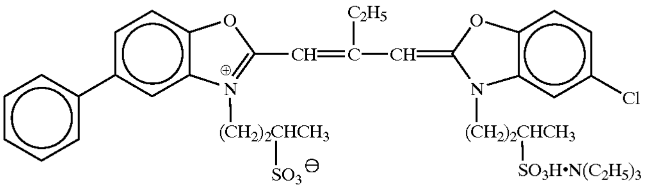

-continued
ExS-7
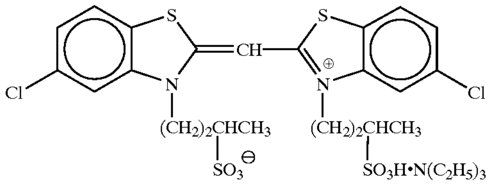
S-1
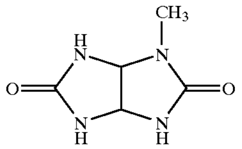
H-1
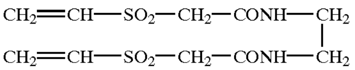
B-1
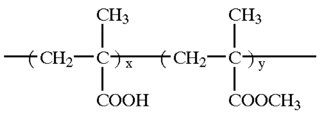
x/y = 10/90
B-2
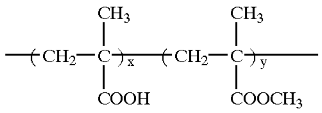
x/y = 40/60
B-3
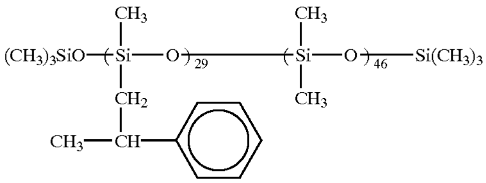
B-4
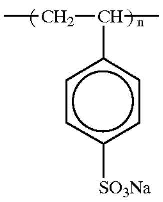
B-5
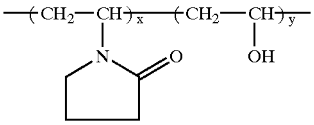
x/y = 70/30
B-6
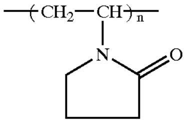
(mol. wt. about 10,000)
W-1
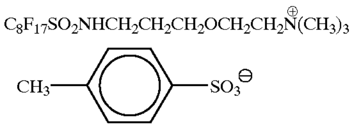
W-2
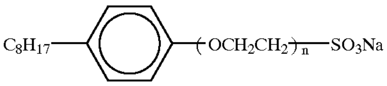
n = 2 ~ 4
W-3
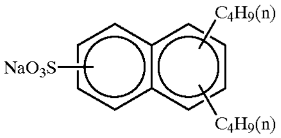
F-1
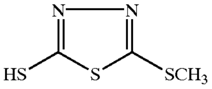
F-2
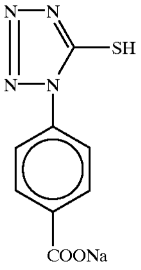

-continued

F-3

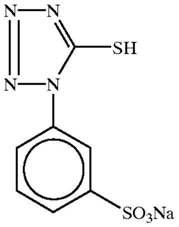

F-4

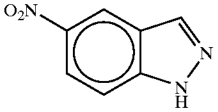

F-5

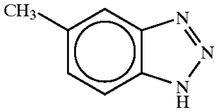

F-6

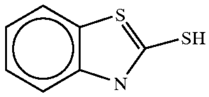

F-7

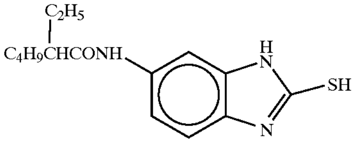

F-8

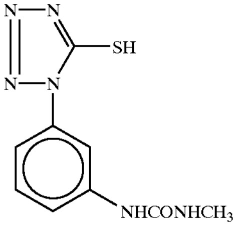

F-9

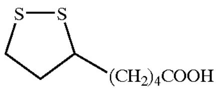

F-10

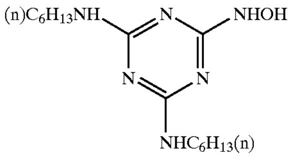

F-11

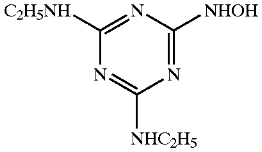

F-12

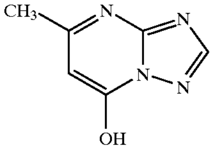

F-13

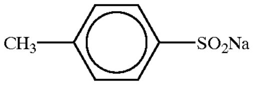

F-14

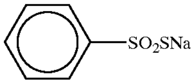

F-15

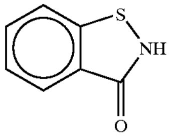

F-16

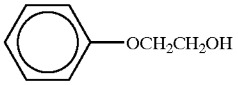

F-17

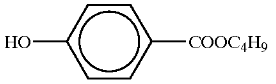

Sample A102:

Sample A102 was prepared in the same manner as for sample A101, except for reducing every silver coating weight in every silver-containing layer by half without changing the emulsion compositions. The total silver coating weight in sample A101 was 6.45 g/$m^2$, while that in sample A102 was 3.225 g/$m^2$.

2. Methods for Testing Photographic Characteristics

A photograph was taken of a human subject against a gray wall on a test film at three levels of exposure, i.e., a standard exposure, an underexposure (¼ of the standard exposure) or an overexposure (16 times the standard exposure), using standard illuminant C according to ISO standard 5800 (measurement of sensitivity of color negative films). The exposed films were developed under varied conditions as described below to obtain a photographic image for input.

The image for input was read with the image reading unit described in IV-1 (Reading of image information from developed films) to obtain digital image signals. The image signals were processed to effect gradation correction and color correction according to the procedures described in IV-2 (Image processing of image information). Color paper described below was exposed in a laser scanning exposure unit shown in FIG. 10 based on the corrected image information, developed by the prescribed processing method described below to obtain an image for evaluation. The overall image quality of the reproduced image, with particular weight being given to graininess, was scored by 10 experts in photographic evaluation on a following scale of 1 to 5. An average score was used for evaluation.

1 Very poor and unacceptable.

2 Slightly poor and unacceptable.

3 Relatively poor but acceptable.

4 Relatively good and preferable.

5 Very preferable.

3. Development Processing

The exposed films were processed on FP560B under the conditions of basic development processing in the same manner as in Example 1, and of fixing-omitted development processing. For carrying out fixing-omitted development processing, the film transport system of the processor FP560B was adapted so that the developed and bleached films might be sent directly to a wash tank, skipping over the two fixing racks (fixing-omitted development processing).

4. Image Processing of Image for Evaluation

A commercially available image processing apparatus, HIGH-SPEED SCANNER/IMAGE PROCESSING WORK STATION SP-1000 (manufactured by Fuji Photo Film Co., Ltd.) was used for converting the developed image into electrical image signals and processing the image signals. The software of SP-1000 was changed for the one enabling the image processing according to the present invention. A laser printer, LP-1000P, was used as an output unit.

For comparative prints, a planar exposure type printer Mini Labo PP-1257V (manufactured by Fuji Photo Film Co., Ltd.), which is customarily used in the current market, was used as an output unit. PP-1257V is of simultaneous entire surface exposure system in which a developed color negative film is directly printed on color paper, and color balance is controlled by filter control.

In either printer, commercially available color paper, FUJICOLOR LASER PAPER (manufactured by Fuji Photo Film Co., Ltd.) was used as a printing medium, and positive development processing was carried out in accordance with universal CP-47L formula by using processing chemicals therefor (produced by Fuji Photo Film Co., Ltd.).

5. Test (1) Comparative Print D:

Exposed samples A101 and A102 were developed in FP560B according to the basic development processing, and the developed films were subjected to image processing on SP-1000. Printing and positive development were carried out on LP-1000P to obtain comparative color prints.

(2) Comparative Print E:

Exposed samples A101 and A102 were developed in FP560B according to the basic development processing. Printing and positive development were carried out on PP-1257V of planar exposure type to obtain comparative color prints.

(3) Comparative Print F:

Exposed samples A101 and A102 were developed in FP560B in accordance with the fixing-omitted development processing, and the developed films were printed and positively developed on PP-1257V to obtain comparative color prints.

(4) Print 2 of Invention:

Exposed samples A101 and A102 were developed in FP560B in accordance with the fixing-omitted development processing, and the developed films were subjected to image processing on SP-1000. Printing and positive development were carried out on LP-1000P to obtain color prints according to the present invention. The image processing conditions of SP-1000 were as usually specified except that necessary corrections were made on condition setting for the developed densities obtained by the fixing-omitted development processing.

6. Test Results

The test results obtained are shown in Table 6 below.

TABLE 6

| | | | Exposure on Shooting | | |
|---|---|---|---|---|---|
| Print | Film | DP/IP* | 1 Stop Under | Standard Exposure | 2 Stops Over |
| D | A101 | standard DP/IP | 3.4 | 3.6 | 3.6 |
| E | A101 | standard DP/no IP | 3.4 | 3.5 | 3.5 |
| F | A101 | fixing-omitted DP/no IP | 2.9 | 2.8 | 3.0 |
| 2 | A101 | fixing-omitted DP/IP | 3.3 | 3.5 | 3.3 |
| D | A102 | standard DP/IP | 2.8 | 2.9 | 2.7 |
| E | A102 | standard DP/no IP | 2.7 | 2.7 | 2.6 |
| F | A102 | fixing-omitted DP/no IP | 2.4 | 2.5 | 2.6 |
| 2 | A102 | fixing-omitted DP/IP | 3.5 | 3.6 | 3.6 |

Note:
"DP" and "IP" stand development processing and image processing, respectively.

As is seen from Table 6, both comparative prints D and E, which were obtained through basic development processing, exhibit nearly standard image quality, and the quality difference between prints D and E. i.e., the difference resulting from whether the image processing has been conducted or not (and, of necessity, the difference of the output unit used), is small. On the other hand, comparative print F obtained by fixing-omitted development processing directly followed by printing with no image processing is poor in image quality, which is especially conspicuous in overexposure photographing. Print 2 according to the present invention which was obtained by fixing-omitted development processing followed by image processing is equal in image quality to print D obtained by basic development processing and image processing, achieving satisfactory image quality reproduction.

The total amount of waste solutions from the fixing-omitted development processing was smaller than that from the basic development processing by 17%. The waste solutions reducing effect was more pronounced in the development processing of low-silver sample A102.

While in Example 2 a stabilizer substituting for washing was used, if a washing system is employed, the amount of nitrogen compounds in waste water will be 85% reduced, as is calculated from the composition of the processing solution and the rate of replenishment in each step.

By adopting fixing-omitted development processing, the total processing time required from the start of development of the color negative film to image reproduction on color paper was shortened 100 seconds (corresponding to the omitted fixing step).

EXAMPLE 3

The tests of Example 2 were repeated, except that the image information on the developed film was obtained by reading the reflection density as described in IV-1 by use of the reflection density reading unit shown in FIG. 11. The image processor SP-1000 used in Example 2 is equipped with both a transmission image reading unit and a reflection image reading unit.

Image reading was carried out smoothly. Image processing and printing on color paper were conducted in the same manner as in Example 2. As a result, color prints obtained had the same image quality as that obtained through basic development processing similarly to Example 2.

Even where a fixing step is omitted in development processing of exposed color films, image information substantially equal to what should have been obtained by basic development processing (i.e., nearly standard development processing) can be obtained, making it possible to provide color prints of normal quality through simplified development processing.

Reduction in silver halide emulsion coating weight in color films makes it feasible to reduce the material cost of color films while maintaining the effects of the present invention.

EXAMPLE 4

1. Color Negative Film

Sample A101 (color negative film) were prepared in the same manner as in Example 2.

Sample B102 was prepared in the same manner as for sample A101, except for reducing every silver coating weight in every-containing layer by half without changing the emulsion compositions. The total silver coating weight in sample A101 was 6.45 g/$m^2$, while that in sample B102 was 3.225 g/$m^2$.

2. Methods for Testing Photographic Characteristics

Sample films were exposed and developed in the same manner as in Example 2 with the following exception. Positive images on color prints were evaluated in the same manner as in Example 2, and the difference of score between the print obtained by the following desilvering-omitted development processing and the print obtained by the basic development processing was obtained.

3. Processing Development of Color Negative Films

The exposed films were processed on FP560B under the conditions of basic development processing in the same manner as in Example 1, and of desilvering-omitted development processing. The development processing was carried out at a throughput of 1 $m^2$ (35-mm width) per day for consecutive 15 days. For carrying out desilvering-omitted development processing, (1) the bleaching bath of the processor FP560B was replaced with a residual color reduction bath having the following formulation, and (2) the films developed and processed with the residual color reduction bath were sent directly to a drying zone, skipping over the rest of the processing steps. The rate of replenishment of the residual color reduction bath was 17 ml/35 mm (W)×1.1 m (L). That is, the desilvering-omitted development processing was carried out according to the following procedure.

| Step | Time | Temp. | Rate of Replenishment* | Tank Volume |
|---|---|---|---|---|
| Color development | 3'5" | 38.0° C. | 20 ml | 17 l |
| Residual color reduction | 50" | 38.0° C. | 17 ml | 5 l |
| Drying | 1'30" | 60° C. | | |

* Per 35 mm (W) × 1.1 m (L) (corresponding to a 24-ex. film roll)

| Composition of Residual Color Reduction Bath: | |
|---|---|
| The tank solution and replenisher had the same composition. | |
| Succinic acid | 10.0 g |
| Compound shown in Table 7 | 10.0 g |
| Polyoxyethylene-p-monononylphenyl ether (degree of polymerization: 10) | 0.2 |
| Water to make | 1.0 l |
| pH (adjusted with aq. ammonia and nitric acid) | 5.0 |

4. Image Processing of Image for Evaluation

The developed image was scanned, converted into electrical image signals, and processed on image processor SP-1000 (the software of SP-1000 was changed for the one enabling the image processing according to the present invention) and output on FUJI COLOR LASER PAPER by the use of LP-1000P. Positive image development was carried out in accordance with CP-47L formula for general use by using processing chemicals therefor (produced by Fuji Photo Film CO., Ltd.).

5. Test Results

The test results obtained are shown in Table 7 below.

TABLE 7

| Test No. | Residual Color Reducing Agent | Difference in Score from Target Quality A101 | B102 | Remark |
|---|---|---|---|---|
| 1 | none | 3.2 | 3.3 | Comparison |
| 2 | I-1 | 0.7 | 0.4 | Invention |
| 3 | I-2 | 0.5 | 0.3 | " |
| 4 | I-7 | 0.8 | 0.4 | " |

As is apparent from Table 7, in test No. 1 in which desilvering-omitted development processing was conducted without using a residual color reducing agent, the difference from the image quality obtained by basic development processing is large, indicating insufficient image quality reproduction. In test Nos. 2 to 4 in which a residual color reducing agent was used in the desilvering-omitted development processing, the resulting prints are equal in image quality to the print obtained by basic development processing followed by image processing, achieving satisfactory image quality reproduction. This effect is appreciably manifested in sample B102 having a reduced silver halide coating weight.

The total amount of waste solutions was reduced by 50% by adopting the desilvering-omitted development processing in place of the basic development processing.

While in Example 4 a stabilizer substituting for washing was used, if a washing system is employed, the amount of nitrogen compounds in waste water will be 96% reduced, as is calculated from the composition of the processing solution and the rate of replenishment in each step.

By adopting desilvering-omitted development processing, the total processing time required from the start of development of the color negative film to image reproduction on color paper was shortened 170 seconds.

Even where a desilvering step is omitted in development processing exposed color films, image information substantially equal to what should have been obtained by basic development processing (i.e., nearly standard development processing) can be obtained by subjecting the developed color films to residual color reduction processing and correcting the image information through image data processing. It is thus possible to obtain color prints having normal image quality by simplified development processing.

Reduction in silver halide emulsion coating weight in color films makes it feasible to reduce the material cost of color films while maintaining the effects of the present invention.

EXAMPLE 5

1. Color Negative Film

The same color negative films as used in Example 1 were used.

2. Methods for Testing Photographic Characteristics

Sample films were exposed in the same manner as in Example 2 and developed under the following conditions. Positive images on color prints were evaluated in the same manner as in Example 2.

3. Processing Development of Color Negative Films

The exposed films were processed on FP560B under the conditions of basic development processing in the same manner as in Example 1, and of bleaching-omitted development processing.

For carrying out bleaching-omitted development processing, the film transport system of the processor FP560B was adapted so that the developed films might be sent directly to a fixing bath, skipping over the bleaching rack.

4. Image Processing of Image for Evaluation

The developed image was scanned and converted into electrical image signals on SP-1000 (the software of SP-1000 was changed for the one enabling the image processing according to the present invention), and the processed image signals were output on FUJI COLOR LASER PAPER by the use of LP-1000P. For comparison, the developed image was directly printed on the same color paper by the use of Mini Labo PP-1257V of planar exposure system. Positive image development was carried out in accordance with CP-47L formula for general use by using processing chemicals therefor (produced by Fuji Photo Film Co., Ltd.).

5. Test (1) Comparative Print G:

Exposed samples were developed according to basic development processing, and the developed films were subjected to image processing on SP-1000. Printing and positive development were carried out on LP-1000P to obtain comparative color prints.

(2) Comparative Print H:

Exposed samples were developed according to basic development processing, and printing and positive development were carried out on PP-1257V of planar exposure type to obtain comparative color prints.

(3) Comparative Print I:

Exposed samples were developed on FP560B in accordance with bleaching-omitted development processing, and the developed films were printed and positively developed on PP-1257V to obtain comparative color prints.

(4) Print 3 of Invention:

Exposed samples were developed in the same manner as for comparative print I, and the developed films were subjected to image processing on SP-1000. Printing and positive development were carried out on LP-1000P to obtain color prints according to the present invention. The image processing conditions of SP-1000 were as usually specified except that necessary corrections were made on condition setting for the developed densities obtained by the bleaching-omitted development processing.

(5) Prints 4 to 12 of Invention:

Color prints of the present invention were obtained in the same manner as for print 3, except that a fixing accelerator shown in Table 8 below was added to the fixing bath in a concentration of 0.05 mol/l.

6. Test Results

The test results obtained are shown in Table 8 below.

TABLE 8

| Print | Fixing Accelerator | Exposure on Shooting: 2 Stops Under | Standard Exposure | 4 Stops Over |
|---|---|---|---|---|
| G | — | 3.3 | 3.5 | 3.3 |
| H | — | 3.0 | 3.3 | 3.1 |
| I | — | 2.4 | 1.6 | 1.0 |
| 3 | — | 3.2 | 3.4 | 3.2 |
| 4 | FI-1 | 3.5 | 3.6 | 3.3 |
| 5 | FI-5 | 3.6 | 3.8 | 3.7 |
| 6 | FI-37 | 3.3 | 3.6 | 3.2 |
| 7 | FII-1 | 3.6 | 3.7 | 3.6 |
| 8 | FII-3 | 3.5 | 3.6 | 3.2 |
| 9 | FII-42 | 3.4 | 3.5 | 3.3 |
| 10 | FII-85 | 3.6 | 3.9 | 3.7 |
| 11 | FII-86 | 3.5 | 3.6 | 3.4 |
| 12 | FIII ($R_4$: $CH_2CH_2OH$) | 3.6 | 3.6 | 3.4 |

It is seen from Table 8 that comparative prints G and H obtained by basic development processing both exhibit nearly standard image quality, and the difference between them in image quality due to the difference of the output unit is small. On the other hand, print I obtained by bleaching-omitted development processing without image processing exhibits insufficient image reproducibility. The deviation of image quality is particularly conspicuous in overexposure shooting.

In print 3 obtained by bleaching-omitted development processing followed by image processing according to the present invention, image reproducibility is satisfied. Prints 4 to 12 obtained by using a fixing solution containing a fixing accelerator exhibits further improved image quality.

EXAMPLE 6

Color Negative Film:

(1) Commercially available color negative film for general use (REALA ACE, produced by Fuji Photo Film Co., Ltd.; ISO sensitivity: 100)

(2) Commercially available color negative film for business use (nexia F, produced by Fuji Photo Film Co., Ltd.)

The sample films were exposed and developed in the same manner as for print 3 of Example 5. Image processing and printing were carried out in the same manner as for print 3 of Example 5 (hereinafter referred to as image processing A) or with the exception that the operation mechanism for obtaining analytical densities as described in IV-2 was integrated into the image processing unit of SP-1000 (CPU 60 of FIG. 5) (hereinafter referred to as image processing B). Printing and positive development were carried out, and the resulting prints were evaluated in the same manner as in Example 1. The results obtained are shown in Table 9.

TABLE 9

| Image Processing | Color Negative Film | Exposure on Photographing 2 Stops Under | Standard Exposure | 4 Stops Over |
|---|---|---|---|---|
| A | REALA ACE | 3.6 | 3.8 | 3.7 |
| A | nexia F | 3.5 | 3.8 | 3.7 |
| B | REALA ACE | 4.2 | 4.4 | 4.3 |
| B | nexia F | 4.9 | 4.3 | 4.3 |

While the invention has been described in detail and with reference to specific examples thereof, it will be apparent to one skilled in the art that various changes and modifications can be made therein without departing from the spirit and scope thereof.

What is claimed is:

1. An apparatus for development processing an exposed silver halide color light-sensitive material and outputting image information obtained from the developed image to a printer, which comprises 1) a mechanism for detecting the kind of the exposed color light-sensitive material, 2) a mechanism for choosing either basic development processing conditions or non-basic development processing conditions and carrying out development processing under the chosen conditions, 3) a mechanism for reading image information from the developed color light-sensitive material and converting the image information into optical or electrical digital information, 4) a mechanism for image processing the optical or electrical digital information into target image characteristics which should have been obtained if said exposed color light-sensitive material had been development processed under basic development processing conditions, and 5) an output mechanism for outputting the converted image characteristics to the printer to obtain a positive image having the same image quality as could be obtained by basic development processing.

2. The apparatus according to claim 1, wherein said non-basic development processing is rapid processing.

3. The apparatus according to claim 1, wherein said mechanism for image processing the optical or electrical digital information is constructed to carry out at least one of 1) processing for converting contrast data of the read image information to target contrast values which should have been obtained by basic development processing, 2) processing for converting color balance data of the read image information to target color balance values which should have been obtained by basic development processing, 3) processing for converting minimum density data of the read image information to target minimum density values which should have been obtained by basic development processing, 4) processing for correcting nonlinearity of the density vs. exposure relationship resulting from the non-basic development processing to obtain a target density vs. exposure relationship which should have been obtained by basic development processing, and 5) processing for correcting nonlinearity of the density vs. exposure relationship resulting from the non-basic development processing which is dependent on the kind of the color light-sensitive material to obtain a target density vs. exposure relationship which should have been obtained by basic development processing.

4. The apparatus according to claim 3, wherein said mechanism for image processing the optical or electrical digital information has a means for edge emphasis, a means for sharpness improvement, a means for granularity reduction, and a means for saturation improvement.

* * * * *